(12) United States Patent
Yoshida

(10) Patent No.: US 6,931,432 B1
(45) Date of Patent: Aug. 16, 2005

(54) DATA TRANSMISSION APPARATUS AND METHOD WITH CONTROL FEATURE FOR TRANSMITTING DATA OR TRANSMITTING A STORAGE LOCATION OF DATA

(75) Inventor: Hiroyoshi Yoshida, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/525,065

(22) Filed: Mar. 14, 2000

(30) Foreign Application Priority Data

Mar. 19, 1999 (JP) .................................. 11-076755

(51) Int. Cl.[7] .......................... G06F 15/16; G06F 15/00
(52) U.S. Cl. ...................... 709/206; 709/232; 358/1.15
(58) Field of Search ............................... 709/206, 232; 707/10; 370/60; 710/107; 358/1.15, 1.16, 358/1.17

(56) References Cited

U.S. PATENT DOCUMENTS

| | | | |
|---|---|---|---|
| 4,330,847 A | * | 5/1982 | Kuseski ...................... 709/246 |
| 4,386,416 A | * | 5/1983 | Giltner et al. ................ 710/68 |
| 5,291,481 A | * | 3/1994 | Doshi et al. ................ 370/230 |
| 5,774,654 A | * | 6/1998 | Maki .......................... 709/200 |
| 5,856,974 A | * | 1/1999 | Gervais et al. ............. 370/392 |
| 5,903,723 A | * | 5/1999 | Beck et al. .................. 709/200 |
| 5,930,778 A | * | 7/1999 | Geer ............................ 705/45 |
| 6,009,462 A | * | 12/1999 | Birrell et al. ............... 709/206 |
| 6,144,458 A | * | 11/2000 | McLachlan et al. ....... 358/1.15 |
| 6,321,283 B1 | * | 11/2001 | Ventura ...................... 710/107 |

* cited by examiner

Primary Examiner—Larry D. Donaghue
(74) Attorney, Agent, or Firm—Fitzpatrick, Cella, Harper & Scinto

(57) ABSTRACT

In a data transmission apparatus, an input unit inputs data, and a transmission unit transmits the inputted data to a destination. A discrimination unit discriminates an attribute of the inputted data, and a storage unit stores the inputted data to a predetermined memory. A control unit controls a transmission operation of the transmission unit in accordance with a discrimination result obtained by the discrimination unit, such that the transmission unit transmits to the destination the inputted data or information indicating a storage location used by the storage unit.

4 Claims, 72 Drawing Sheets

FIG. 10
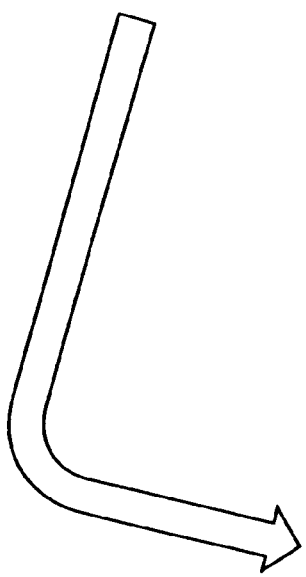 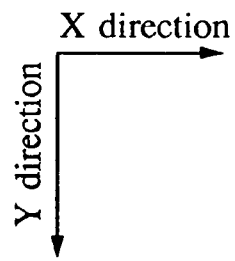

FIG. 34

Search

| Everything ▼ | the | Common Name ▼ | contains ▼ | | Do Search | in | Local Address Book | ▼

| Set | Class | Name ▼ | | Name ▼ | | Set | S | | Detail |

◀ ▶

∨ 👥 Carrot System TASKS/Canon Inc/JP

∨ 👤 Minny Rabbit/JiJi Team/Carrot Pro

🖥 CanonGP/JiJi Team/Carrot Project/C

∨ 🖥 LBP-BEAN/JiJi Team/Carrot Project

∨ 📠 HOME/JiJi Team/Carrot Project/Cano

Search Result 5

Cancel | OK

Print Setting

☐ Copies  [1]

☐ Paper Select  [A3]  [−] [+]

☐ Zoom  [100] %  [▼]

☐ Duplex

☐ Sorter  [non − sort]  [▼]
                          [▲]

☐ Resolution  [200] dpi  [▼]

☐ Footer/Header

[Margin]
[Shift]
[Overlay]
[N on 1]
[Image Creation]

[OK]
[Cancel]

[Capability]
3470

FIG. 71

| INFORMATION ROUTE | PERMISSIBLE DATA CAPACITY |
|---|---|
| PSTN (TELEPHONE LINE) | NOT DESIGNATED |
| ISDN (TELEPHONE LINE) | NOT DESIGNATED |
| LAN (10base) | 1M BYTE |
| LAN (100base) | 10M BYTES |
| INTERNET | 500K BYTES |
| | |

| NAME OF DESTINATION | INFORMATION ROUTE | LIST OF ABILITY ||||
|---|---|---|---|---|
| | | REPRODUCTIVITY | MAXIMUM OUTPUT SIZE | PRODUCTIVITY |
| RESEARCH BLDG. 3RD FL. FAX | PSTN | B/W BINARY | A4 | 3 |
| RESEARCH BLDG. 3RD FL. PC | LAN (10bese) | – | – | 10 |
| RESEARCH BLDG. 3RD FL. WS | LAN (100bese) | – | – | 100 |
| KOKURA INSTITUTE WS | INTERNET | – | – | 100 |
| KOKURA INSTITUTE WS | INTERNET | FULL COLOR | A3 | 16 |
| | | | | |
| | | | | |

7200

DATA TRANSMISSION APPARATUS AND METHOD WITH CONTROL FEATURE FOR TRANSMITTING DATA OR TRANSMITTING A STORAGE LOCATION OF DATA

BACKGROUND OF THE INVENTION

1. Field of the Invention

The invention relates to an image data transfer method for transferring image data indicative of an image to a desired destination.

2. Related Background Art

In recent years, various image data such as image data obtained by reading an image on an original, image data obtained by photographing an object by a digital camera or the like, image data formed by an image editing application, and the like is transferred through a network such as Internet or the like.

However, the conventional method has the following problems.

That is, when a large quantity of original is transferred, since it is sent irrespective of a network situation on the destination side, there is a possibility such that a trouble occurs in the network of the destination (sending destination).

When a processing ability (for example, whether a color image can be handled or not, or the like) of the destination is inferior to an image to be sent, the image is edited in accordance with the processing ability of the destination or the transmission has to be stopped.

SUMMARY OF THE INVENTION

It is an object of the invention to provide an image transfer method which can solve the foregoing problems.

Another object of the invention is to provide an image transfer method which can transfer image data by a proper method suitable for image data to be transferred.

Still another object of the invention is to provide an image transfer method which can transfer image data by a proper method in accordance with a destination.

The above and other objects and features of the present invention will become apparent from the following detailed description and the appended claims with reference to the accompanying drawings.

BRIEF DESCRIPTION OF THE DRAWINGS

These and other objects and features of the invention will become more apparent from the following detailed description of the embodiments with reference to the accompanying drawings in which:

FIG. 10 is a schematic representation of the process of writing data performed by the image rotation unit during the image rotation process;

FIG. 34 is a schematic diagram illustrating an example of a screen on which retrieved addresses are displayed;

FIG. 36 is a schematic diagram illustrating a ten key keyboard displayed on the screen, for inputting a telephone number or the like;

FIG. 53 is a schematic diagram illustrating a screen for setting printing conditions in the RETRIEVE mode;

FIG. 71 is a schematic diagram illustrating contents in the table of a permissible data amount of an information route.

FIG. 72 is a schematic diagram illustrating contents in the table of a destination information.

DESCRIPTION OF THE PREFERRED EMBODIMENT

The present invention is described in further detail below with reference to a preferred embodiment in conjunction with the accompanying drawings.

Figure 1:
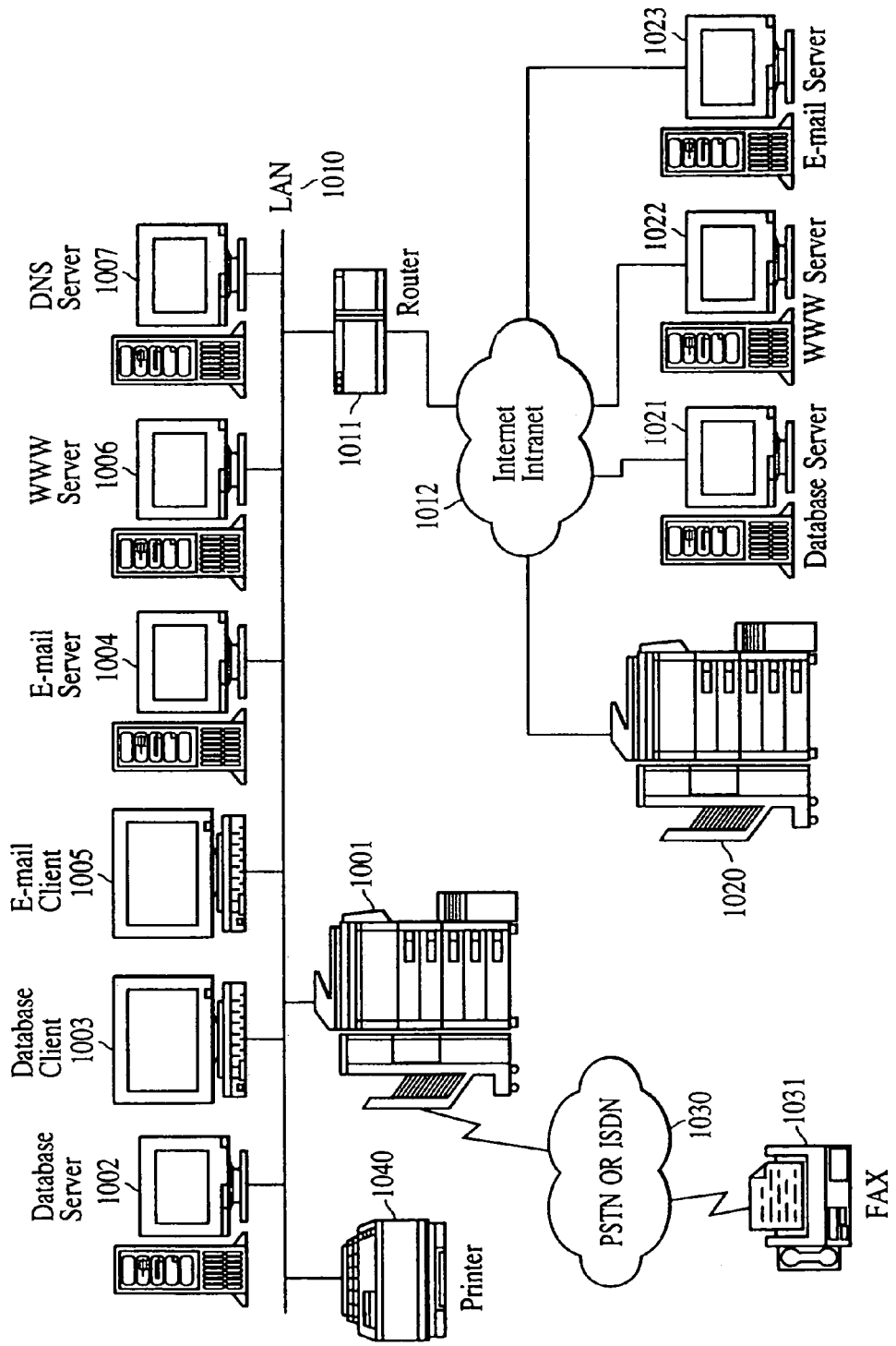
FIG. 1 is a schematic diagram illustrating a network system including various devices and apparatus connected to each other according to an embodiment of the invention.

FIG. 1 is a schematic diagram generally illustrating a network system including various devices and apparatus connected to each other according to an embodiment of the invention.

In FIG. 1, reference numeral 1001 denotes an image processing apparatus according to the present embodiment. This image processing apparatus includes a scanner, a printer, and other devices, which will be described later. Document image data obtained via the scanner can be output over a local area network (LAN). Conversely, image data received via the LAN can be printed on a copying sheet using the printer. Furthermore, a document image input via the scanner can be transmitted over a public network such as PSTN (Public Switched Telephone Network) or ISDN (Integrated Services Digital Network) using a facsimile transmission module and an image received via the public network such as PSTN or ISDN can be printed using the printer.

In the system shown FIG. 1, a database server 1002 stores and manages two-level or multilevel image data input via the image processing apparatus 1001. A database client 1003 can retrieve and read the image data stored in the database server 1002.

An E-mail server 1004 can receive an image input to the image processing apparatus 1001 as attached file to an E-mail.

An E-mail client 1005 is a computer terminal having an E-mail capability for receiving and transmitting E-mail via the E-mail server 1004.

A WWW server 1006 provides HTML documents over the LAN. The image processing apparatus 1001 can print HTML documents provided by the WWW server.

The LAN 1010 is connected to Internet/intranet 1012 via a router 1011. Devices 1020, 1021, 1022, and 1023 similar to the above-described database server 1002, the WWW server 1006, the E-mail server 1004, and the image processing apparatus 1001, respectively, are also connected to the Internet/intranet 1012.

The image processing apparatus 1001 can communicate with a facsimile machine 1031 via a PSTN/ISDN 1030. Furthermore, a printer 1040 is connected to the LAN so that an image input to the image processing apparatus 1001 can be printed by the printer 1040.

The construction and operation of the image processing apparatus 1001 is described in detail below in terms of hardware and also software.

1. Hardware 1.1 General Construction

Figure 2:
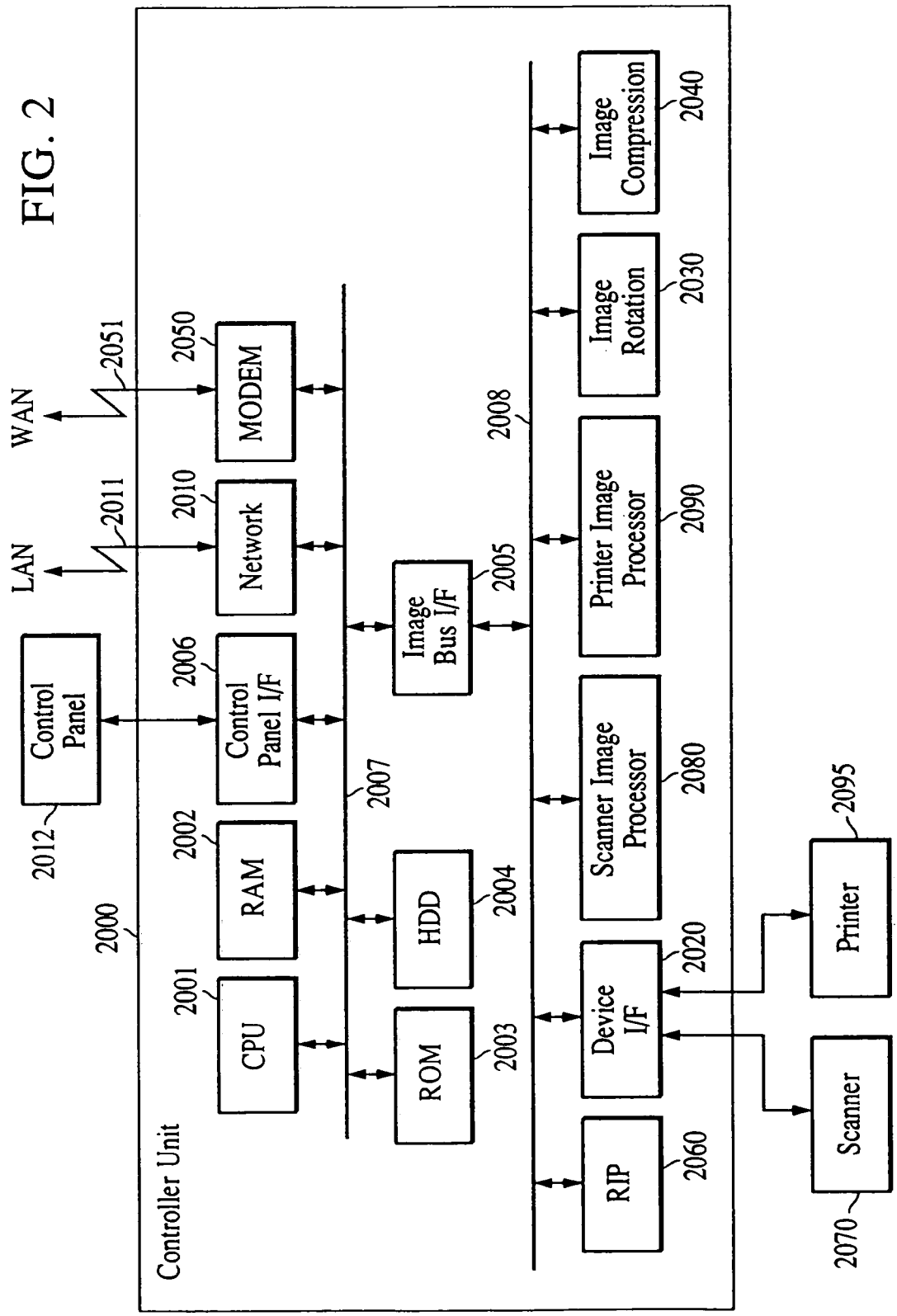
FIG. 2 is a block diagram generally illustrating an image processing apparatus.

FIG. 2 is a block diagram illustrating the general construction of the image processing apparatus 1001.

A controller unit 2000 is connected to devices such as a scanner 2070 serving as an image input device (for scanning the image of a document) and a printer 2095 serving as an image output device (for outputting an image in a visible form) and also connected to a LAN 2011 (LAN 1010) and a public network (WAN) 2051 (PSTN/ISDN 1030) so as to control the input/output operation of image information and device information.

A CPU 2001 serves as a controller for controlling the operation over the entire image processing apparatus shown in FIG. 2. A RAM 2002 serves as a system work memory used by the CPU 2001 and also as an image memory for temporarily storing image data. A ROM 2003 is a boot ROM storing a boot program used by the image processing apparatus. A HDD 2004 is a hard disk drive for storing a system software program and image data.

A control panel I/F 2006 serves as an interface for a control panel 2012, for outputting image data to the control panel 2012. The control panel I/F 2006 also serves to transfer information input by a user via the control panel 2012 to the CPU 2001.

A network I/F 2010 serves to connect the image processing apparatus to the LAN 2011 including a plurality of terminals so as to make it possible to input and output information via the LAN 2011. A modem 2050 serves to connect the image processing apparatus to a public network 2051 so as to make it possible to input and output information via the public network 2051 by a facsimile communication or a data communication.

The devices described above are connected to a system bus 2007.

The system bus 2007 is connected to an image bus 2008 via an image bus I/F 2005 serving as a bus bridge for converting the data structure. The image bus 2008 may be realized using a PCI bus or an IEEE1394 bus.

The following devices are located on the image bus 2008.

That is, one device is a raster image processor (RIP) 2060 for converting a PDL (Page Description Language) code for a page printer to a bit map image. Another device is a device I/F 2020 for connecting the scanner 2070 and the printer 2095, serving as image input/output devices, to the controller 2000 whereby image data can be transferred in a synchronous or asynchronous fashion between the image input/output devices and the controller 2000. Furthermore, a scanner image processor 2080 performs correction, edition, and other processing on the input image data, and a printer image processor 2090 performs correction, resolution conversion, and other processing on the image data to be output, depending on the characteristics of the printer. An image rotation unit 2030 is used to rotate image data and an image compression/decompression unit 2040 performs compression/decompression on image data according to the JPEG standard from multi-level image data and according to the JBIG, MMR, or MH technique for two-level image data.

1.2 Image Input/Output Device

Figure 3:
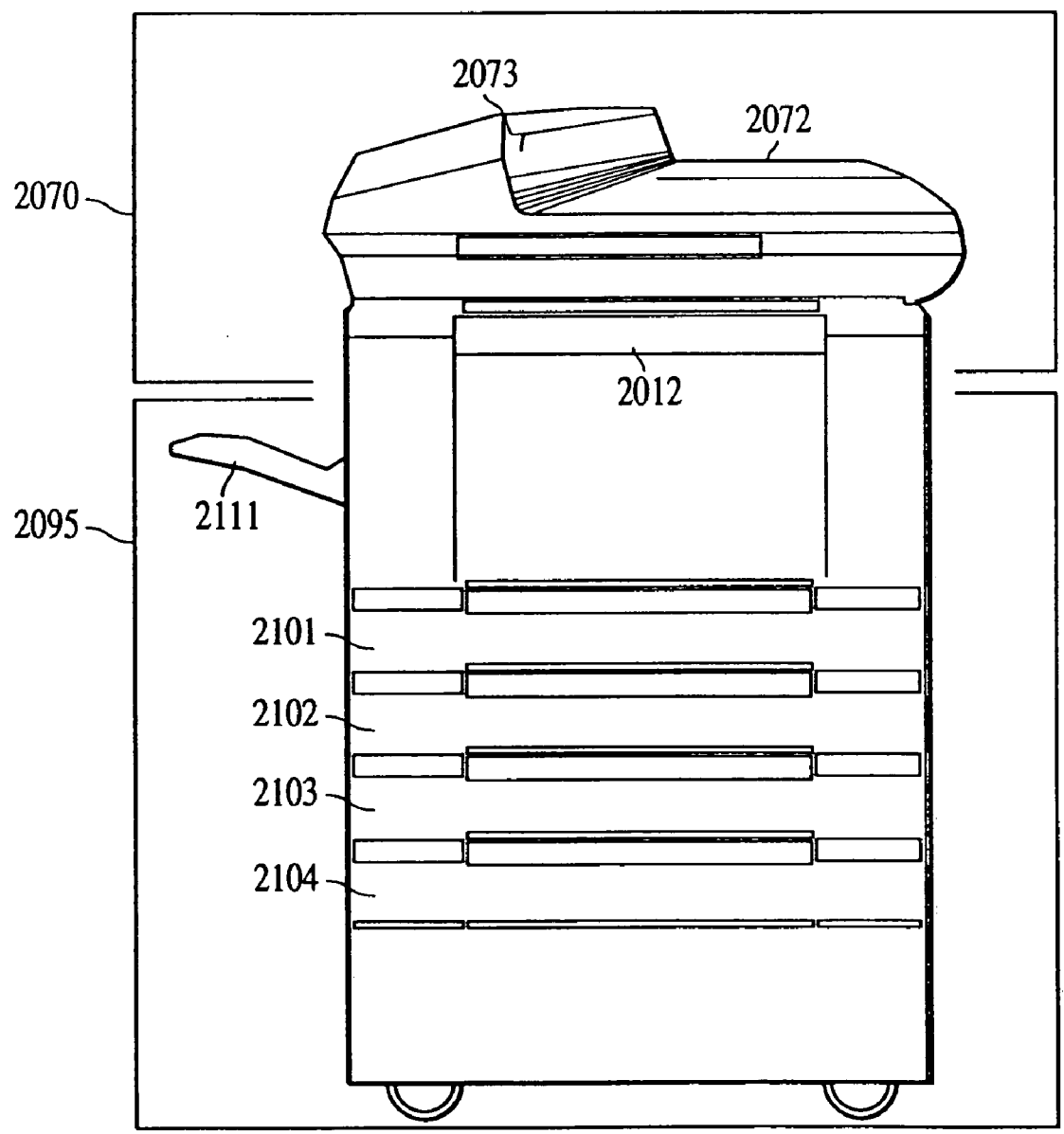
FIG. 3 is a schematic diagram illustrating an external appearance of a scanner unit and that of a printer unit.

FIG. 3 is an external view of an image input/output device, wherein similar reference numerals denote similar parts to those described above. In any other figures, similar reference numerals are used to denote similar parts.

A scanner 2070 serving as an image input device scans a document illuminated with light and senses the image thereof using a CCD line sensor (not shown) thereby generating raster image data in the form of an electric signal corresponding to the original image of the document. Documents are placed on a tray 2073 of a document feeder 2072. If a user issues a scan start command via a control panel 2012, a controller CPU 2001 sends a command to the scanner 2070 to feed one document at a time from the feeder and scan the image of the fed document.

A printer 2095 serving as an image output device converts the raster image data 2096 input by various sources in the form of an electric signal to a corresponding visible image on a sheet of paper. The printer 2095 may be realized in any form such as an electrophotograchic printer with a photosensitive drum or belt, or an ink-jet printer in which ink is emitted from a small-nozzle array thereby directly forming an image on a sheet of paper. A printing operation is started if a command 2096 is issued by the controller CPU 2001. The printer 2095 includes a stack of paper feeders in which paper cassettes 2101, 2102, 2103, and 2104 are placed so that paper with a desired size and/or direction can be fed from a selected paper cassette. Printed paper is fed onto an output tray 2111.

1.3 Control Panel

Figure 4:
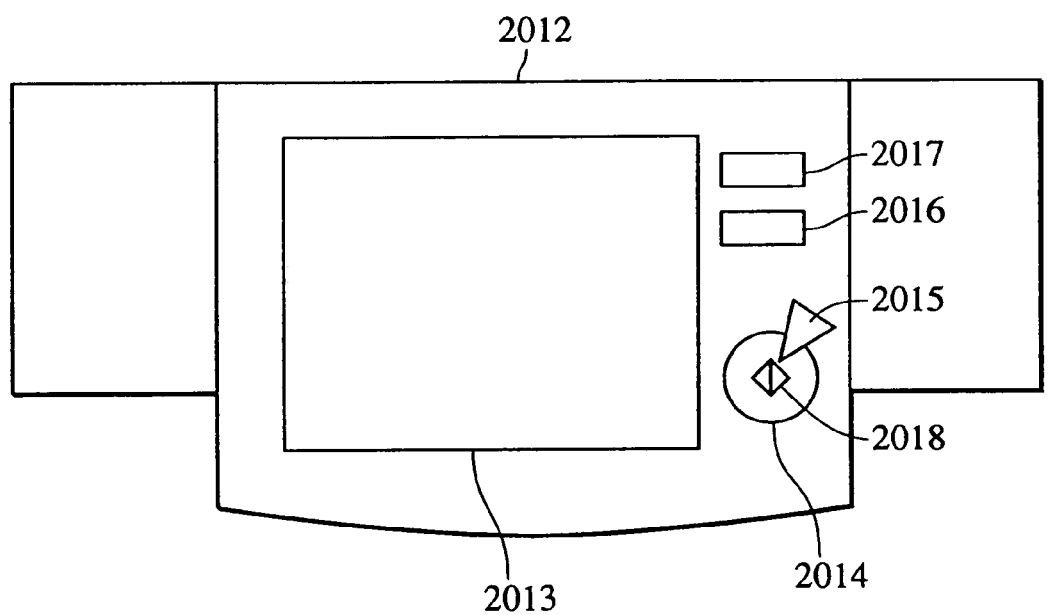
FIG. 4 is a schematic diagram illustrating a control panel.

FIG. 4 illustrates the outline of the construction of the control panel 2012.

An LCD display 2013 has a touch panel sheet attached to an LCD screen. The LCD display 2013 displays a control screen on which a user can issue an operation command to the image processing apparatus. If a key displayed on the screen is pressed, the positional information of the key is sent to the controller CPU 2001. On the basis of this positional information, the CPU 2001 can determine what command is issued by the user. The CPU 2001 changes the contents displayed on the LCD display 2013 as required.

A start key 2014 is used to start the operation of scanning the image of a document. A two-color (green and red) LED 2018 is disposed in the center of the start key 2014 so that a user can determine whether the start key 2014 is in an enabled or disabled state judging from the color of the LED 2018. A stop key 2015 is used to stop the operation of the image processing apparatus during processing. An identification key 2016 is used to input a user identification. A reset key 2017 is used to reset the setting made via the control panel 2012 to an initial state. The above-described keys 2014–2017 are hard keys.

1.4 Scanner Image Processor

Figure 5:
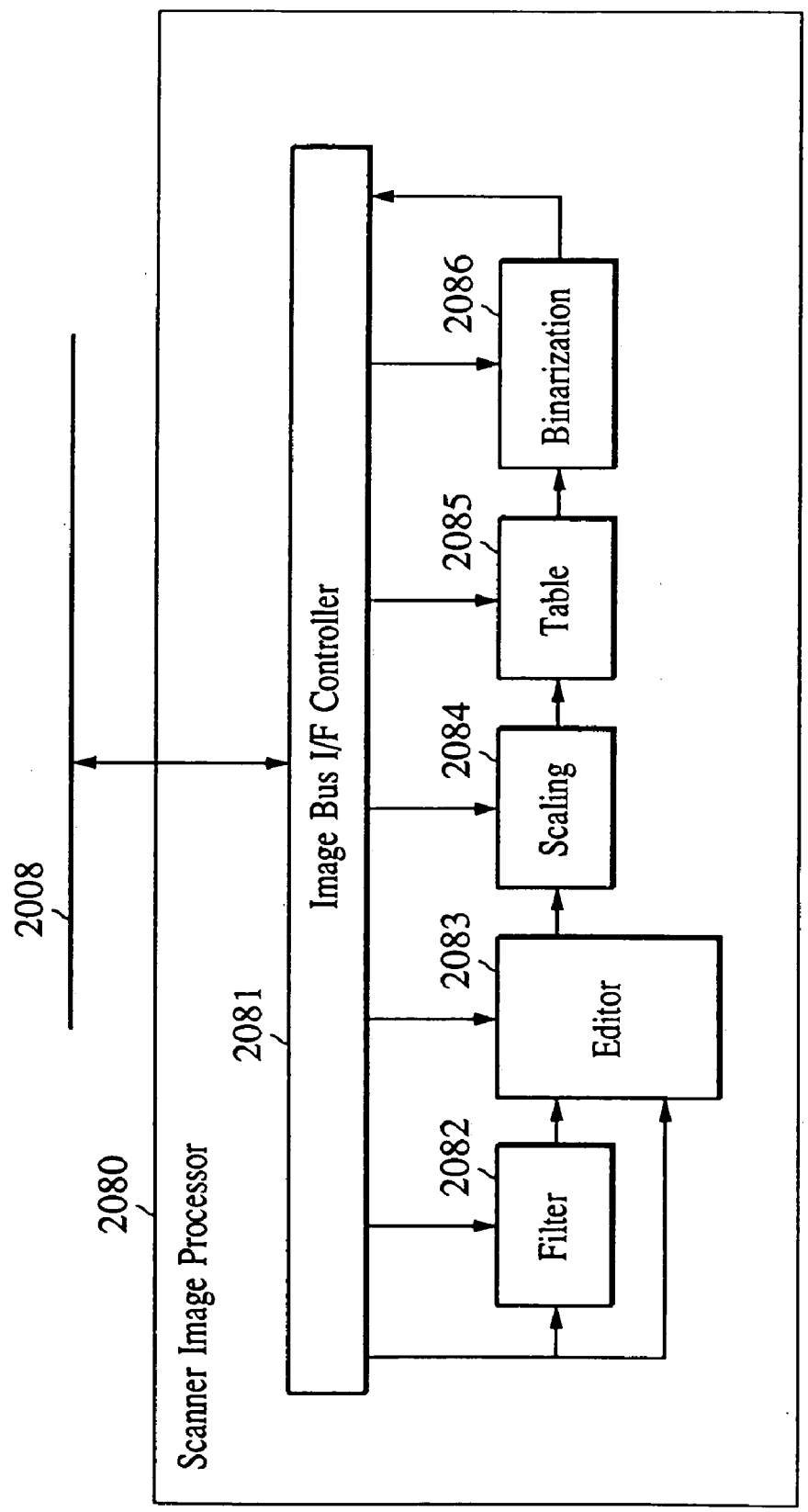
FIG. 5 is a block diagram illustrating a scanner image processor.

FIG. 5 is a block diagram illustrating the construction of the scanner image processor 2080.

An image bus I/F controller 2081 is connected to the image bus 2008 so that it serves to control the bus access sequence and also control the operation, including the timing control, of various devices of the scanner image processor 2080.

A filtering processing unit 2082 is a spatial filter for performing a convolution operation on image data. An editor 2083 performs an editing operation on input image data. For example, the editor 2083 detects, from the input image data, an area enclosed in a closed line marked on the document with a marker pen, and then performs various processes, such as shading, crosshatching, and negative-positive inverting on the image data within the closed area. When the resolution of the image data is changed, a scaling unit 2084 scales the image data up or down by performing interpolation on the raster image in the main scanning direction. Scaling in the subscanning direction is performed by changing the scanning speed of an image line sensor (not shown). A table 2085 is a conversion table which is referred to when image data representing luminance obtained by scanning is converted to data representing intensity. A binarization unit 2086 converts input multilevel gray-scale image data to two-level data by means of screening or error diffusion processing.

After completion of the above-described process, the image data is transmitted over the image bus 2008 via the image bus controller 2081.

1.5 Printer Image Processor

Figure 6:
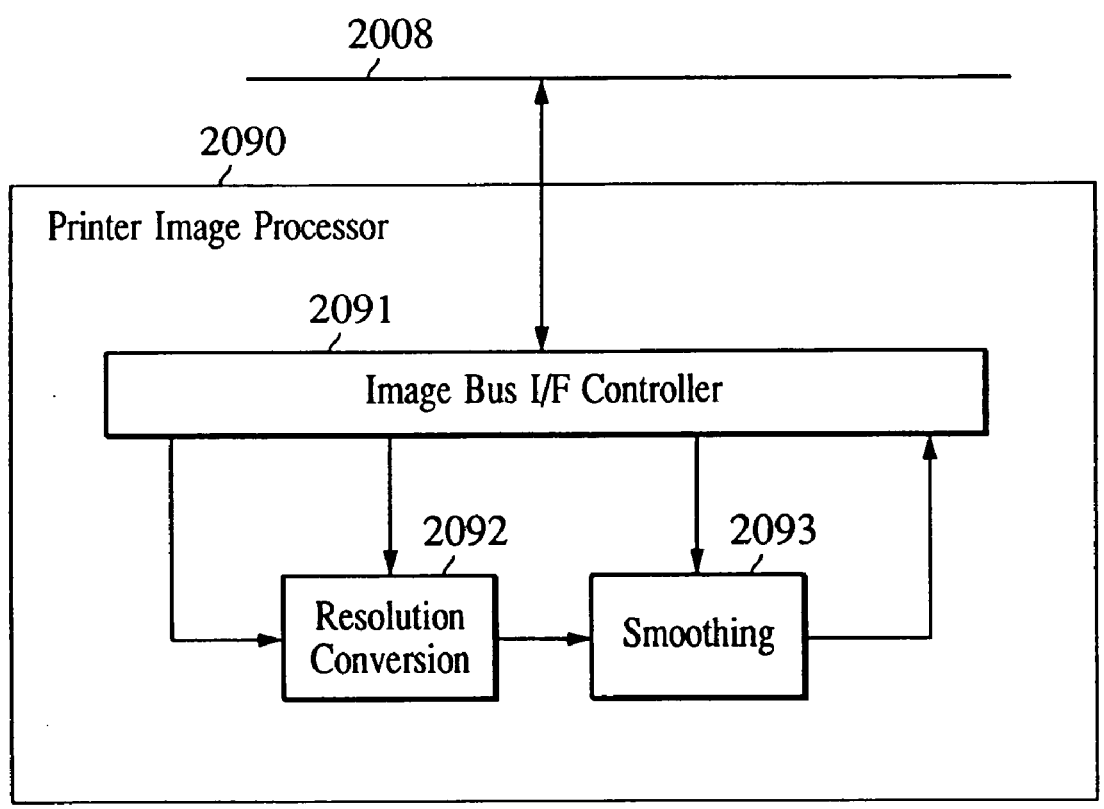
FIG. 6 is a block diagram illustrating a printer image processor.

FIG. 6 is a block diagram illustrating the construction of the printer image processor 2090.

An image bus I/F controller 2091 is connected to the image bus 2008 so that it serves to control the bus access sequence and also control the operation, including the timing control, of various devices of the scanner image processor 2090. A resolution converter 2092 converts the resolution of image data received via the network I/F 2011 or the public line 2051 so that it matches resolution required by the printer 2095. A smoothing unit 2093 smooths out jaggies (appearing at a white/black boundary such as an oblique line) of image data converted in resolution.

1.6 Image Compression Unit

Figure 7:
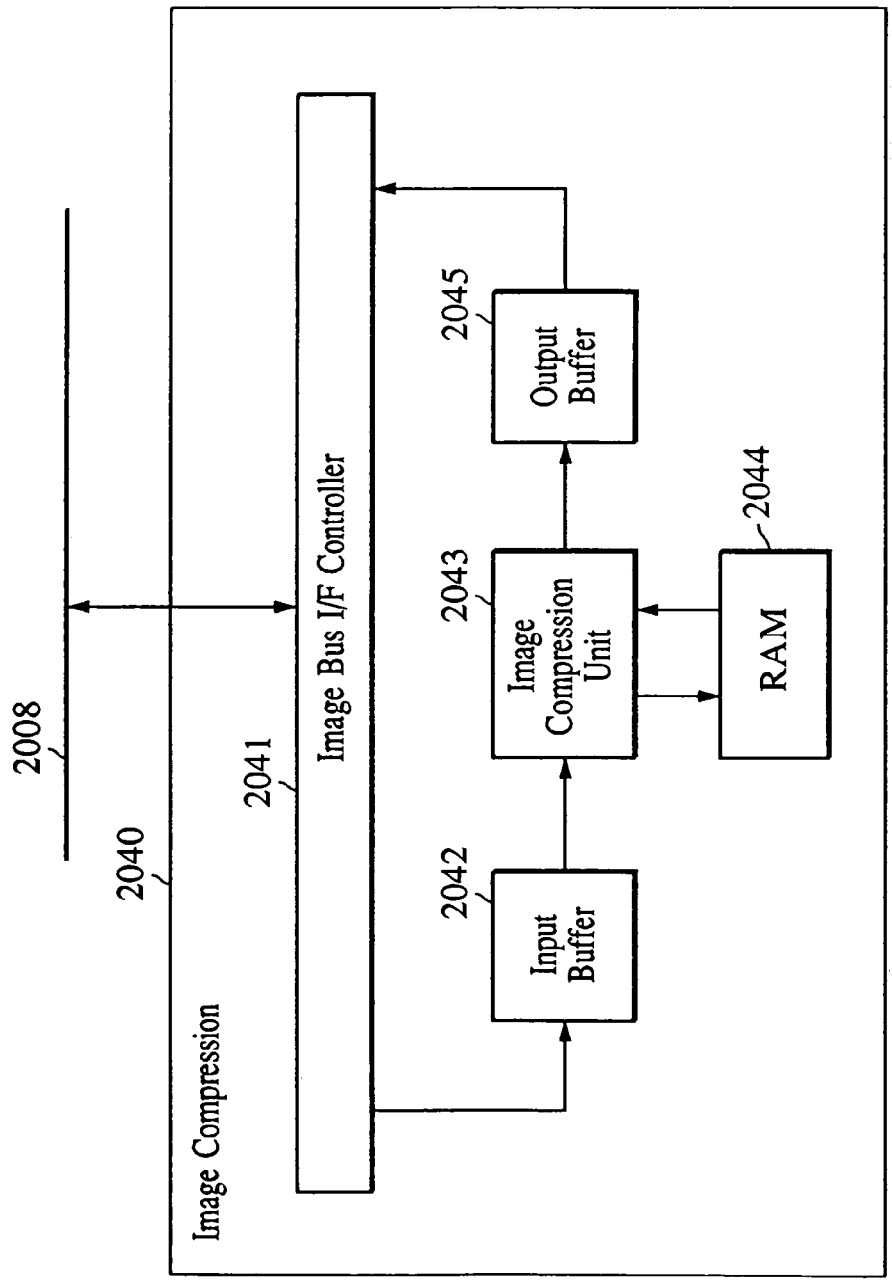
FIG. 7 is a block diagram illustrating an image compression unit.

FIG. 7 is a block diagram illustrating the construction of the image compression unit 2040.

An image bus I/F controller 2041 is connected to the image bus 2008 so that it serves to control the operation in terms of the bus access sequence, the timing of data transmission to/from an input buffer 2042 and an output buffer 2045, and the setting of the operation mode of an image compression unit 2043. The process performed in the image compression unit 2043 is described below.

The CPU 2001 sets the image bus I/F controller 2041 via the image bus 2008 in terms of the conditions of the image compression. In accordance with the setting made by the CPU 2001, the image bus I/F controller 2041 sets the image compression unit 2043 in terms of the conditions of the image compression (such as MMR compression, JBIG decompression, etc.). After completion of the above-described settings, the CPU 2001 enables the image bus I/F controller 2041 to transfer image data. If the image bus I/F controller 2041 is enabled to transfer image data, it starts to transfer image data from the RAM 2002 or another device connected to the image bus 2008. The received image data is temporarily stored in the input buffer 2042. In response to an image data request, the image data is transferred at a fixed speed from the input buffer 2042 to the image compression unit 2043. In this transfer operation, the input buffer 2042 determines whether it is allowed to transfer image data between the image bus I/F controller 2041 and the image compression unit 2043. If it is not allowed to read image data from the image bus 2008 and write it into the image compression unit 2043, the input buffer 2042 does not transfer image data (this method of transferring data is referred to as handshaking). The image compression unit 2043 temporarily stores the received image data in a RAM 2044. If the amount of image data stored in the RAM 2044 becomes sufficient to perform image compression (the required amount of image data is a few line data, although it depends on the image compression technique), the image compression unit 2043 performs image compression using the image data stored in the RAM 2044. The compressed image data is immediately transmitted to the output buffer 2045. The output buffer 2045 transfers the image data to the image bus I/F controller 2041 while handshaking with the image bus I/F controller 2041 and also with the image compression unit 2043. The image bus I/F controller 2041 transfers the received image data in the compressed (or discompressed) form to the RAM 2002 or another device connected to the image bus 2008. The sequence of operations described above is performed repeatedly until there is no more processing request issued from the CPU 2001 (after having processed a required number of pages) or a stop request is issued from the image compression unit (because an error occurs in the compression/decompression process or for another reason).

1.7 Image Rotation Unit

Figure 8:
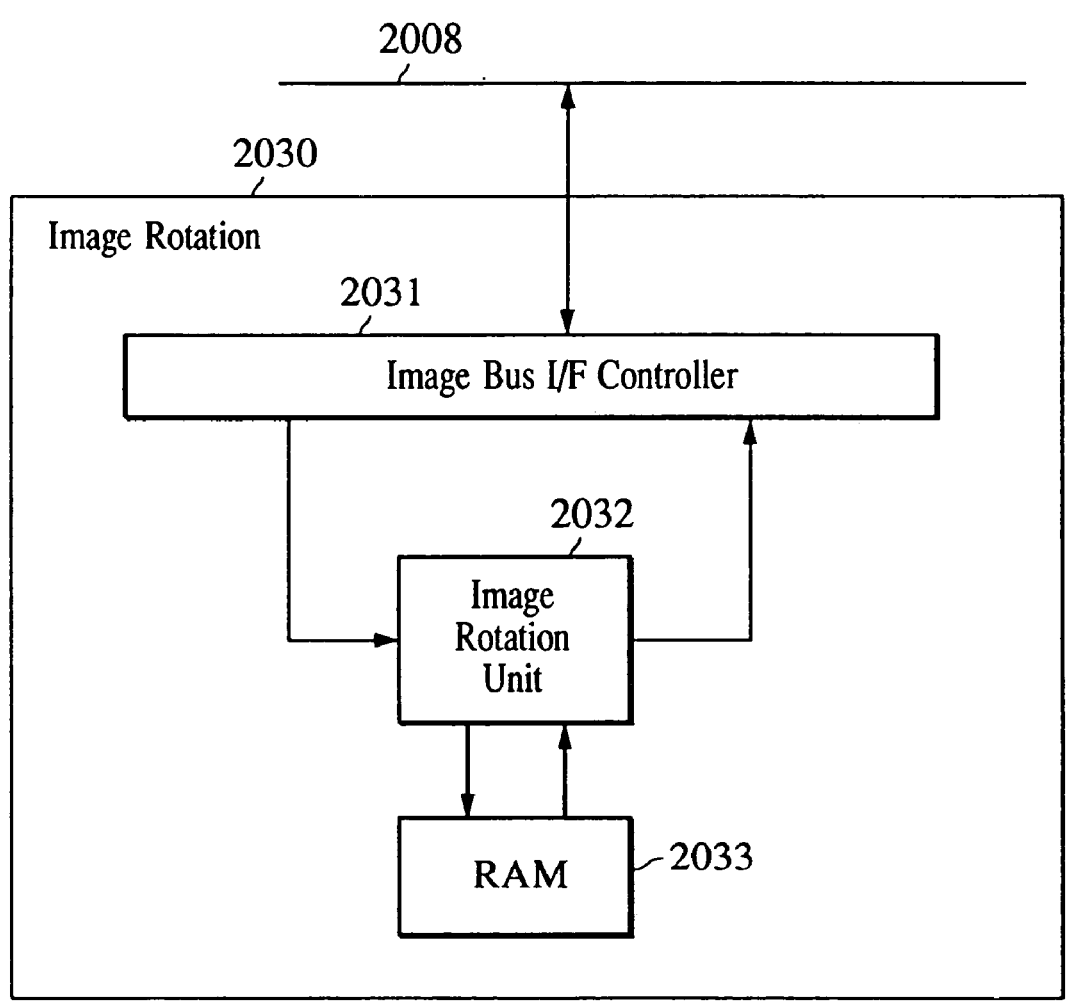
FIG. 8 is a block diagram illustrating an image rotation unit.

FIG. 8 is a block diagram illustrating the construction of the image rotation unit 2030.

An image bus I/F controller 2031 is connected to the image bus 2008 so that it serves to control the operation in terms of the bus access sequence, the setting of the operation mode of the image rotation unit 2032, and the timing of data transmission to/from the image rotation unit 2032. The process performed in the image rotation unit is described below.

The CPU 2001 sets the image bus I/F controller 2031 via the image bus 2008 in terms of the conditions of the image rotation. In accordance with the setting made by the CPU 2001, the image bus I/F controller 2031 sets the image rotation unit 2032 in terms of the conditions of the image rotation (such as an image size, rotation direction, rotation angle). After completion of the above-described settings, the CPU 2001 enables the image bus I/F controller 2031 to transfer image data. If the image bus I/F controller 2031 is enabled to transfer image data, it starts to transfer image data from the RAM 2002 or another device connected to the image bus 2008. Herein it is assumed that data has a size of 32 bits and the image has a size of 32×32 bits and also that the image data is transmitted via the image bus 2008 in units of 32 bits (each pixel can have either one of two levels).

Figure 9:
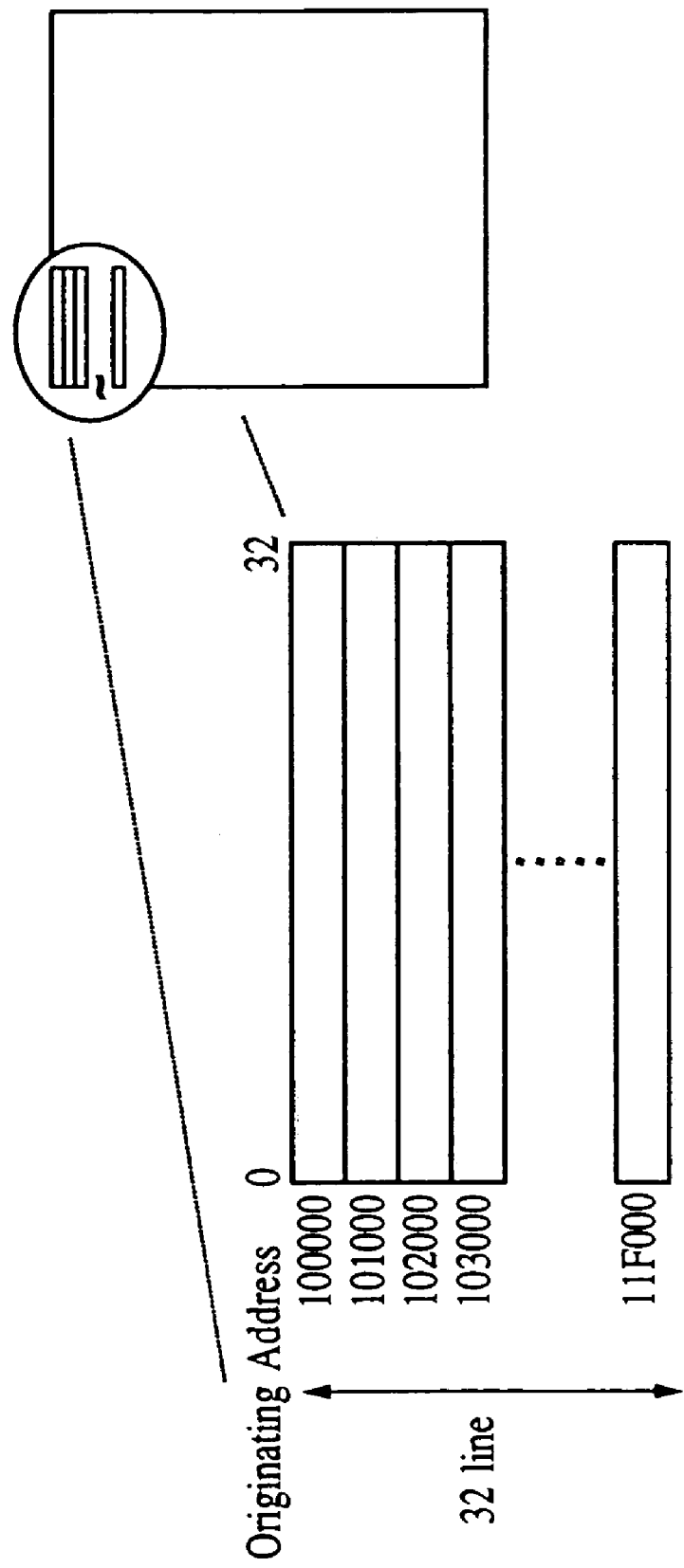
FIG. 9 is a schematic representation of addressing performed by the image rotation unit to rotate image data.

To obtain an image with a size of 32×32 bits, it is required to transfer a unit of data 32 times wherein the image data is transferred from discontinuous addresses (refer to FIG. 9).

The image data transferred by means of discontinuous addressing is written into the RAM 2033 so that the image data having a desired rotation can be obtained when the image data is read from the RAM 2033. For example, when it is desired to obtain an image rotated by 90° in a counterclockwise direction, the original 32-bit image data is written in the Y direction as shown in FIG. 10. If this image data is read along the X direction, the resultant image is rotated relative to the original image.

After completion of the rotation process (writing into the RAM 2033) for the image with the size of 32×32 bits, the image rotation unit 2032 reads the image data from the RAM 2033 in the above-described manner and transmits the obtained data to the image bus I/F controller 2031.

The image bus I/F controller 2031 transfers the received image data in the rotated form, by means of continuous addressing, to the RAM 2002 or another device connected to the image bus 2008.

The sequence of operations described above is repeatedly performed until no more processing requests are issued from the CPU 2001 (because a required number of pages have been processed).

1.8 Device I/F

Figure 11:
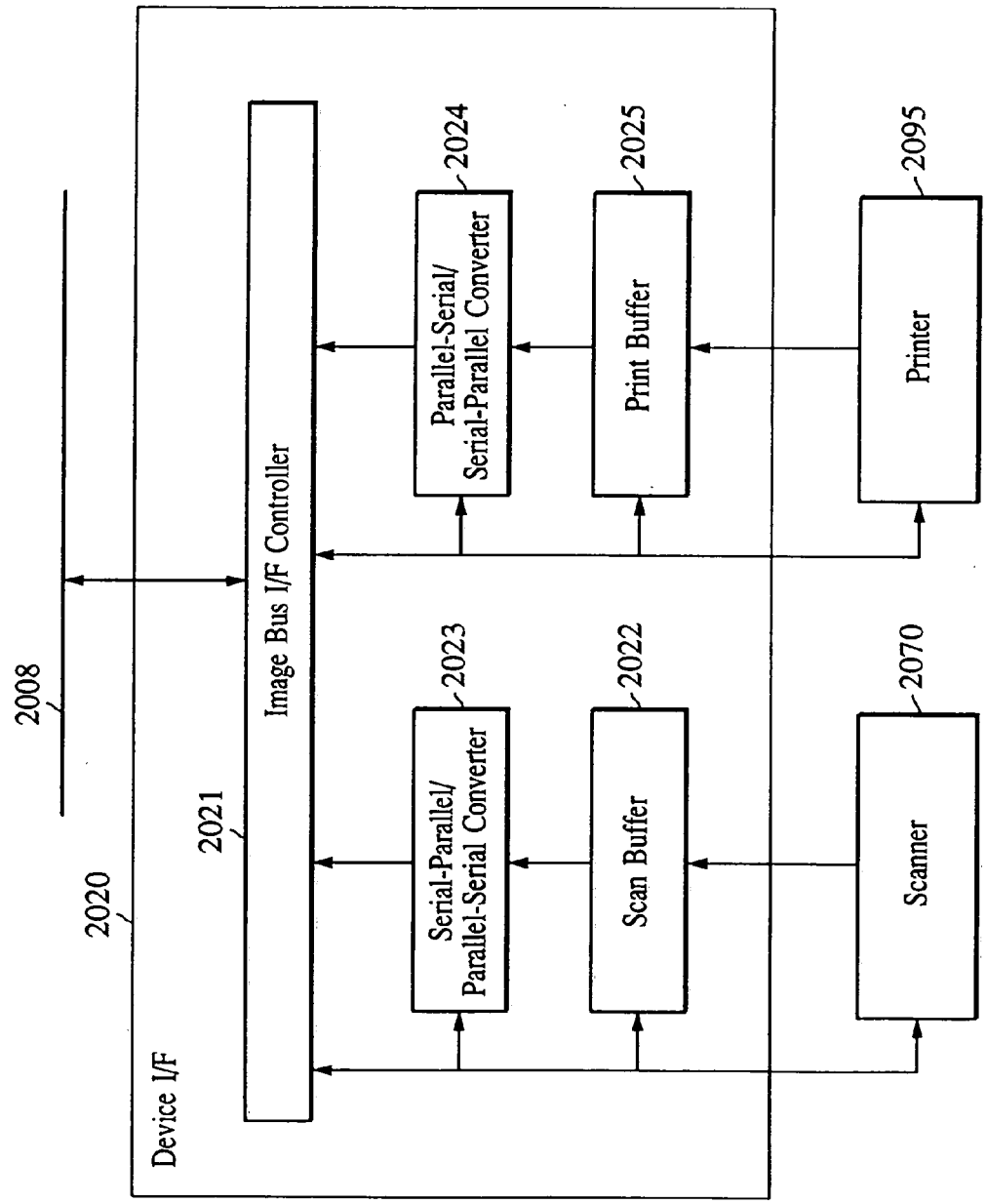
FIG. 11 is a block diagram illustrating a device I/F.

FIG. 11 illustrates the construction of the device I/F 2020.

An image bus I/F controller 2021 is connected to the image bus 2008 so that is serves to control the bus access sequence and also control the operation, including timing control, of various devices of the device I/F 2020. The image bus I/F controller 2021 also generates a control signal to the external scanner 2070 and the external printer 2095. A scan buffer 2022 temporarily stores image data received from the scanner 2070 and outputs the image data in synchronization with the image bus 2008. A serial-parallel/parallel-serial converter 2023 combines or breaks down the image data stored in the scan buffer 2022 so as to convert the image data into a form having a data width which matches the image bus 2008. A parallel-serial/serial-parallel converter 2024 breaks down or combines the image data received from the image bus 2008 so as to convert the image data into a form having a data width which matches the print buffer 2025. The print buffer 2025 temporarily stores the image data received from the image bus 2008 and outputs it in synchronization with the printer 2095.

The procedure of scanning an image is now described below.

The image data transmitted from the scanner 2070 is stored in the scan buffer 2022 in synchronization with the timing signal transmitted from the scanner 2070. In the case where a PCI bus is employed as the image bus 2008, when the amount of the image data stored in the buffer becomes 32 bits or more, 32-bit image data is transferred in a first-in first-out fashion from the buffer to the serial-parallel/parallel-serial converter 2023, which in turn converts the received data into 32-bit image data and transmits the resultant image data over the image bus 2008 via the image bus I/F controller 2021. On the other hand, when an IEEE1394 bus is employed as the image bus 2008, the image data stored in the buffer is transferred in a first-in first-out fashion to the serial-parallel/parallel-serial converter 2023, which in turns converts the received data to serial image data and transmits the resultant data over the image bus 2008 via the image bus I/F controller 2021.

The image printing operation is described below.

In the case where the image bus 2008 is realized by a PCI bus, the image bus I/F controller transfers 32-bit image data received via the image bus to the parallel-serial/serial-parallel converter 2024, which in turn breaks down the image data into bits matching the input data of the printer 2095. The resultant data is stored in the print buffer 2025. On the other hand, when the image bus 2008 is realized by an IEEE1394 bus, the image bus I/F controller transfers serial image data received via the image bus to the parallel-serial/serial-parallel converter 2024, which in turn converts the image data in such a manner as to have bits matching the input data of the printer 2095. The resultant data is stored in the print buffer 2025. The image data stored in the buffer is transferred in a first-in first-out fashion to the printer 2095 in synchronization with the timing signal transmitted from the printer 2095.

2. Software 2.1 General Construction of Software Blocks

Figure 12:
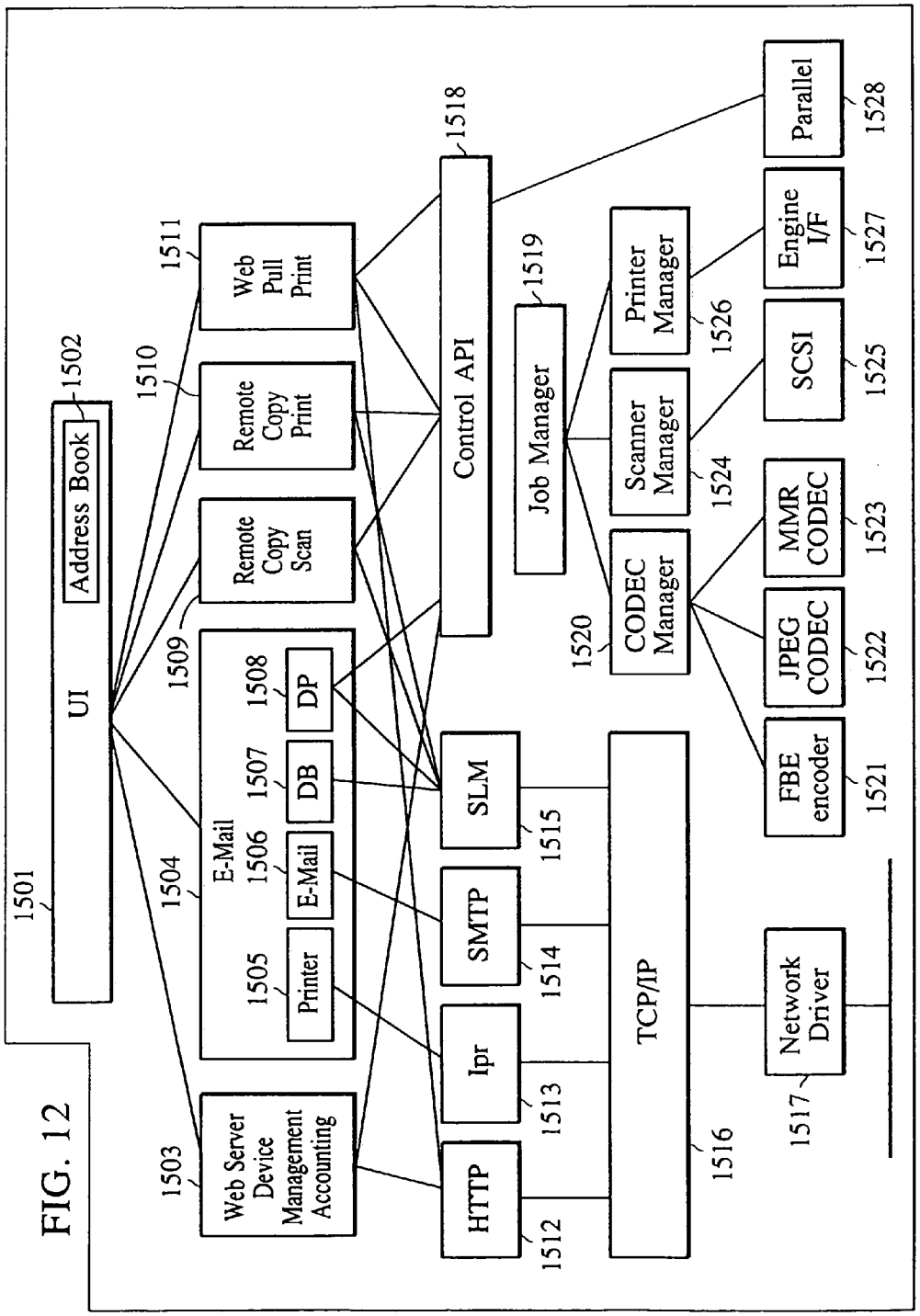
FIG. 12 is a block diagram generally illustrating the software used in the image processing apparatus.

FIG. 12 is a software block diagram of the image processing apparatus 1001.

A user interface (UI) 1501 serves as a module for interfacing with various devices in the image processing apparatus when a user performs various operations or settings. In response to an operation performed by the user, this module transmits input information to various modules which will be described later so as to issue a processing request or a data setting command.

In FIG. 12, reference numeral 1502 denotes an address book which is a database module for managing the destination of data. In accordance with the operation information given by the UI 1501, data is added, deleted, and/or acquired to/from the address book 1502 thereby giving information about the data destination specified by the user to various modules which will be described later. The address book stores data representing the data formats, the types of images allowed to be transmitted, and the resolutions, in relation to the respective destinations.

In response to a request from a web client, a web server module 1503 transmits management information associated with the image processing apparatus to the web client. The management information is read via a control API 1518, which will be described later, and is transmitted to the web client via an HTTP module 1512, a TCP/IP module 1516, and a network driver 1517, which will be described later.

A universal sending module 1504 serves to send various data. That is, the universal sending module 1504 sends data specified by the user via the UI 1501 to a destination specified by the user. In the case where the user issues a command requesting that data to be sent should be generated by the scanner function of the image processing apparatus, the data is generated by operating devices via the control API 1518 which will be described later.

A printer module 1505 is executed when the universal sending module 1504 designates the printer as the destination of image data.

An E-mail module 1506 is executed when the universal sending module 1504 designates an E-mail address as the destination of image data.

A database module 1507 is executed when the universal sending module 1504 designates the database as the destination of image data.

A DP module 1508 is executed when the universal sending module 1504 designates an apparatus similar to the present image processing apparatus as the destination of image data.

A remote copy scan module 1509 is executed when image data is generated by the scanner function of the present image processing apparatus and the resultant image data is transmitted to another apparatus connected via a network or the like thereby performing a process similar to a copy process which can be performed by the present image processing apparatus itself.

A remote copy print module 1509 is executed when image data is input to the image processing apparatus from another apparatus connected via a network or the like and the image data is output using the printer function of the present image processing apparatus thereby performing a process similar to a copy process which can be performed by the present image processing apparatus itself.

A web pull print module 1511 reads home page information via the Internet or an intranet and prints the obtained information.

An HTTP module 1512 is used when communication is performed in accordance to the HTTP. This module allows the web server 1503 and the web pull print module 1511 to perform communication via a TCP/IP module 1516 which will be described later.

An Ipr module 1513 allows the printer module 1505 in the universal sending module 1504 to perform communication according to the Ipr via the TCP/IP 1516 which will be described later.

An SMTP module 1514 allows the E-mail module 1505 in the universal sending module 1504 to perform communication according to the SMTP via the TCP/IP 1516 which will be described later.

A salutation manager module 1515 allows the database module 1517, the DP module 1518, the remote copy scan module 1509, and the remote copy print module 1510, in the universal sending module 1504, to perform communication according to the salutation architecture.

A TCP/IP communication module 1516 allows various modules described above to perform network communication in accordance with the TCP/IP via a network driver 1517 which will be described later.

The network driver 1517 controls physical devices connected to the network.

The control API 1518 provides an interface between an upstream module, such as an universal sending module 1504, and a downstream module such as a job manager 1519 which will be described later. The control API 1518 allows a reduction in the degree of dependence between upstream and downstream modules thereby allowing the modules to be used in a more general manner.

The job manager 1519 interprets a processing command given by various modules described above via the control API 1518, and transmits a command to various modules which will be described later. This job manager manages various processes performed by hardware of the image processing apparatus, in a centralized fashion.

A CODEC manager 1520 controls and manages the data compression/decompression process, of various processes requested by the job manager 1519.

An FBE encoder 1521 compresses data input via the scanning process performed by the job manager 1519 and the scan manager 1524 into the FBE format.

A JPEG CODEC 1522 performs JPEG compression on input data or performs JPEG mapping on data to be printed, during the reading and scanning process performed by the job manager 1519 and the scan manager 1524 and during the printing process performed by the print manager 1526.

An MMR CODEC 1523 performs MMR compression on input data or performs MMR decompression on data to be printed, during the reading and scanning process performed by the job manager 1519 and the scan manager 1524 and during the printing process performed by the print manager 1526.

The scan manager 1524 manages and controls the reading and scanning process commanded by the job manager 1519.

A SCSI driver 1525 performs communication between the scan manager 1524 and a scanner unit provided in the image processing apparatus.

The print manager 1526 manages and controls the printing process commanded by the job manager 1519.

An engine I/F driver 1527 provides an interface between the print manager 1526 and the printer.

A parallel port driver 1528 provides an interface between the web pull print module 1511 and an external output device (not shown in FIG. 12) when the web pull print module 1511 outputs data to the output device via a parallel port.

Of various modules described above, only particular modules required to drive desired devices may be set and used.

2.2 Applications

A built-in applications according to the present embodiment are described below with reference to some figures.

Figure 13:
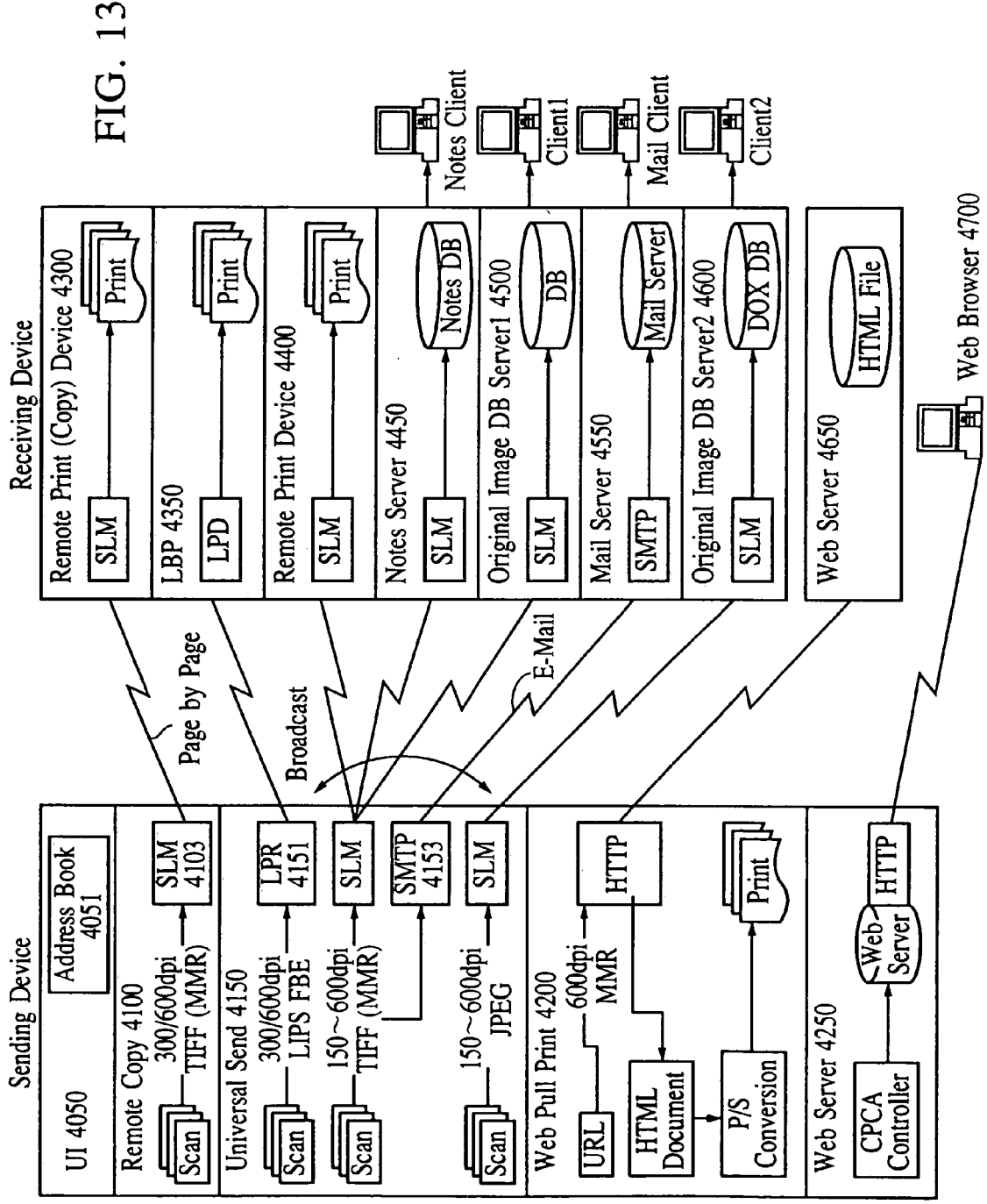
FIG. 13 is a block diagram illustrating applications associated with the processes according to the embodiment of the invention.

FIG. 13 is a block diagram illustrating built-in applications used in the processes according to the present embodiment. In FIG. 13, a large block on the left side of the figure includes applications in which the image processing apparatus 1001 mainly serves as a sending device (master device or active device), and a large block on the right side of the figure includes applications in which the image processing apparatus 1001 mainly serves as a receiving device (slave device or passive device). In this figure, similar reference numerals, device names, and other terms are used in a similar fashion to those used in the previous figures. Of various applications described below, only some applications required for desired devices may be set and used.

A block 4050 is a user interface application block in which a process associated with the address book 4051 is also performed.

A block 4100 is involved in the process performed by a sending device (reading device) in a remote copy application.

A block 4150 is involved in the broadcast process performed by the sending device.

A block 4200 is involved in the process performed by the web pull print module.

A block 4250 is involved in the process performed by the web server module.

A block 4300 is involved in the process performed by a receiving device (printer device) in the remote copy process.

A block 4350 is involved in the process of receiving and printing image data transmitted by means of broadcasting, using a general-purpose printer.

A block 4400 is involved in the remote print process performed by a receiving device (printer device).

A block 4450 is involved in the process performed by a notes server, which is known in the art, to receive and store image data transmitted by means of broadcasting.

A block 4500 is involved in the process performed by the database module to receive and store image data transmitted by means of broadcasting.

A block 4550 is involved in the process performed by a mail server module, which is known in the art, to receive and store image data transmitted by means of broadcasting.

A block 4600 is involved in the process performed by a database module to receive and store image data (multilevel image data)transmitted by means of broadcasting.

A block 4650 is a web server module containing information contents and having functions known in the art.

A block 4700 is a web browser module having various functions, which are known in the art, required to access the web server.

Various applications are described in further detail below with reference to the associated blocks.

2.2.1 User Interface Applications

The functions of the user interface block 4050 have already been described in detail earlier. The address book 4051 functions as follows. The address book is stored in a nonvolatile storage device (a hard disk or a nonvolatile memory with battery backup). The address book includes data representing the features and characteristics of devices connected to the network. Specific examples are shown below.

Formal names of devices and their aliases
Network addresses of devices
Network protocols that devices can accept
Document formats that devices can accept
Compression types that devices can accept
Image resolution that devices can accept
Paper sizes and information about paper feeders, if a device is a printer
Names of folders in which a document can be stored, if a device is a server (computer)

In the applications described below, the features and characteristics of devices can determine the feature and characteristics of destinations on the basis of the information described in the address book 4051.

The user can edit the address book. An address book may also be downloaded from a server computer on the network. Furthermore, an address book stored in a server computer on the network may be directly referred to.

2.2.2 Remote Copy Application

The remote copy application determines the resolution that the device designated as the destination on the basis of the information described in the address book 4051 and compresses the image data (two-level image data) obtained via the scanner using the MMR compression technique known in the art depending on the resolution. The image data is then converted into the TIFF (tagged image file format) form and transmitted via the SLM 4103 to the printer connected to the network (4100). Although not described in detail here, the SLM 4103 is one of network protocols, known as a salutation manager (or smart link manager) containing device control information.

2.2.3 Broadcast Application

Unlike the remote copy application, the broadcast application can transmit document image data obtained via one scanning operation to a plurality of destinations (4150). The destinations are not limited to printer devices but server computers can also be destinations to which data is directly transmitted.

That is, the image processing apparatus can distribute the image data input by the scanner 2070 etc. to a plurality of devices via the network 2010 and the modem 2050.

The operation is described below for the respective destinations.

In the case where it is determined from the data described in the address book 4051 that a destination device is capable of communicate using the network printer protocol LPD (Line Printer Daemon) and also capable of accepting printer control commands described in the LIPS, an image is read in accordance with the image resolution determined also from the address book 4051 and the obtained image data is compressed according to the FBE (First Binary Encoding) technique in this specific embodiment. The compressed image data is then coded according to the LIPS and the resultant data is transmitted to the destination device using the LPR which is one of known network printer protocol (4350).

In the case where a destination device is a server capable of communicating via the SLM, the address of the server and the designated folder in the server are detected from the address book 4051, and image data (two-level image data) obtained via a scanner is compressed according to the MMR technique and converted into the TIFF (Tagged Image File Format) form, as in the remote copy application. The result-ant image data is stored in a particular folder of the server connected to the network (4500).

When image data is transferred from the present image processing apparatus 1001 to a server which is determined, from the address book, to be capable of accepting multilevel image data compressed according to the JPEG standard, multilevel image data obtained in a similar manner to the two-level image data described above is compressed according to the JPEG standard and converted into a JFIF form. The resultant image data is then stored in a particular folder of the server connected to the network.

In the case where a destination device is an E-mail server, its mail address is detected from the address book 4051. Two-level image data obtained via the scanner is compressed according to the MMR technique and converted into the TIFF (Tagged Image File Format) form. The resultant image data is transmitted to the E-mail server using the SMTP (Simple Mail Transfer Protocol) 4153 which is well known in the art. After that, the image data is further transmitted from the E-mail server using the mail server module 4550.

3. User Interface

The user interface application is now described below.

FIG. 4 illustrates the outline of the user interface.

3.1 Control Screen

Figure 14:
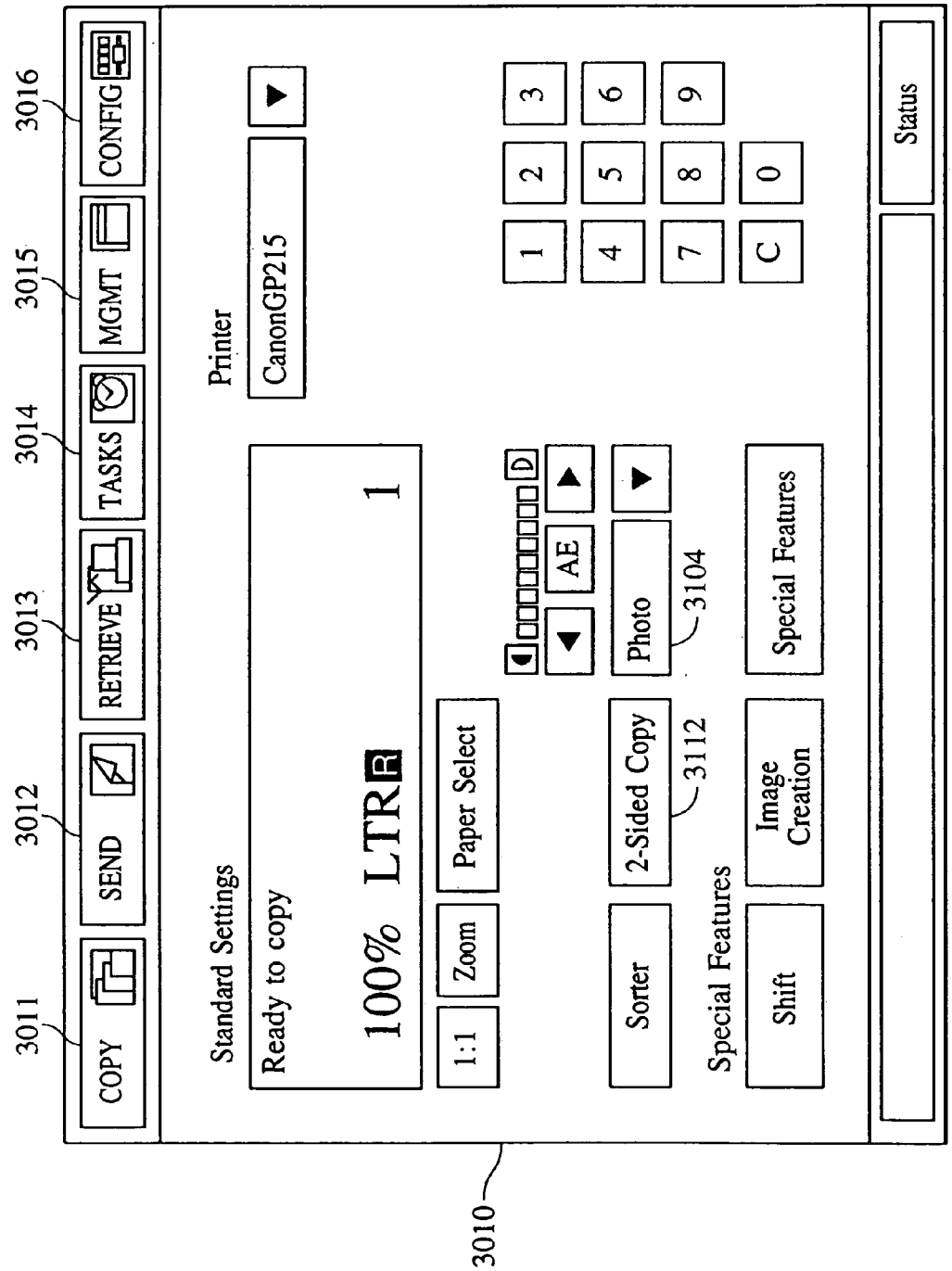
FIG. 14 is a schematic diagram illustrating a control screen displayed on an LCD display device of the control panel.

The functions provided by the image processing apparatus 1001 can be classified into six categories: Copy, Send, Retrieve, Tasks, Management, and Configuration, which correspond to six main tabs, COPY, SEND, RETRIEVE, TASKS, MGMT, CONFIG (3011–3016) displayed at the top of the control screen (refer to FIG. 14). If one of main tabs is pressed (via a touch panel), a screen corresponding to the selected category appears. If the selected category is not allowed, the color of the pressed tab changes and no other responses occur.

The category "Copy" includes the function, similar to that provided by a stand-alone copying machine, of making a copy of a document using the scanner and the printer included in the image processing apparatus, and also includes the function of making a copy of a document using the scanner included in the image processing apparatus and a printer connected to the image processing apparatus via the network.

The function "Send" sends an image of a document scanned by the scanner included in the image processing apparatus. The image data can be transmitted to devices such as a remote printer or into a database in a device via an E-mail, a facsimile, or an FTP. The data may be transmitted to a plurality of destinations, if desired.

"Retrieve" acquires a document from an external device and prints it using the printer included in the image processing apparatus. The document may be acquired via the WWW, an E-mail, the FTP (File Transfer Protocol), or facsimile transmission.

"Tasks" generates and manages tasks of automatically processing documents received from external devices via facsimile or the Internet and also tasks of periodically retrieving data.

"Management" manages the job address book, bookmarks, documents, and accounting information.

"Configuration" sets the image processing apparatus itself (in terms of the network, clock, etc.).

The method of setting these functions is described below with reference to LCD display screens.

3.2 ID Input Screen

Figure 15:
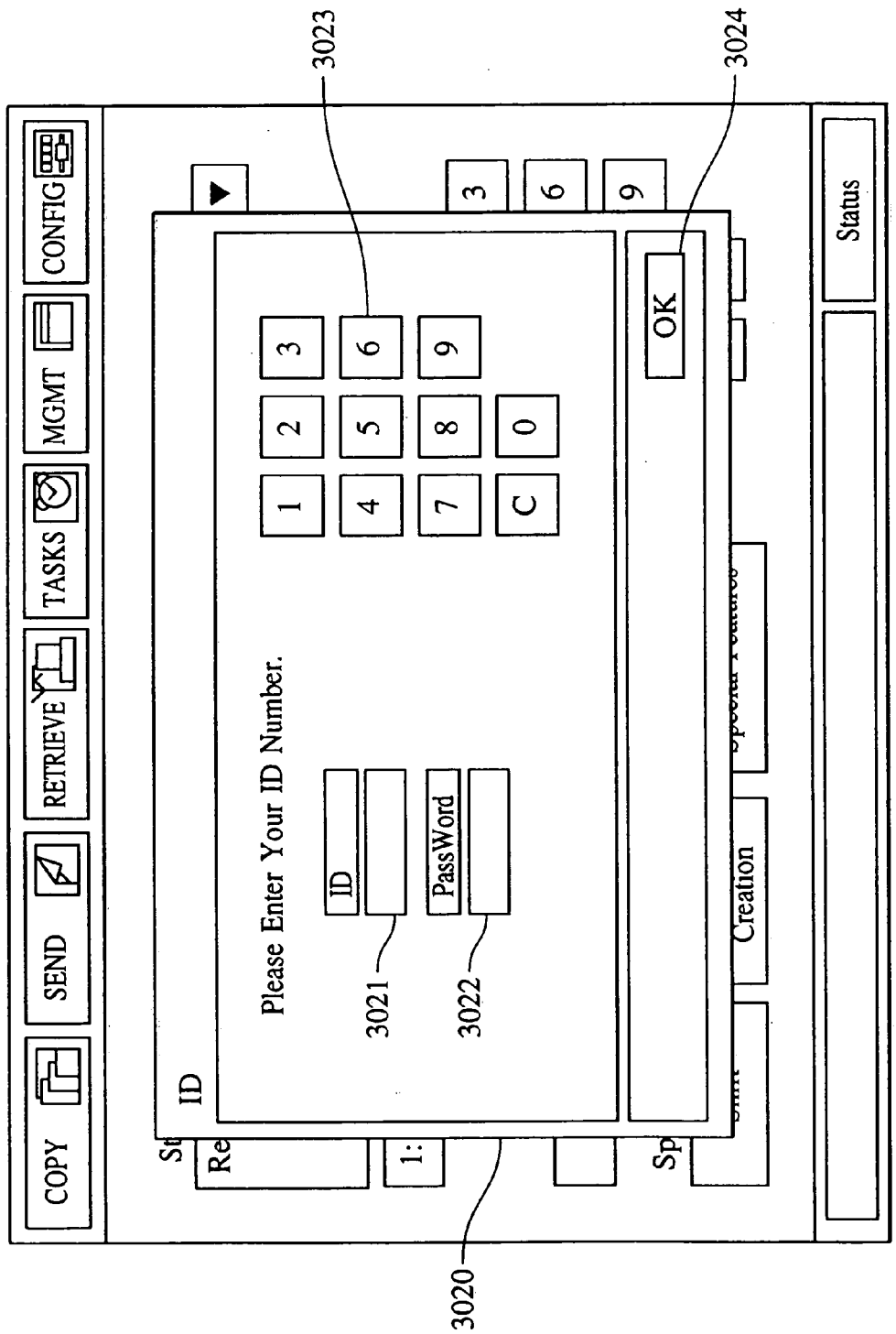
FIG. 15 is a schematic diagram illustrating an ID input screen for inputting ID data.
Figure 16:
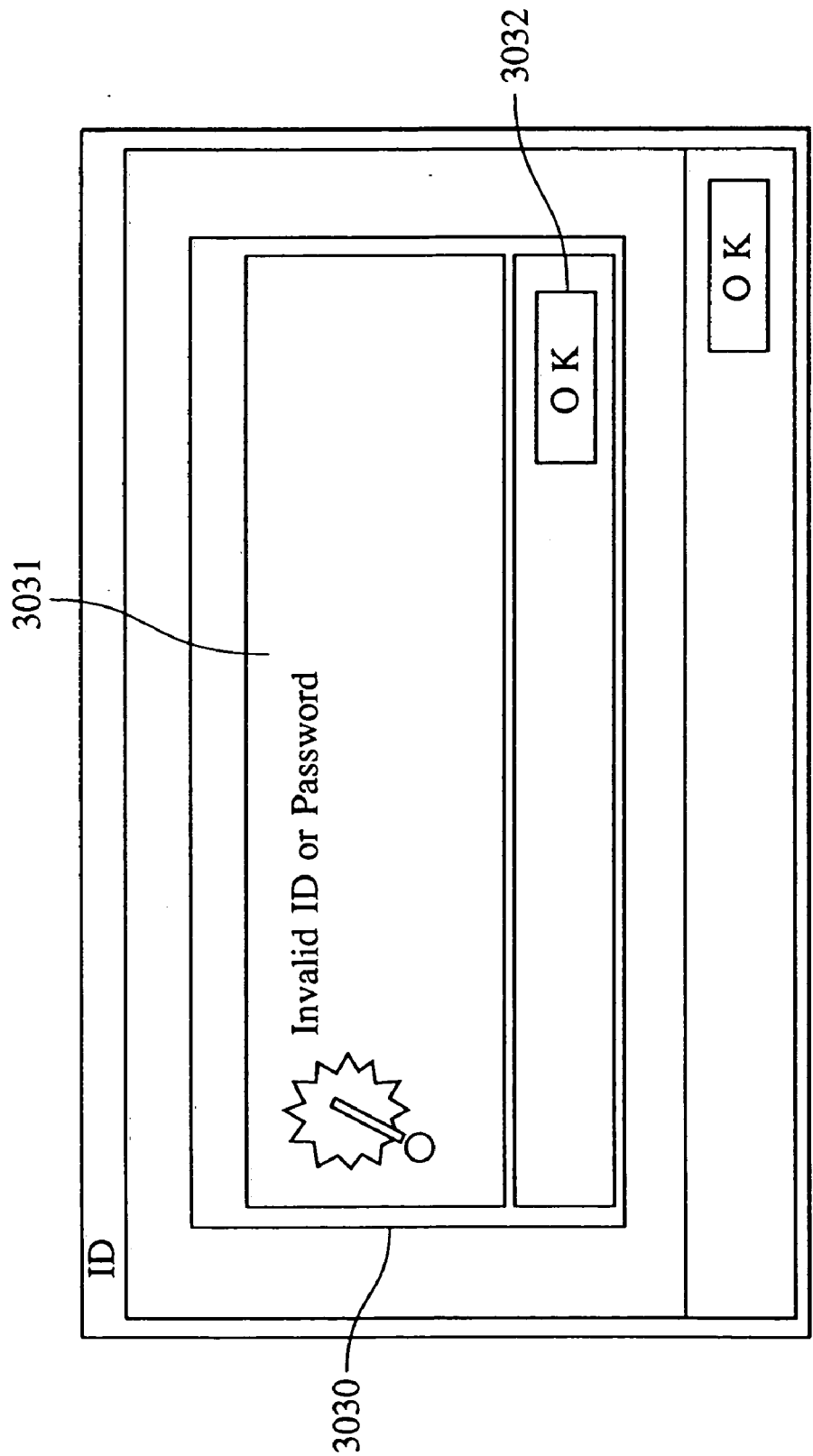
FIG. 16 is a schematic diagram illustrating an error screen which is displayed when an error occurs.

When the electric power is turned on or when an ID key 2016 is pressed, an ID input window appears (refer to FIG. 15). If an "OK" button 3024 is pressed after correctly inputting a user ID and password via the ID input window, the above-described control screen appears, via which the user can controls the operation. The ID input box (3021) and the password input box (3022) can be selected by directly pressing a desired box. If an invalid (not authorized) ID or password is input, an error message is displayed on the screen as shown in FIG. 16.

3.3 COPY Screen

When the COPY screen is displayed after selecting the COPY tab, if the start key 2014 is clicked, then the scanner starts to operate and copies of a document are output by a selected printer in accordance with the setting parameters (the scaling factor, the paper size, the number of copies) displayed on the screen.

Figure 17:
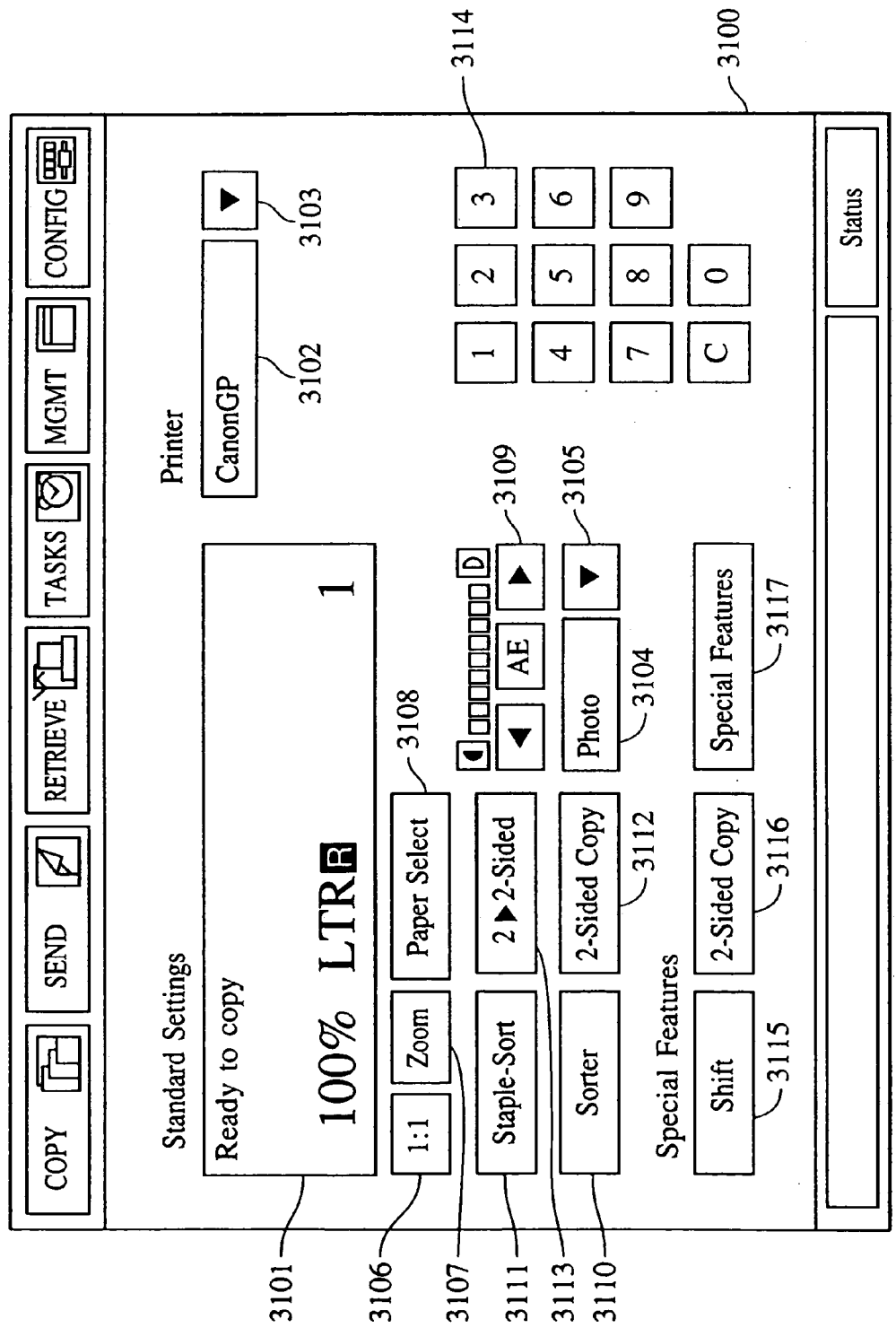
FIG. 17 is a schematic diagram illustrating a COPY main screen which is displayed in a COPY mode.

The COPY main screen (refer to FIG. 17) includes a printer selection button (3103) and a printer indication box (3102), an image quality selection button (3105) and an image quality indication box (3104), a copy parameter indication box (3101) similar to that of a stand-alone copying machine, scaling factor setting buttons (3106, 3107), a paper selection button (3108), a sorter setting button (3110), a two-sided copy setting button (3112), an intensity indicator and an intensity setting button (3109), and a ten-key pad (3114).

Figure 18:
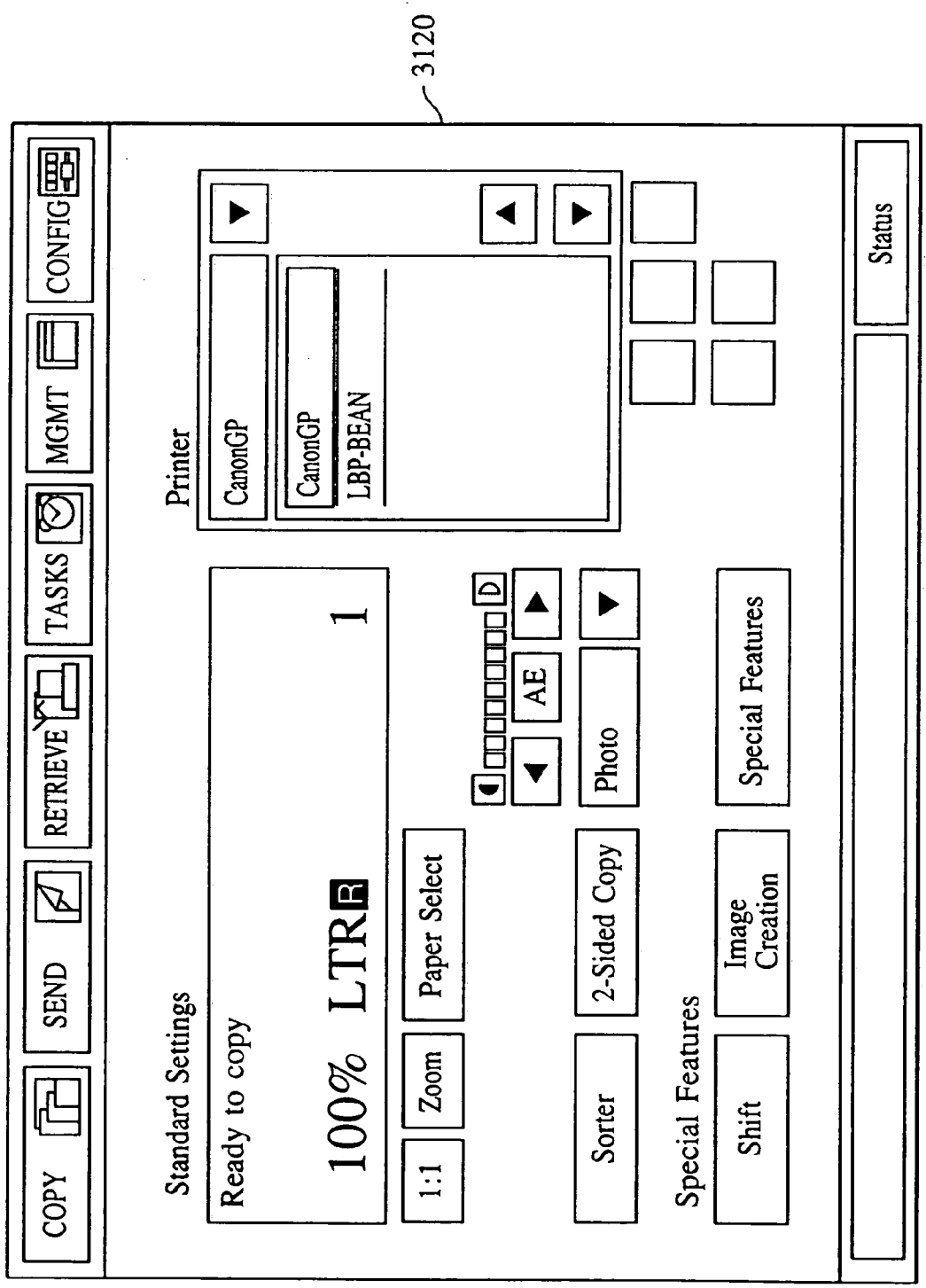
FIG. 18 is a schematic diagram illustrating a screen where a list of printers is displayed.

If the printer selection button (3103) is pressed, a list of names of available printers (the printer included in the image processing apparatus and other printers connected via the network) is displayed in the form of a pull-down menu (refer to FIG. 18). If a desired printer is selected from the list, the list disappears and the selected printer name displayed in the printer indication box (3102).

Figure 19:
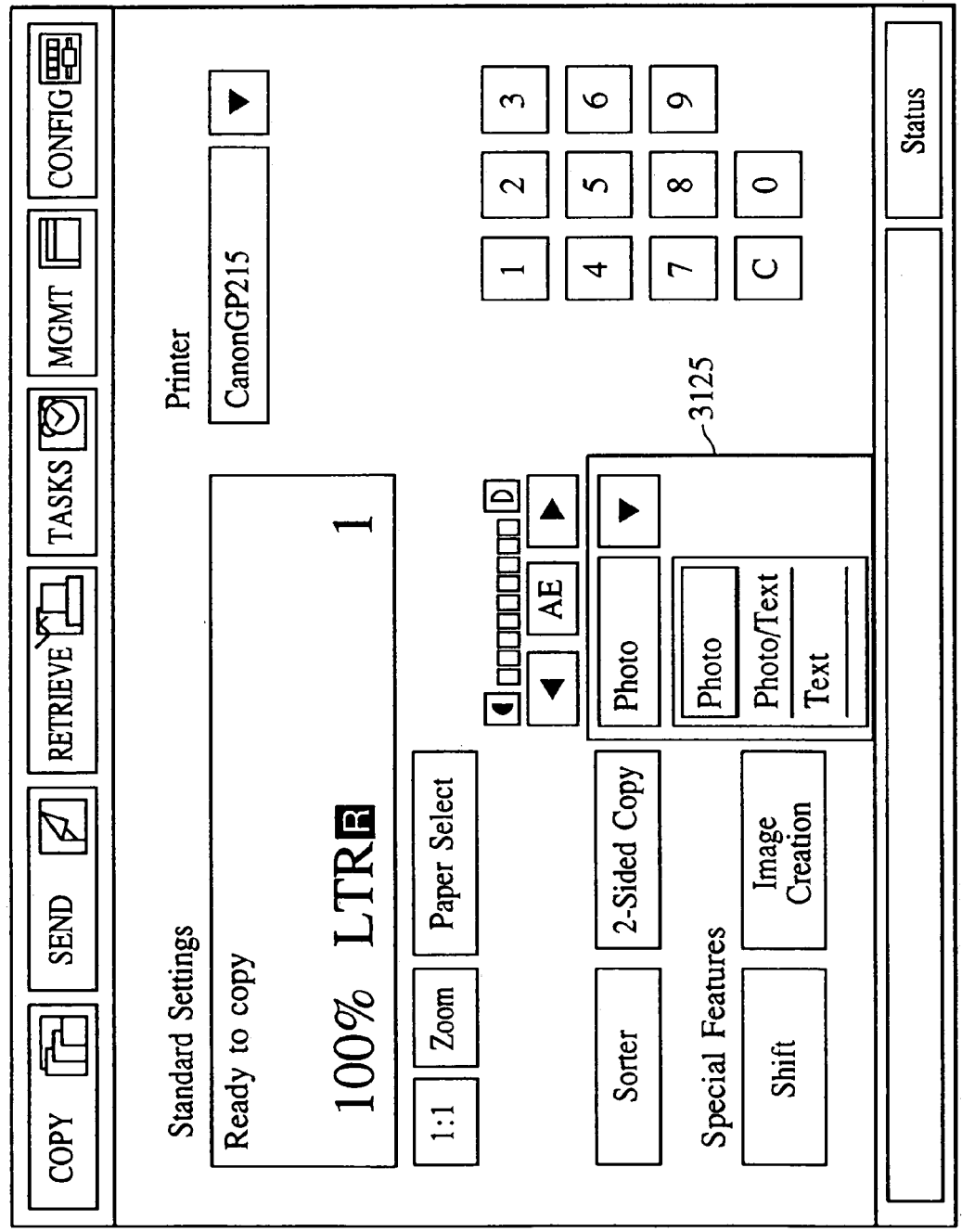
FIG. 19 is a schematic diagram illustrating a screen where a list of image qualities is displayed.
Figure 20:
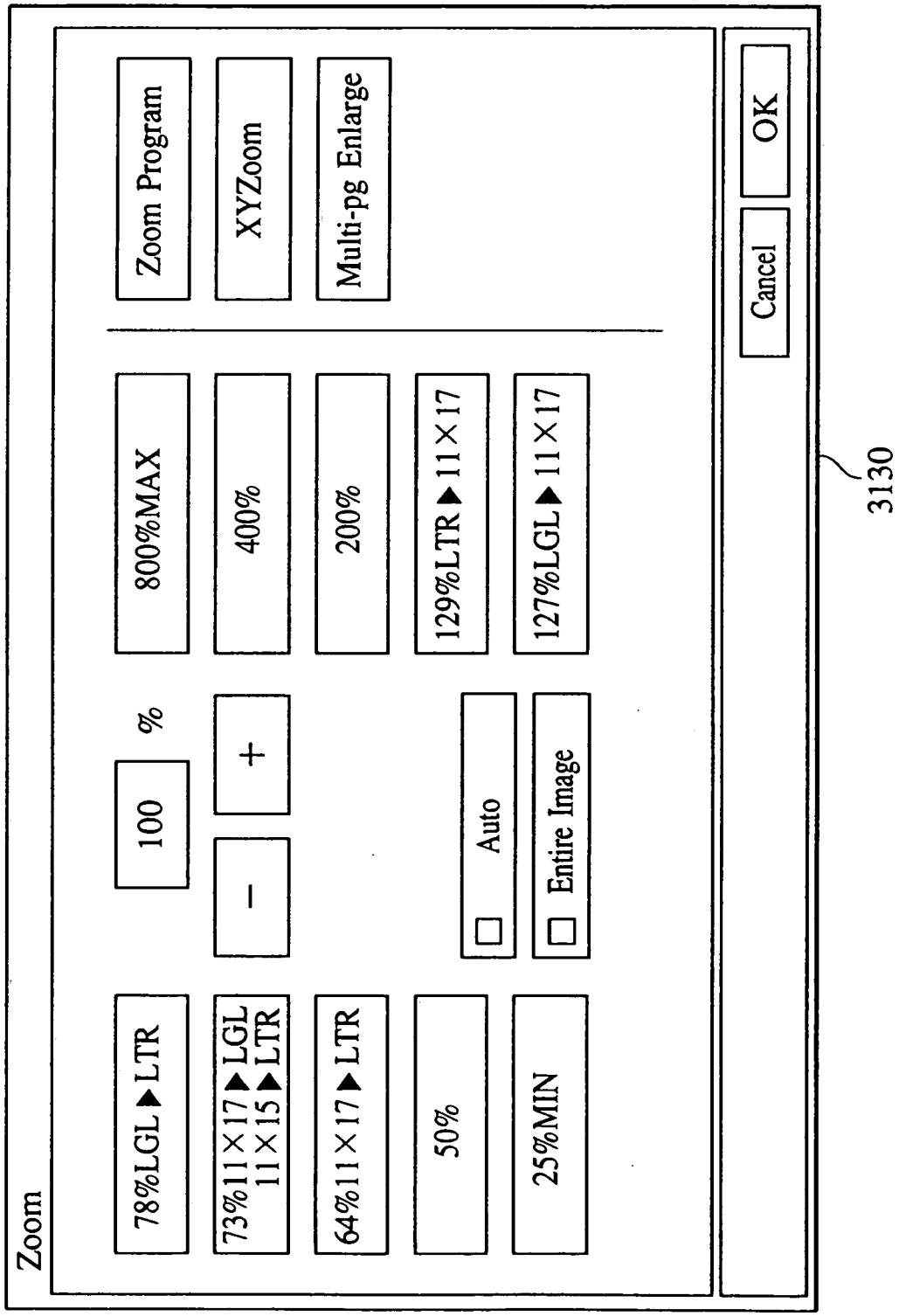
FIG. 20 is a schematic diagram illustrating a subscreen for setting a scaling factor.
Figure 21:
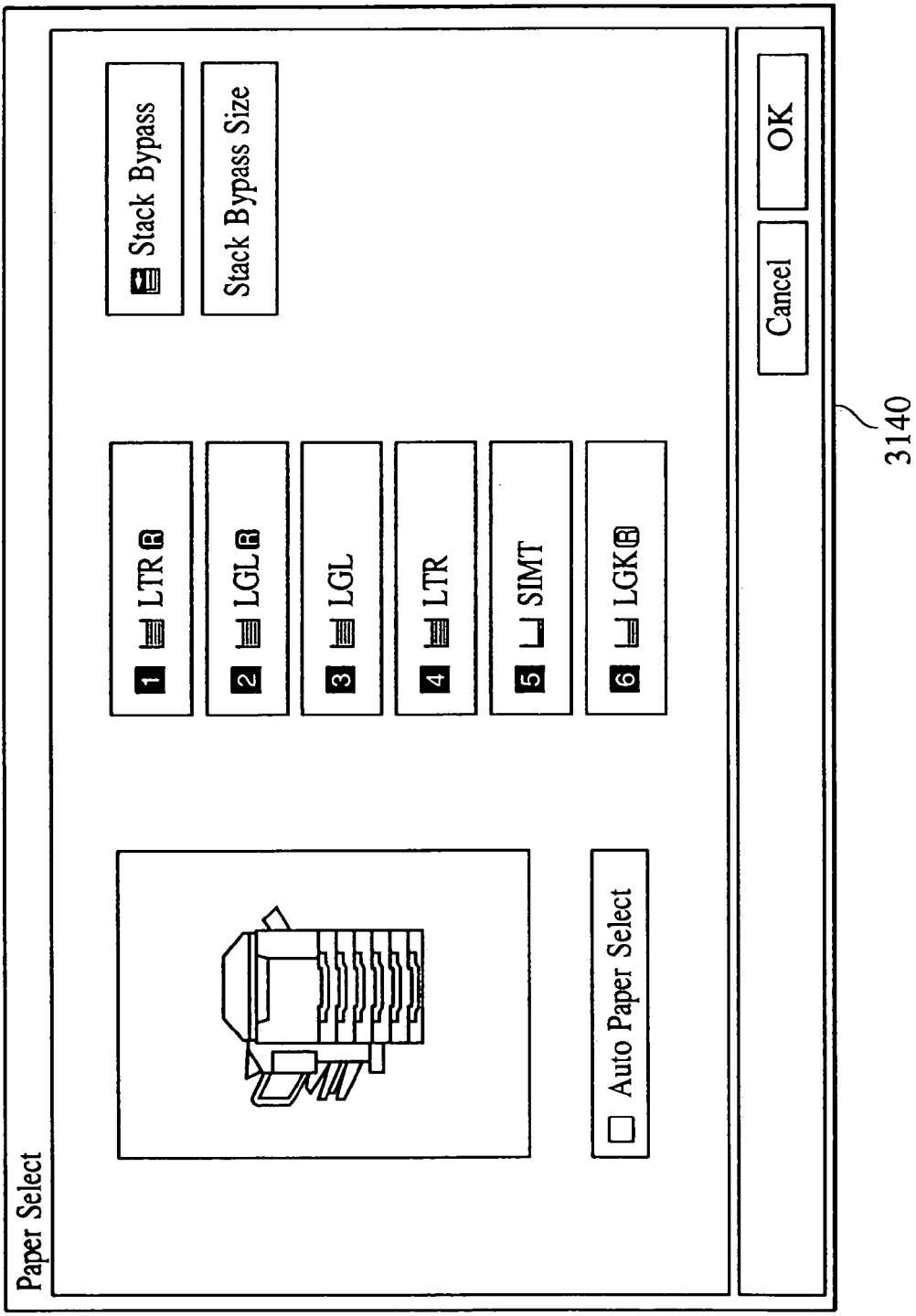
FIG. 21 is a schematic diagram illustrating a subscreen for selecting paper.
Figure 22:
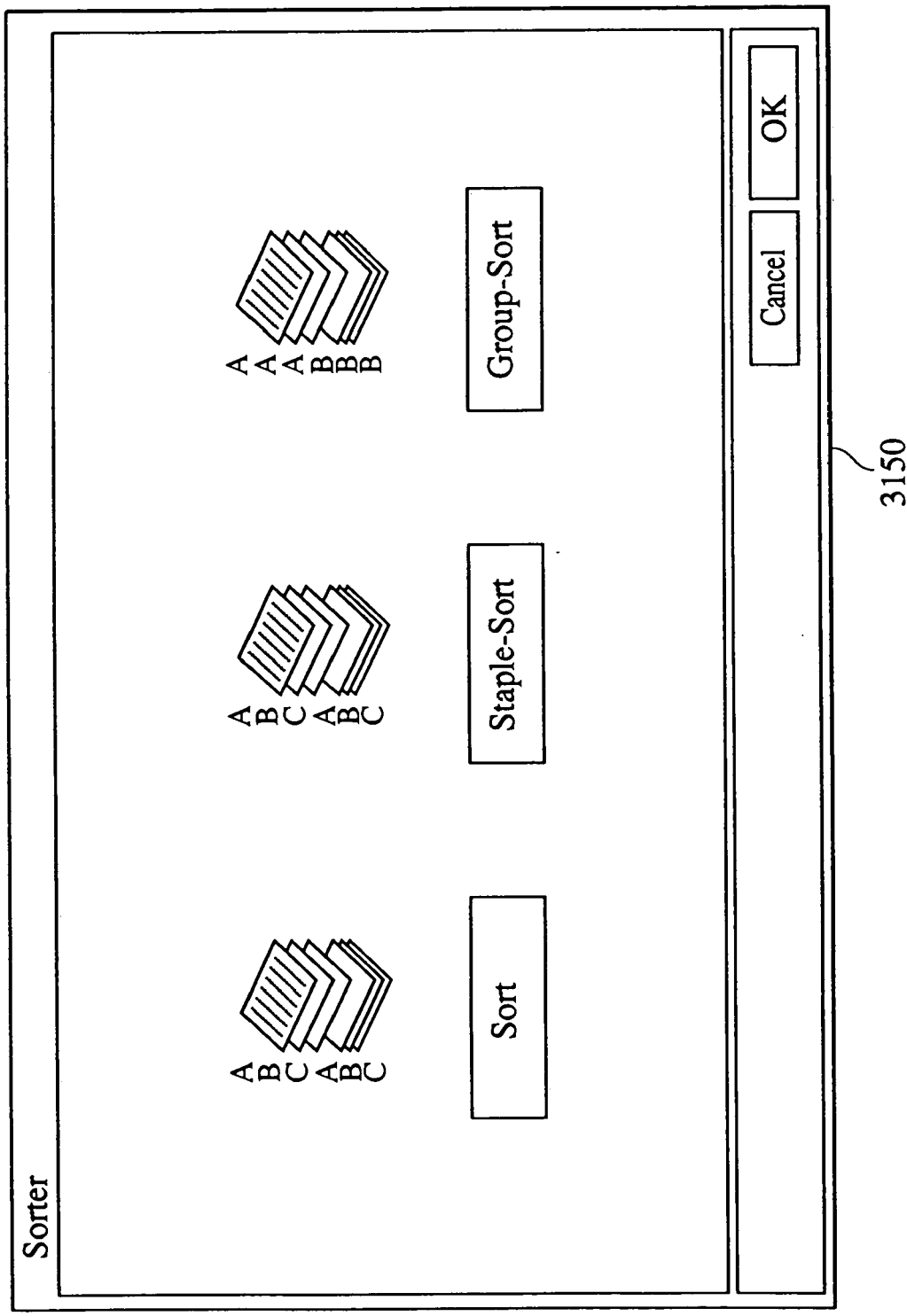
FIG. 22 is a schematic diagram illustrating a subscreen for setting a sorter.
Figure 23:
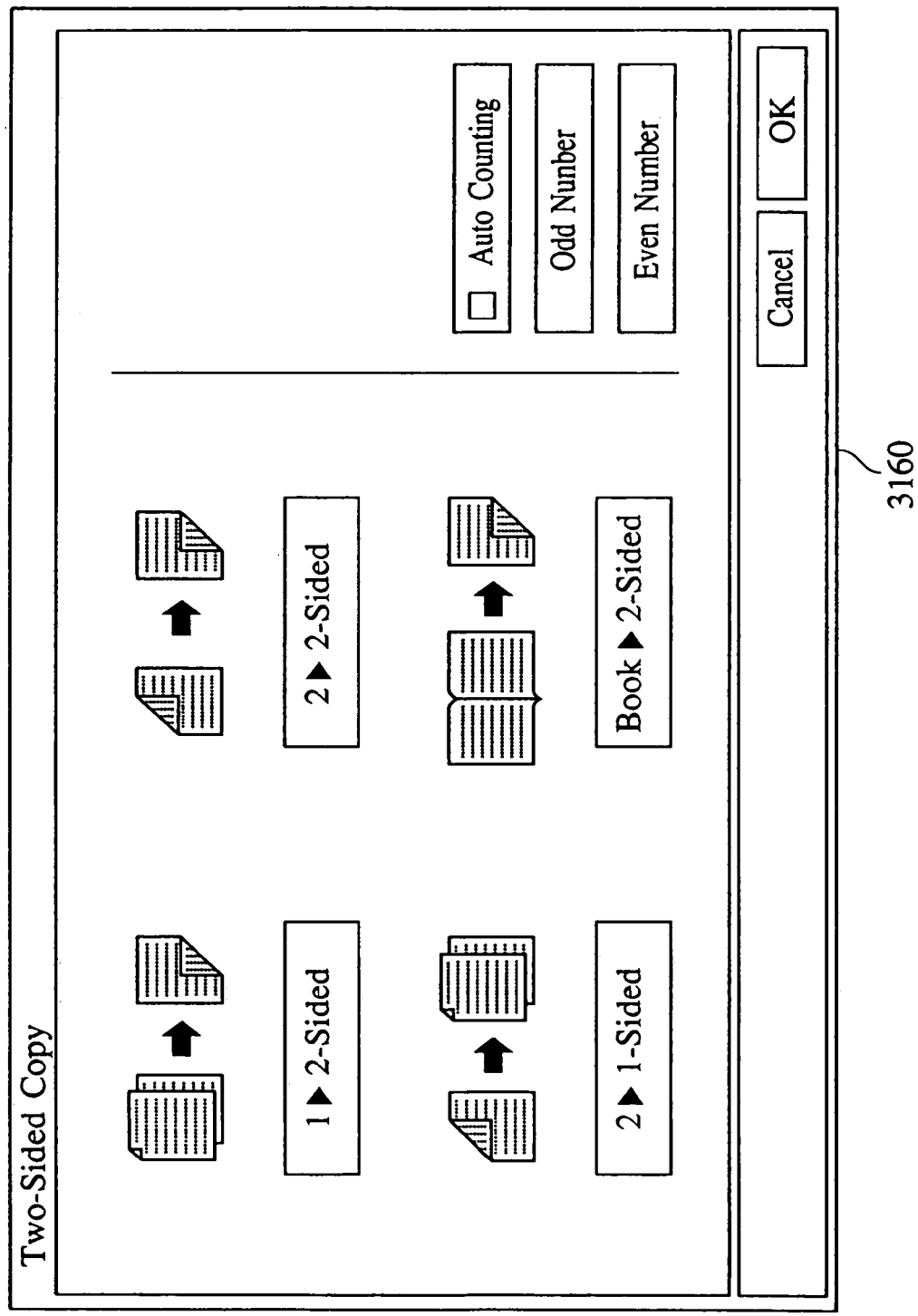
FIG. 23 is a schematic diagram illustrating a subscreen for setting a two-sided copying operation.

If the image quality setting button (3105) is pressed, a list of image qualities (refer to FIG. 19) is displayed so that a desired image quality (photo mode, character/photo mixed mode, character mode) can be selected from the list.

If a copy parameter setting button is pressed, a subscreen for setting the conditions (scaling factor, paper selection, sorter setting, two-sided copying setting) corresponding to the pressed button appears, so that the parameters can be set as in a stand-alone copying machine. The intensity setting can also be performed in a similar manner.

3.4 SEND Screen

In the SEND screen which appears when the SEND tab is pressed, if the start key 2014 is pressed after selecting a destination, then the scanner start to operate and the image data obtained via the scanner is transmitted to the selected destination by means of the designated transmission method. In the SEND mode, the information about the destination is given by character information and an icon indicating the category of the destination. Depending on the destination, an icon selected from a plurality of icons is displayed at a particular location assigned to that icon so that the category of the destination can be easily identified. This also makes it easy to select a destination and visually identify the selected destination.

Figure 24:
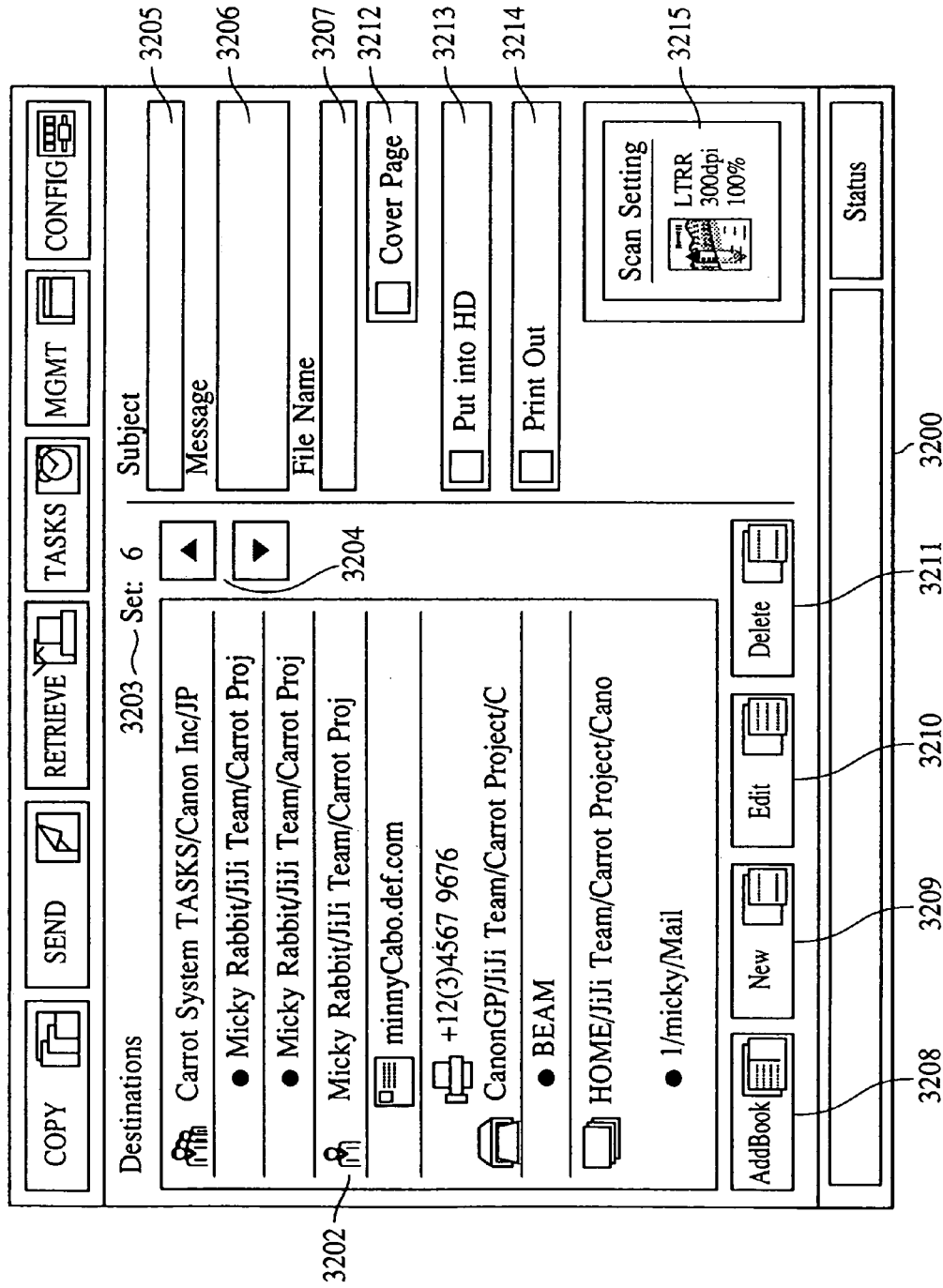
FIG. 24 is a schematic diagram illustrating a SEND main screen which is displayed in a SEND mode.
Figure 25:
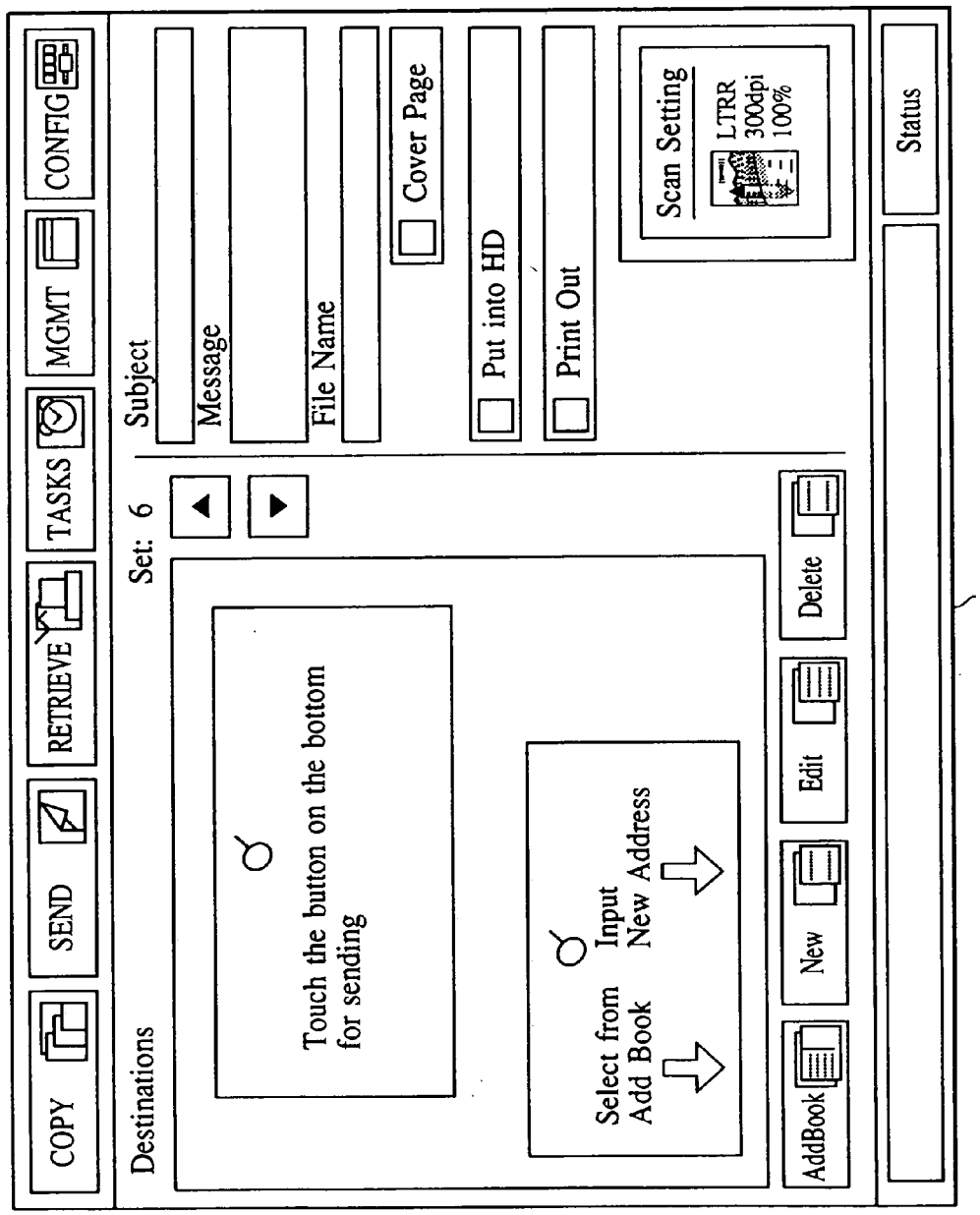
FIG. 25 is a schematic diagram illustrating the initial state of the SEND main screen which is displayed in the initial state in the SEND mode.

The SEND main screen (refer to FIG. 24) includes a destination indication area (3202), a number-of-destinations indication area (3203), a destination scroll button (3204), an address book button (3208), a "New" button (3209), an "Edit" button (3210), a "Delete" button (3211), a subject input box (3205), a message input box (3206), a file name input box (3207), a "Cover Page" check button (3212), a "Put into HD" check button (3213), a "Print Out" check button (3214), and a scan setting button (3215). When the image processing apparatus is initialized for example by pressing a reset key 2017 (see FIG. 4), no destination is displayed in the destination indication box as shown in FIG. 25, but operation instructions are displayed.

The list of destinations displayed in the destination indication area (3202) includes destinations which have already been input. If a new destination is input, it is added at the end of the list. The number-of-destination indication area (3203) indicates the number of currently registered destinations.

If the Delete button (3211) is pressed after selecting a destination from the list displayed in the destination indication area, then the selected destination is deleted from the list.

Figure 26:
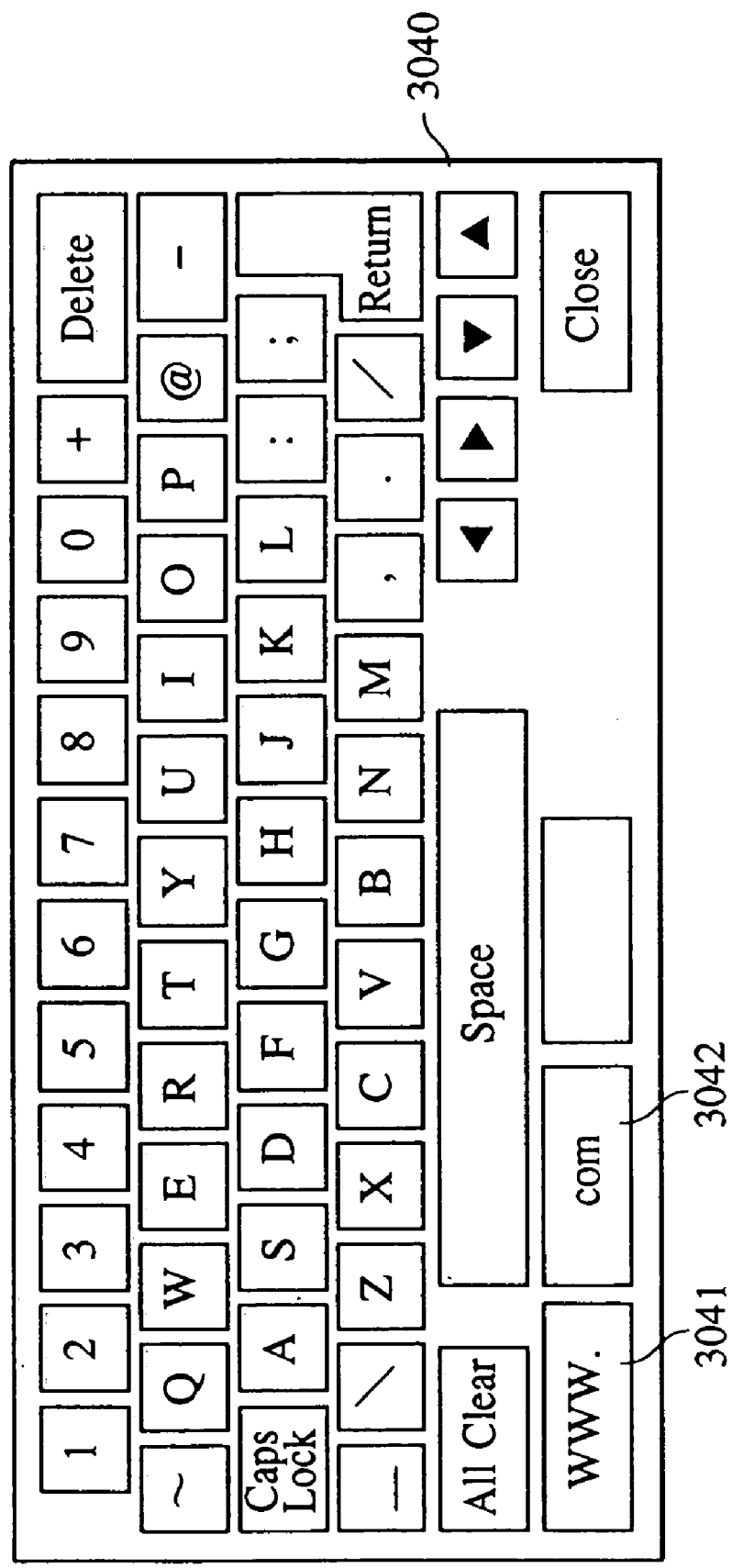
FIG. 26 is a schematic diagram illustrating a full keyboard displayed on the screen for inputting information.

The subject input box (3205), the message input box (3206), or the file name input box (3207) is pressed, a full keyboard is displayed as shown in FIG. 26 so that the user can input data via the full keyboard.

3.5 Address Book Subscreen

Figure 27:
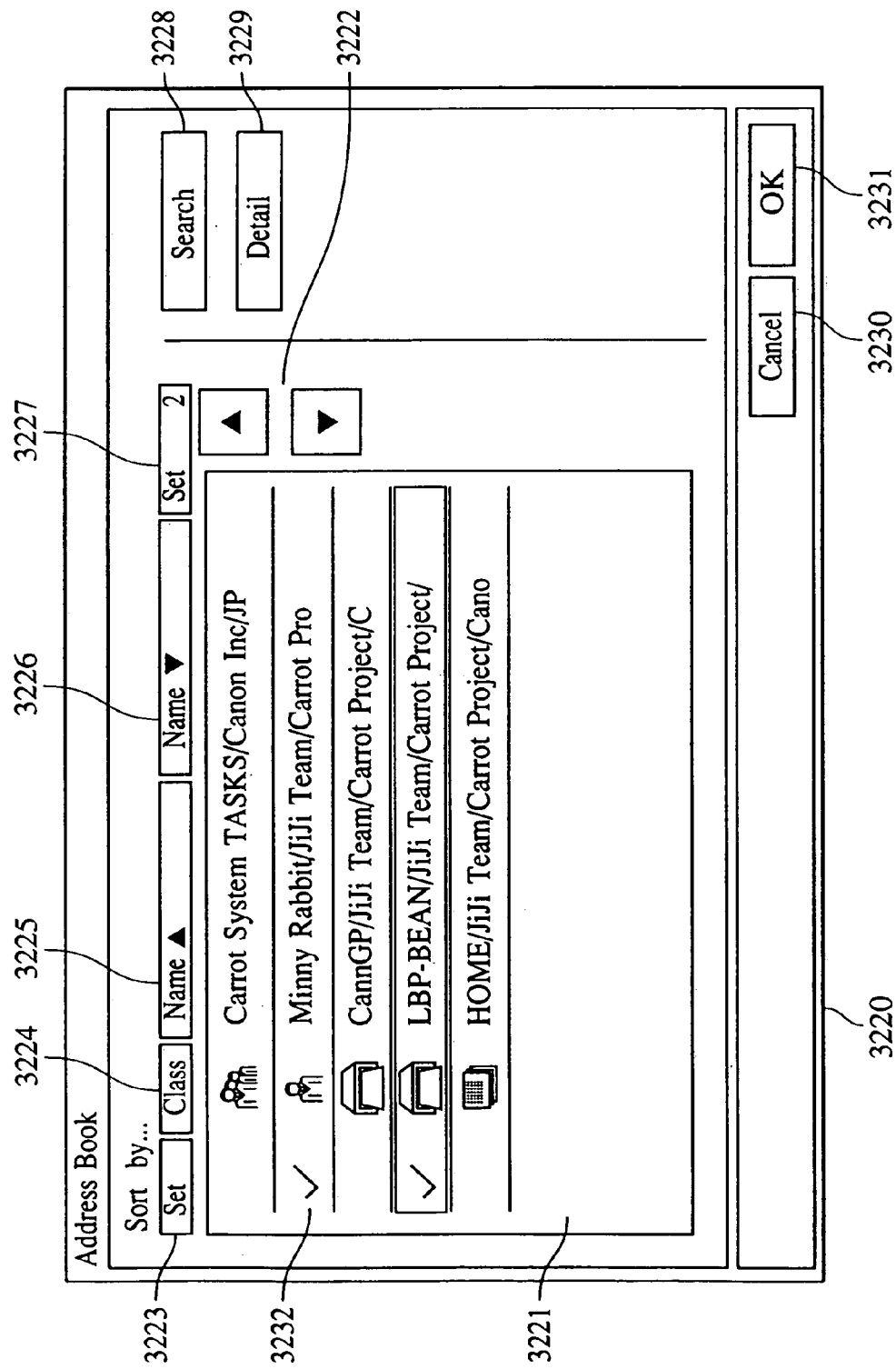
FIG. 27 is a schematic diagram illustrating an address book screen for displaying and selecting addresses.

If the address book button (3208) is pressed, an address book subscreen appears (refer to FIG. 27). After marking desired destinations with a selection mark (3232) on the address book display area (3221), if an "OK" button (3231) is pressed, then those marked destinations are added to the list of destinations displayed in the destination indication area (3202) of the SEND main screen. If one of setting buttons (3224–3226) is pressed, the list of destinations is sorted by the class (the type of output), the name in the ascending order, or the name in the descending order depending on the button pressed. The number-of-selected-destinations indication box (3227) indicates the number of destinations marked with a selection mark.

If the "OK" button (3231) or the "Cancel" button (3230) is pressed, the address book subscreen is closed, and the SEND main screen is displayed.

Figure 28:
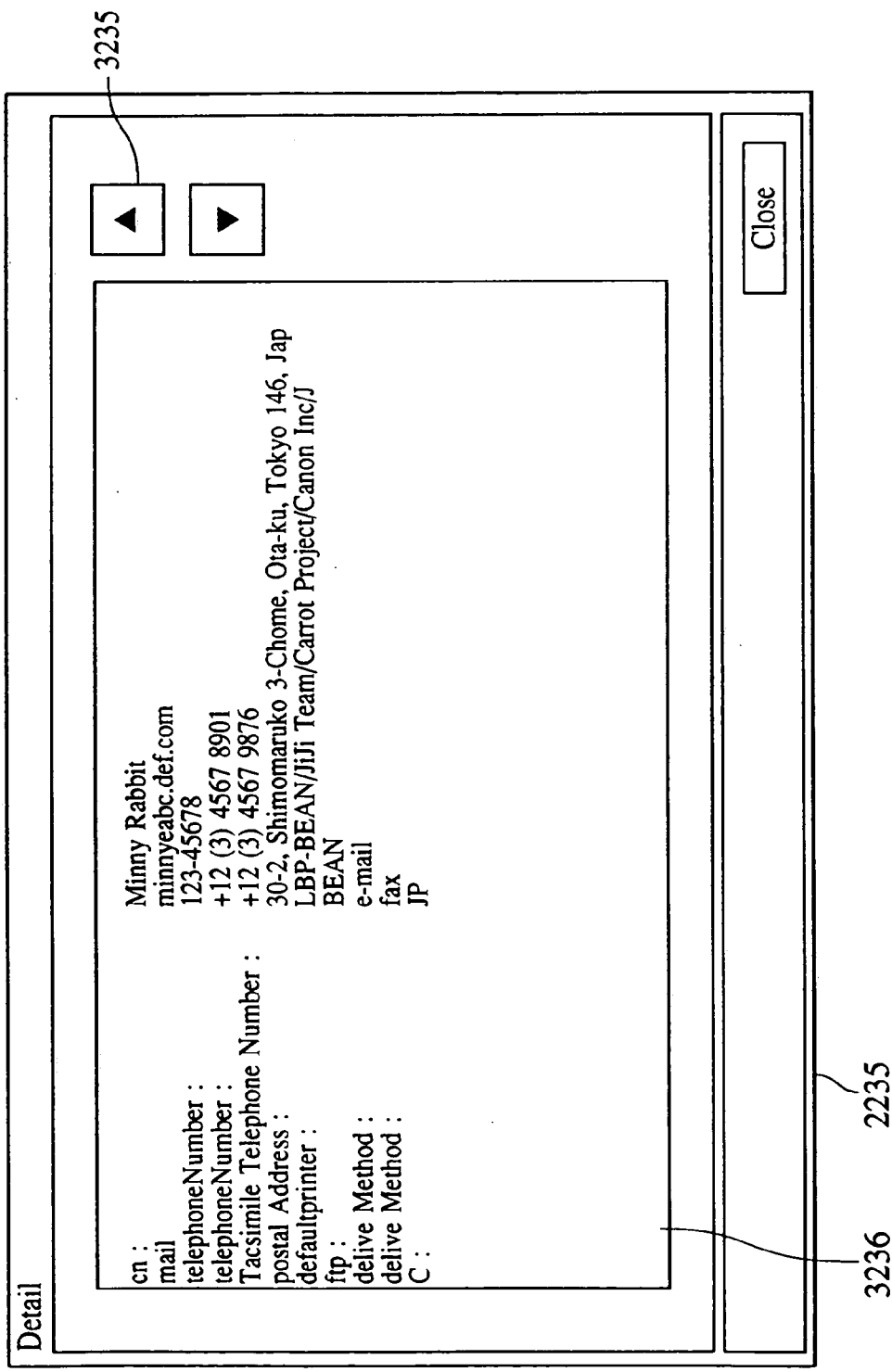
FIG. 28 is a schematic diagram illustrating detailed information about an address displayed on the screen.

When one of destinations is selected in the address book, if the "Detail" button (3229) is pressed, then a detail subscreen is displayed (refer to FIG. 28) and all information about the selected destination extracted from the address book is displayed.

3.6 Search Subscreen

Figure 29:
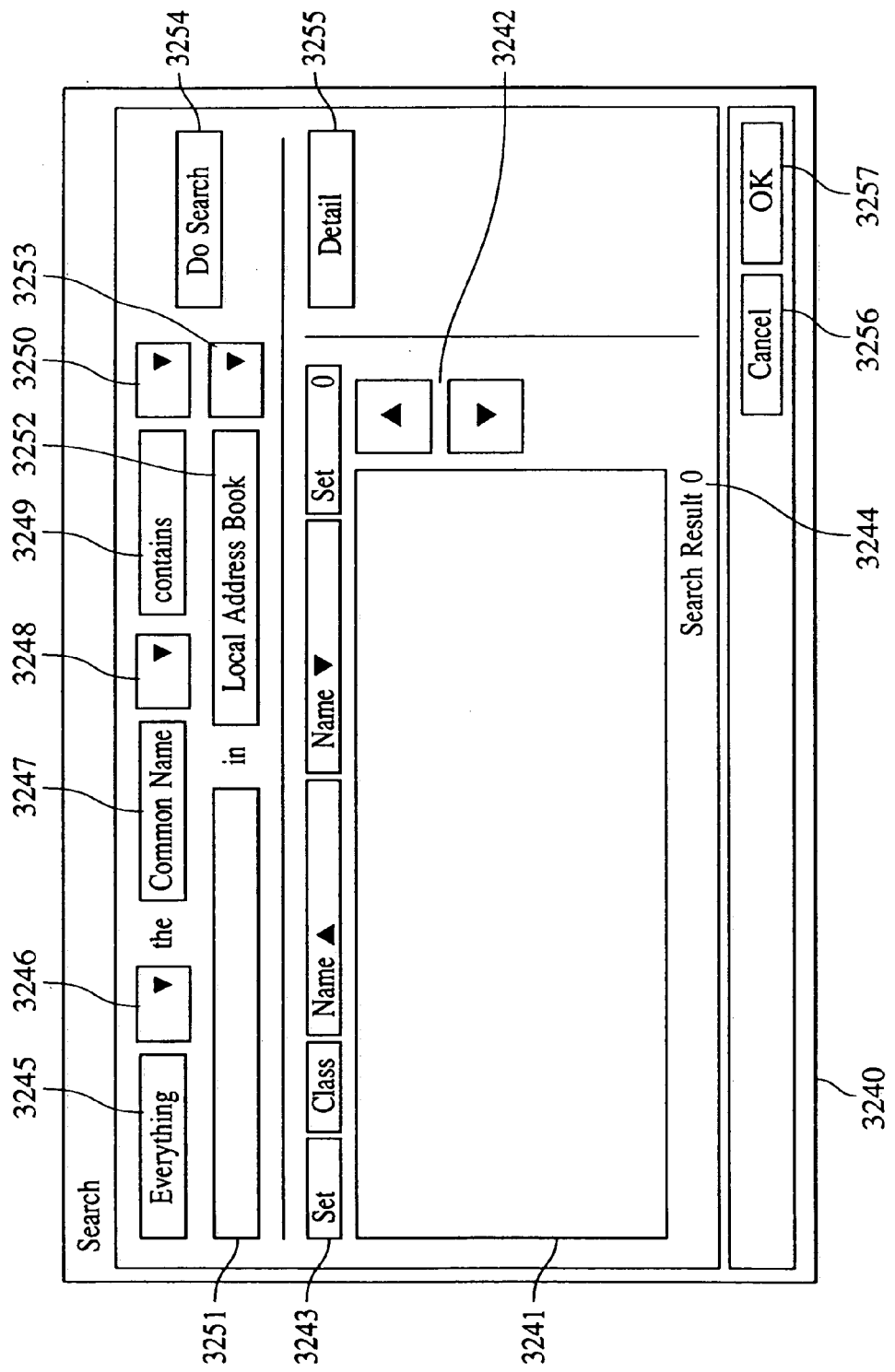
FIG. 29 is a schematic diagram illustrating a display screen for retrieving an address.
Figure 30:
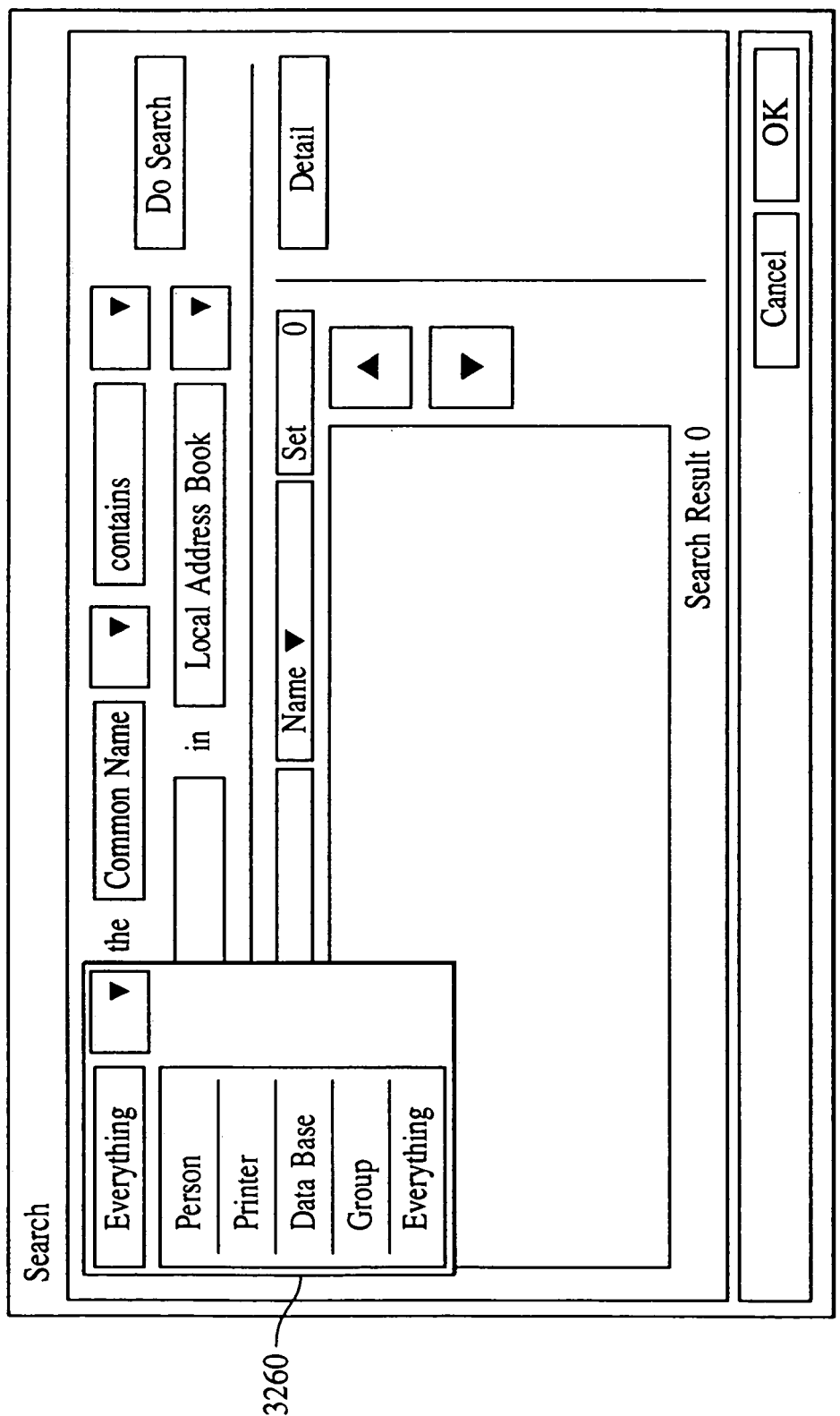
FIG. 30 is a schematic diagram illustrating a screen on which a list of classes of addresses to be retrieved is displayed.
Figure 31:
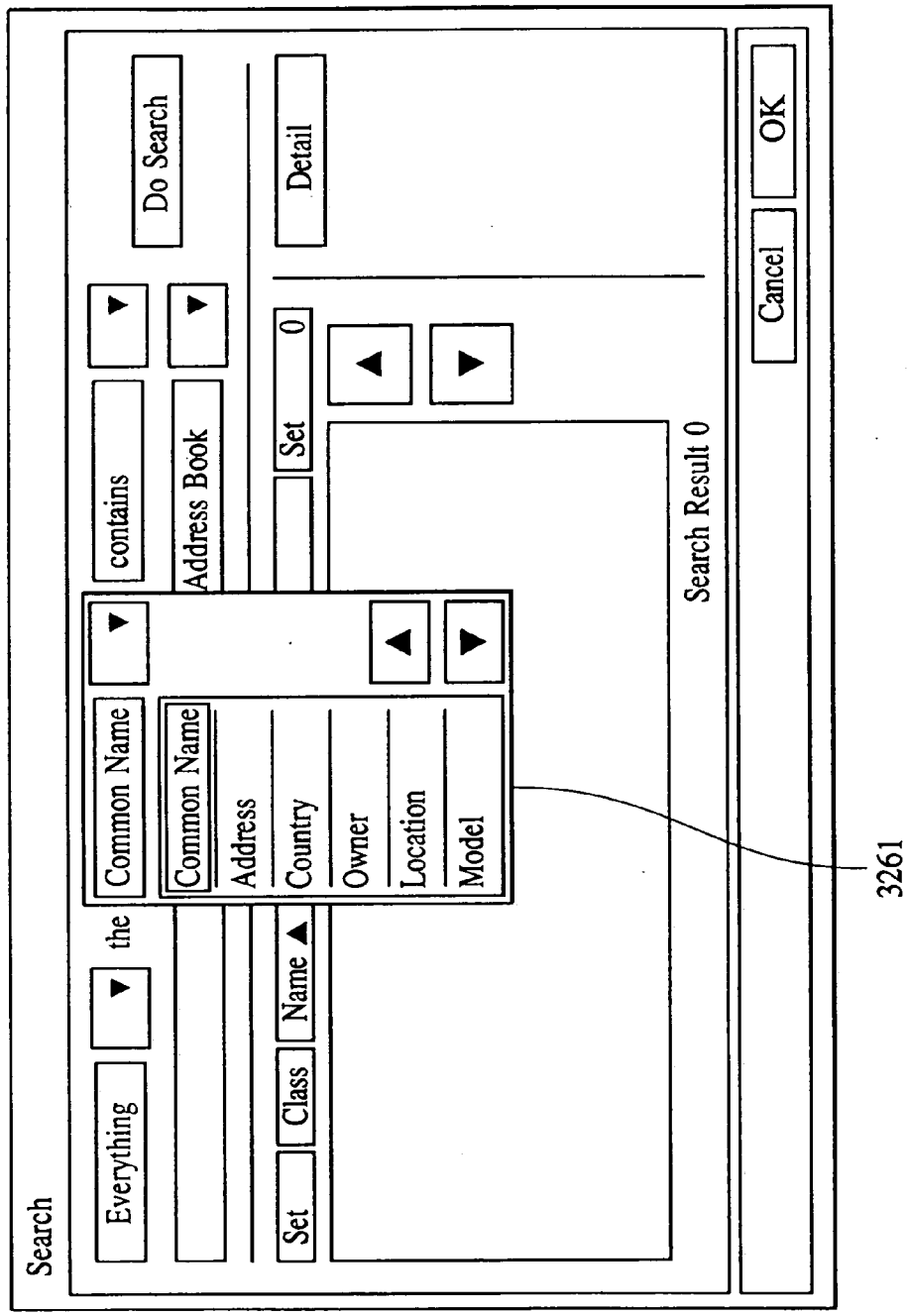
FIG. 31 is a schematic diagram illustrating a screen on which a list of attributes to be retrieved is displayed.

If a "Search" button (3228) on the address book subscreen is pressed, a search subscreen appears (refer to FIG. 29) whereby the user can search the local address book provided in the image processing apparatus or an external address server for a particular destination. The upper area of the search subscreen is used to designate the searching conditions. The searching condition designation area includes a class indication box (3245), an attribute indication box (3247), a searching condition indication box (3249), and an address book indication box (3252) wherein current selections are displayed in these boxes. If a class setting button (3246) is pressed, a list of classes is displayed (refer to FIG. 30). If one of classes is selected from the list, the selected class is displayed in the class indication box. If an attribute setting button (3248) is pressed, a list of attributes is displayed (refer to FIG. 31). The contents of this list vary depending on the class selected, as described below:

common name, address, country (class=person)

common name, owner, location, model, type, resolution, color, finisher (class=printer)

common name, member (class=group)

all attributes (class=everything)

Figure 32:
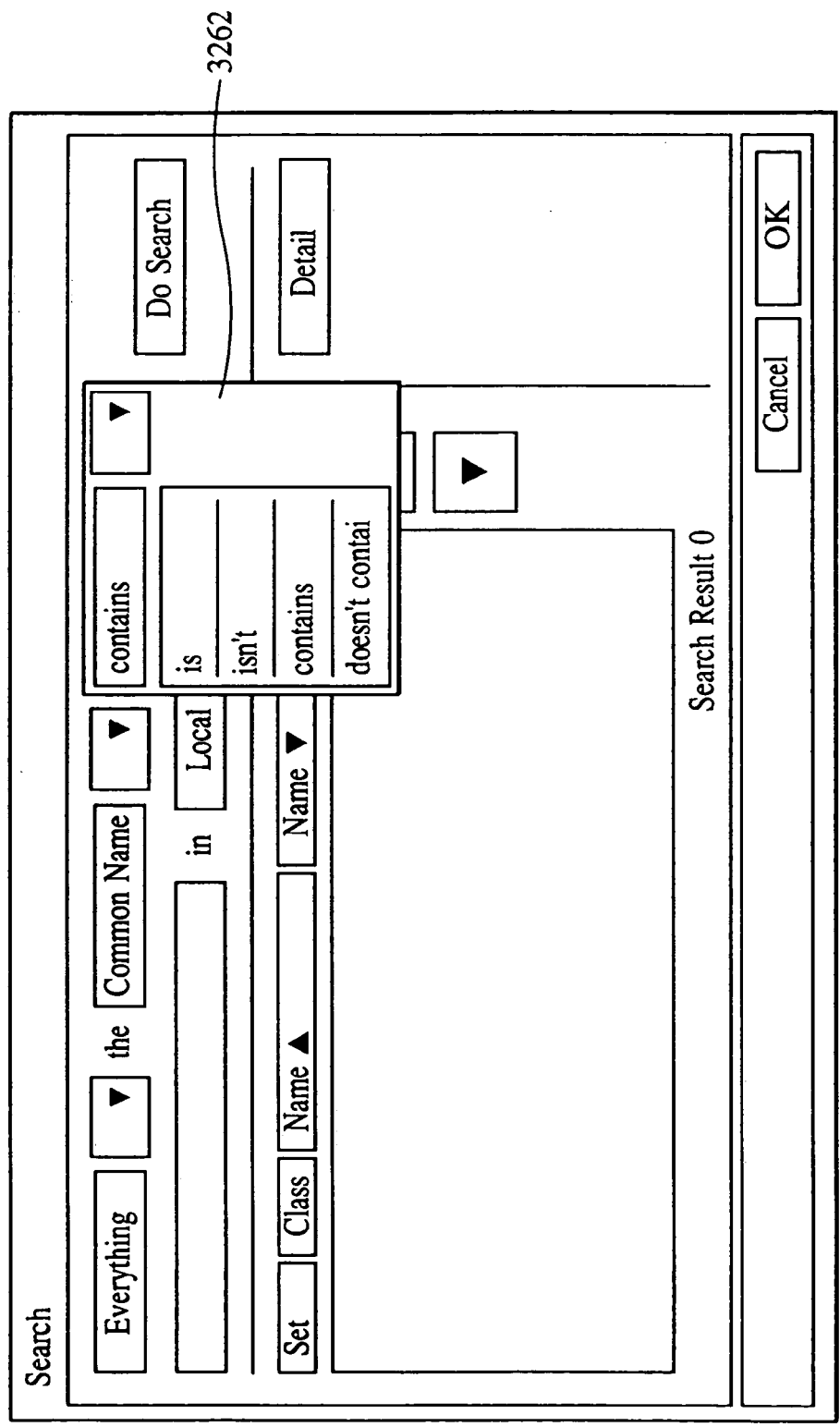
FIG. 32 is a schematic diagram illustrating a screen on which a list of retrieval conditions is displayed.
Figure 33:
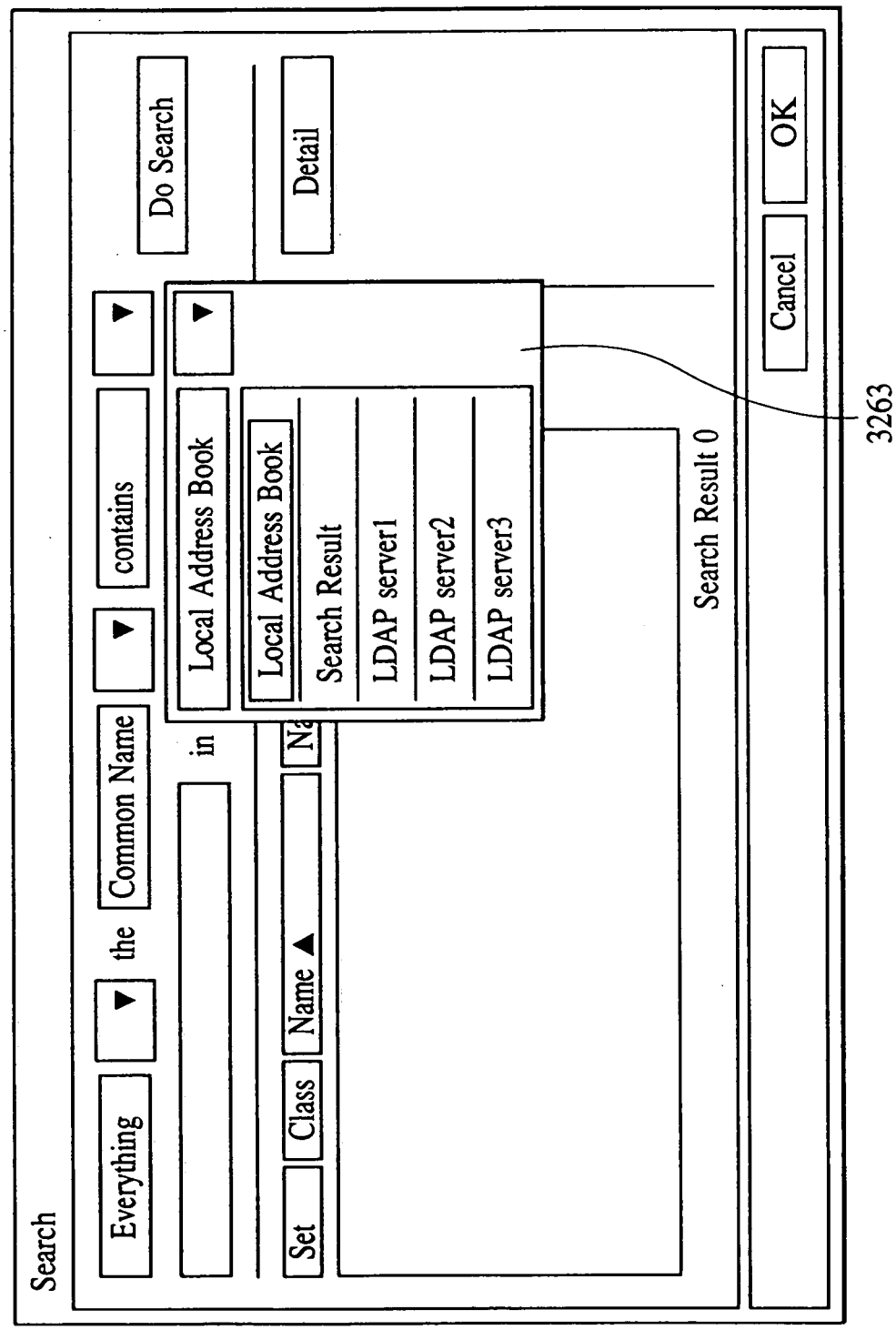
FIG. 33 is a schematic diagram illustrating a screen on which a list of address books to be searched is displayed.

If a research condition setting button (3250) is pressed, a list of research conditions is displayed (refer to FIG. 32) so that the user can select a condition from the list. If an address book setting button (3253) is pressed, a list of address books is displayed (refer to FIG. 33) so that the user can select an address book from the list. If an attribute input box (3251) is pressed, a full keyboard is displayed (refer to FIG. 26) so that the user can input desired data via the full keyboard.

If a "Do Search" button (3254) is pressed, a searching operation is started in accordance with the specified search conditions. The search result is displayed in a search result indication area (3241) the number of obtained destinations is displayed in a number-of-retrieved-destinations indication area (3244).

When one destination is selected from those displayed in the search result indication area, if the "Detail" button (3255) is pressed, then detailed information (3235) about the selected destination is displayed.

If there are destinations which should be added to the list of destination, those destinations are marked with a selection mark (refer to FIG. 34). If the "OK" button (3257) is pressed, the search subscreen is closed and the SEND main screen is displayed in which the list of destinations includes those marked in the search process. In the case where the "Cancel" button (3256) is pressed, the search subscreen is closed and the SEND main screen is displayed without making any change in the list of destinations.

3.7 Destination Subscreen

If the "New" button (3209) on the SEND main screen is pressed, then a person class subscreen appears (refer to FIG. 35) so that the user can input a new destination. If one of transmission method selection buttons (3271–3274) corresponding to transmission methods (E-mail, facsimile, printer, FTP) is pressed or one of destination input boxes (3275–3278) is pressed, then a ten-keyboard (FIG. 36) is displayed when the facsimile is selected as the transmission method or a full keyboard (FIG. 26) is displayed when any other transmission method is selected, thereby allowing the user to input data. Although not described in further detail here, there are also provided buttons 3279–3282 used to set the transmission options.

Figure 35:
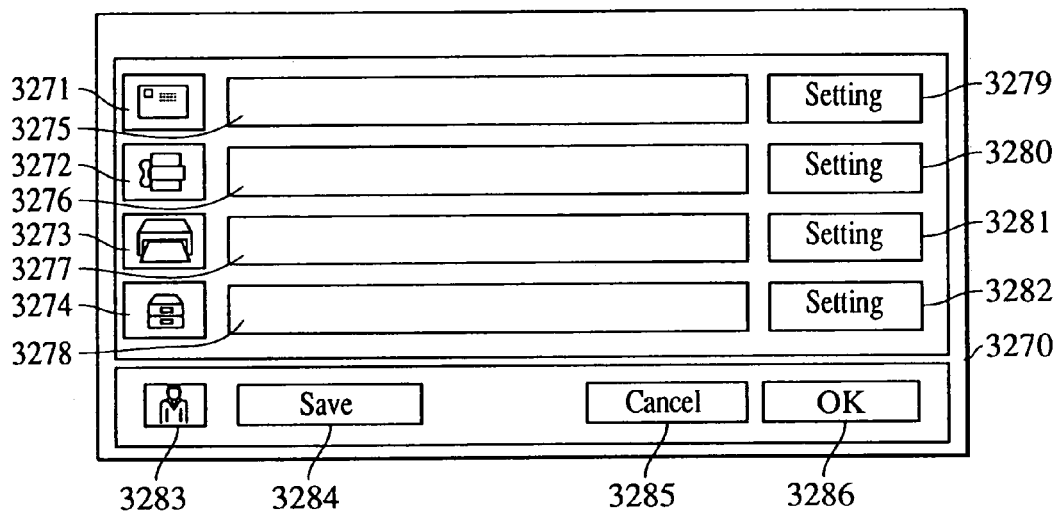
FIG. 35 is a schematic diagram illustrating a screen for inputting a new destination in the SEND mode.
Figure 36:
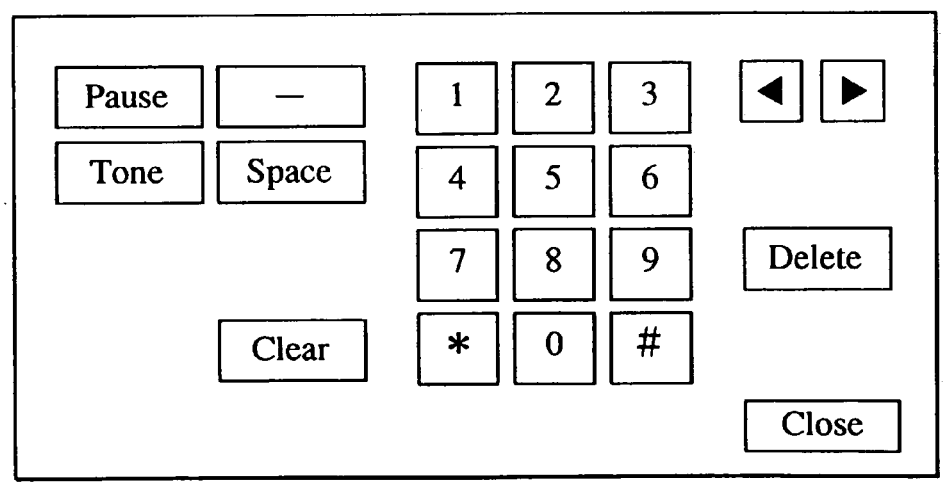
Figure 37:
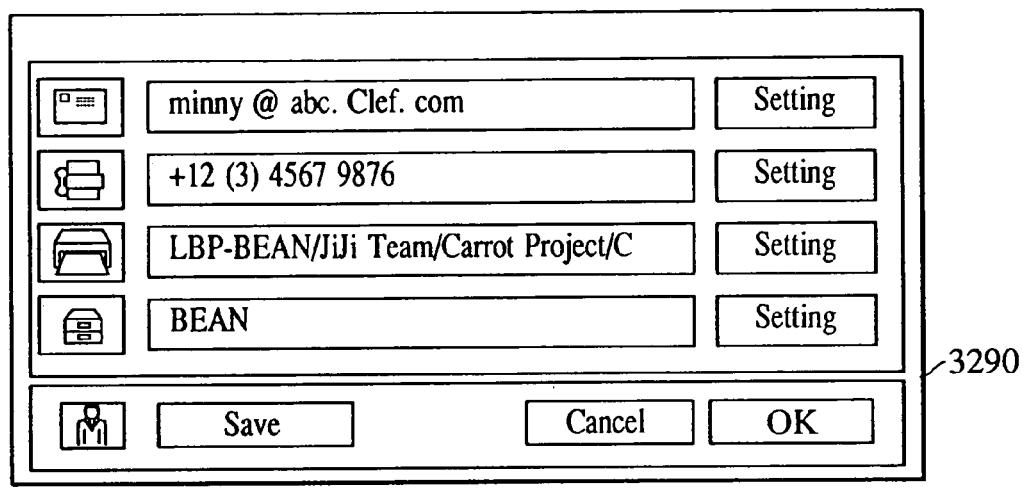
FIG. 37 is a schematic diagram illustrating a screen for inputting detailed information of a destination in the person class.

When a destination in the person class is selected on the SEND main screen, if the "Edit" button (3210) is selected, the person class subscreen also appears (refer to FIG. 37) and detailed information of the selected destination is displayed in the corresponding destination input box (3275–3278) (see FIG. 35). In this state, if a keyboard is displayed in the above-described manner, then it becomes possible to edit the destination.

Figure 38:
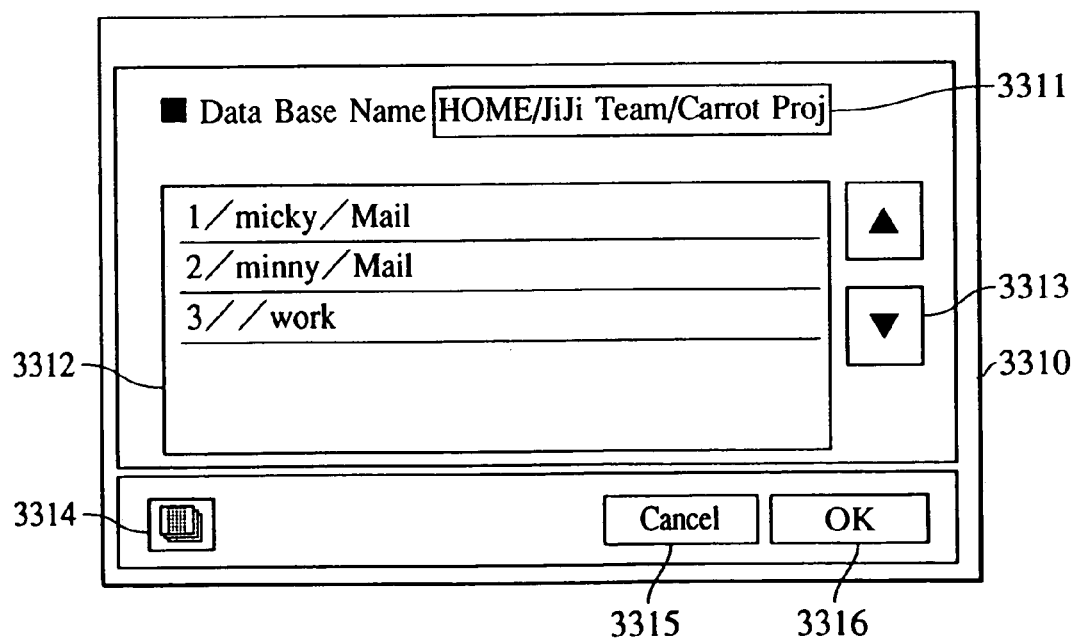
FIG. 38 is a schematic diagram illustrating a screen for inputting detailed information of a destination in the database class.

When a destination in the database class is selected on the SEND main screen, if the "Edit" button (3210) is pressed, a database class subscreen appears (refer to FIG. 38) wherein a database name (3311) and a folder list (3312) are displayed on the database class.

Figure 39:
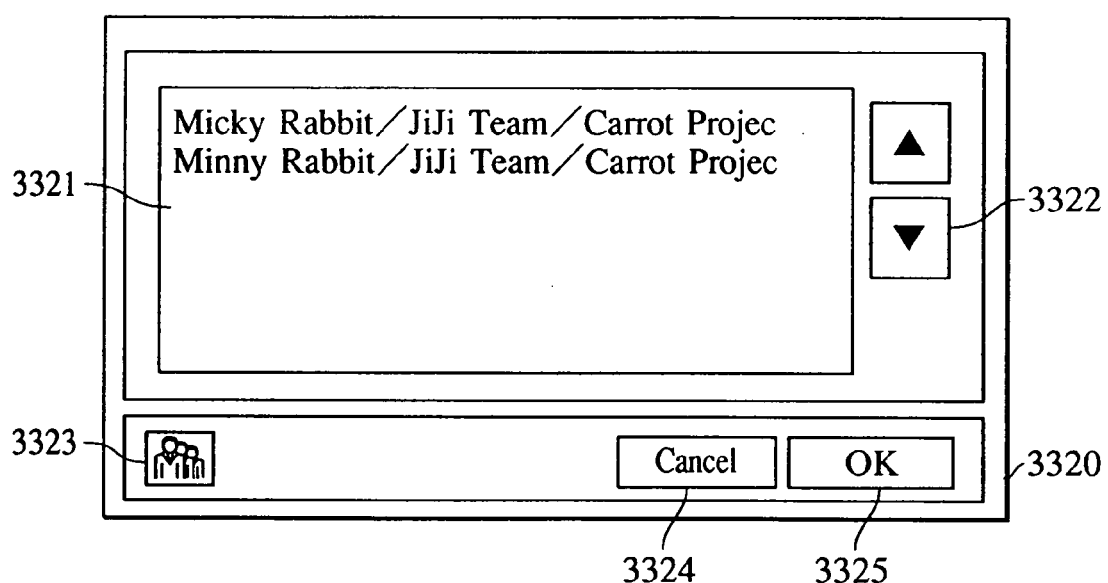
FIG. 39 is a schematic diagram illustrating a screen for inputting detailed information of a destination in the group class.

When a destination in the group class is selected on the SEND main screen, if the "Edit" button (3210) is pressed, then a group class subscreen appears (refer to FIG. 39) and group members (3321) are displayed.

3.8 HD Setting Subscreen

Figure 40:
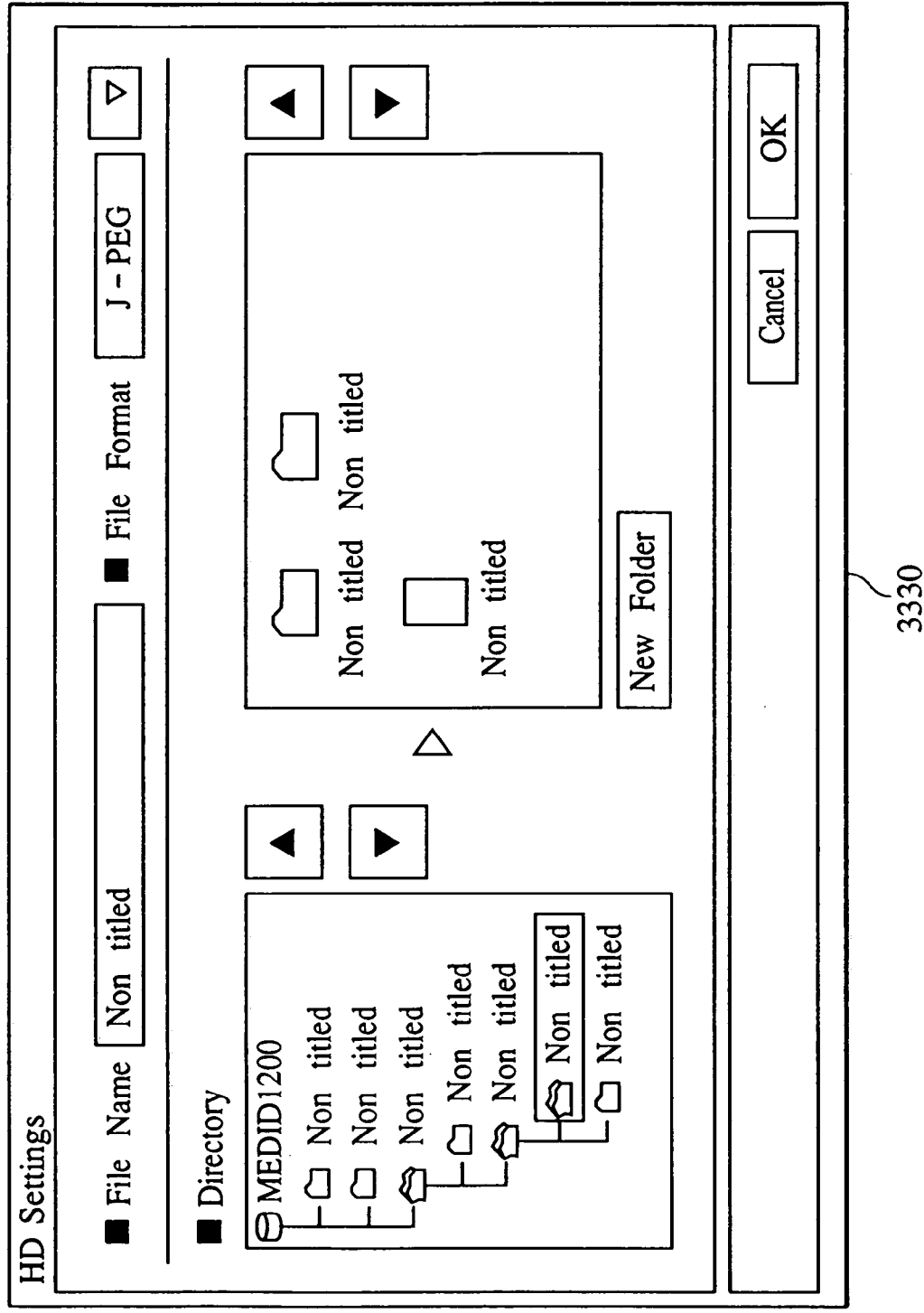
FIG. 40 is a schematic diagram illustrating a screen for setting a hard disk.

If a "Put into HD" check button (3213) is pressed, a HD setting subscreen appears (refer to FIG. 40) so that the user can set the conditions in which data is transmitted to a hard disk and stored thereon. When a "Put into HD" check button (3406) provided in common for all categories is pressed, the HD setting subscreen (FIG. 40) also appears and setting can be performed in a similar manner.

3.9 Print-out Subscreen

Figure 41:
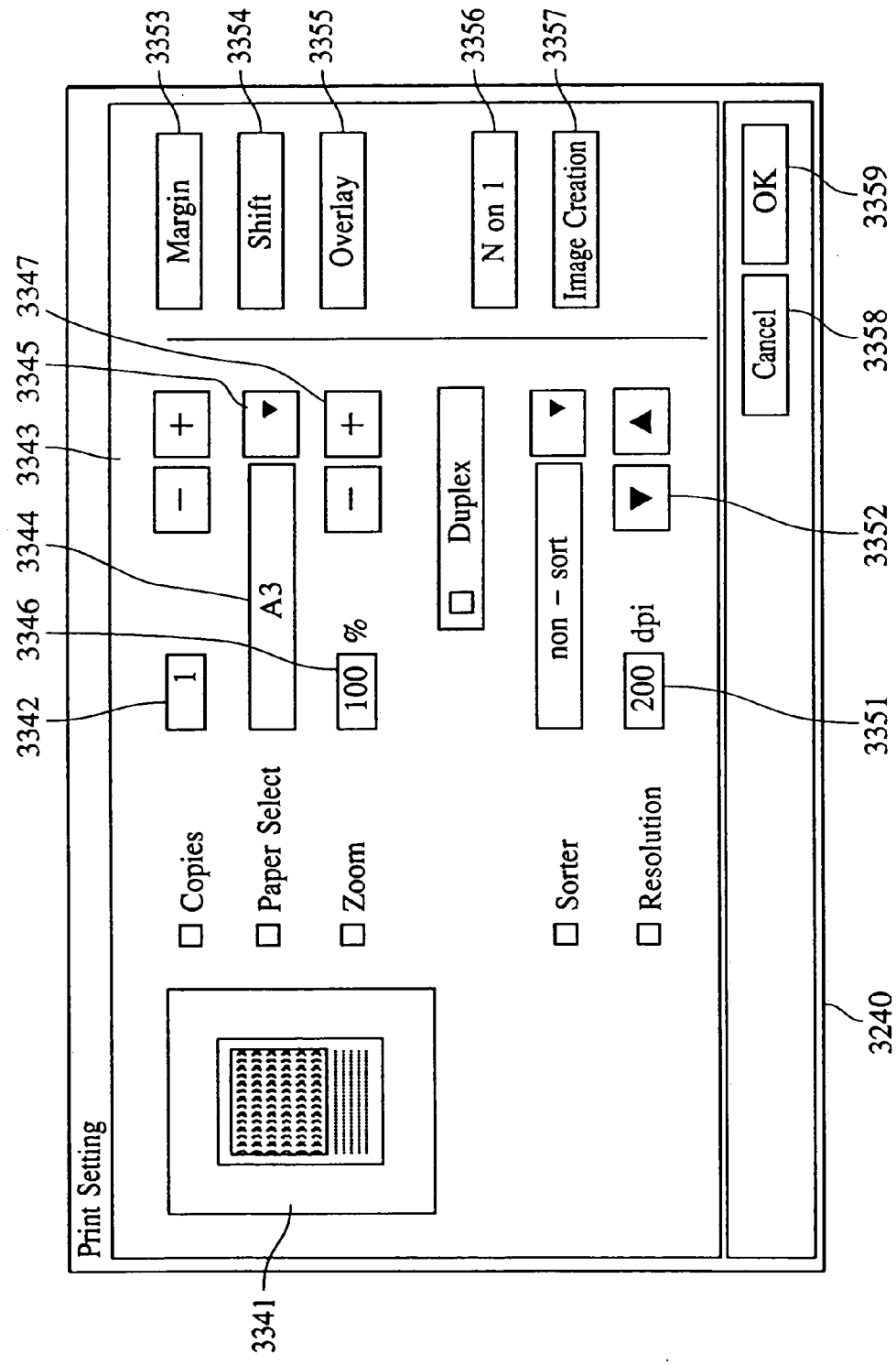
FIG. 41 is a schematic diagram illustrating a screen for setting printing conditions.
Figure 42:
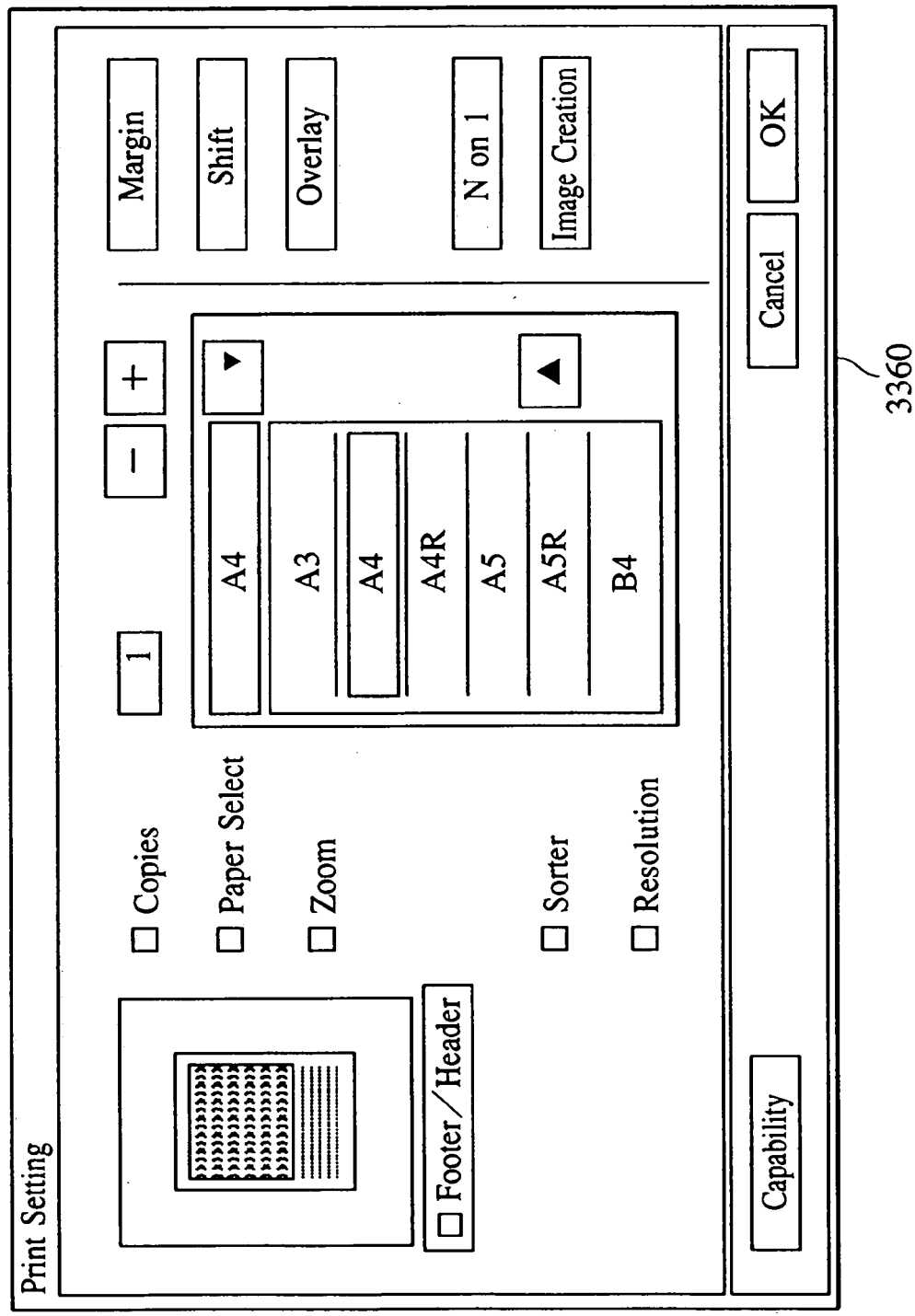
FIG. 42 is a schematic diagram illustrating a screen on which a list of paper sizes is displayed.
Figure 43:
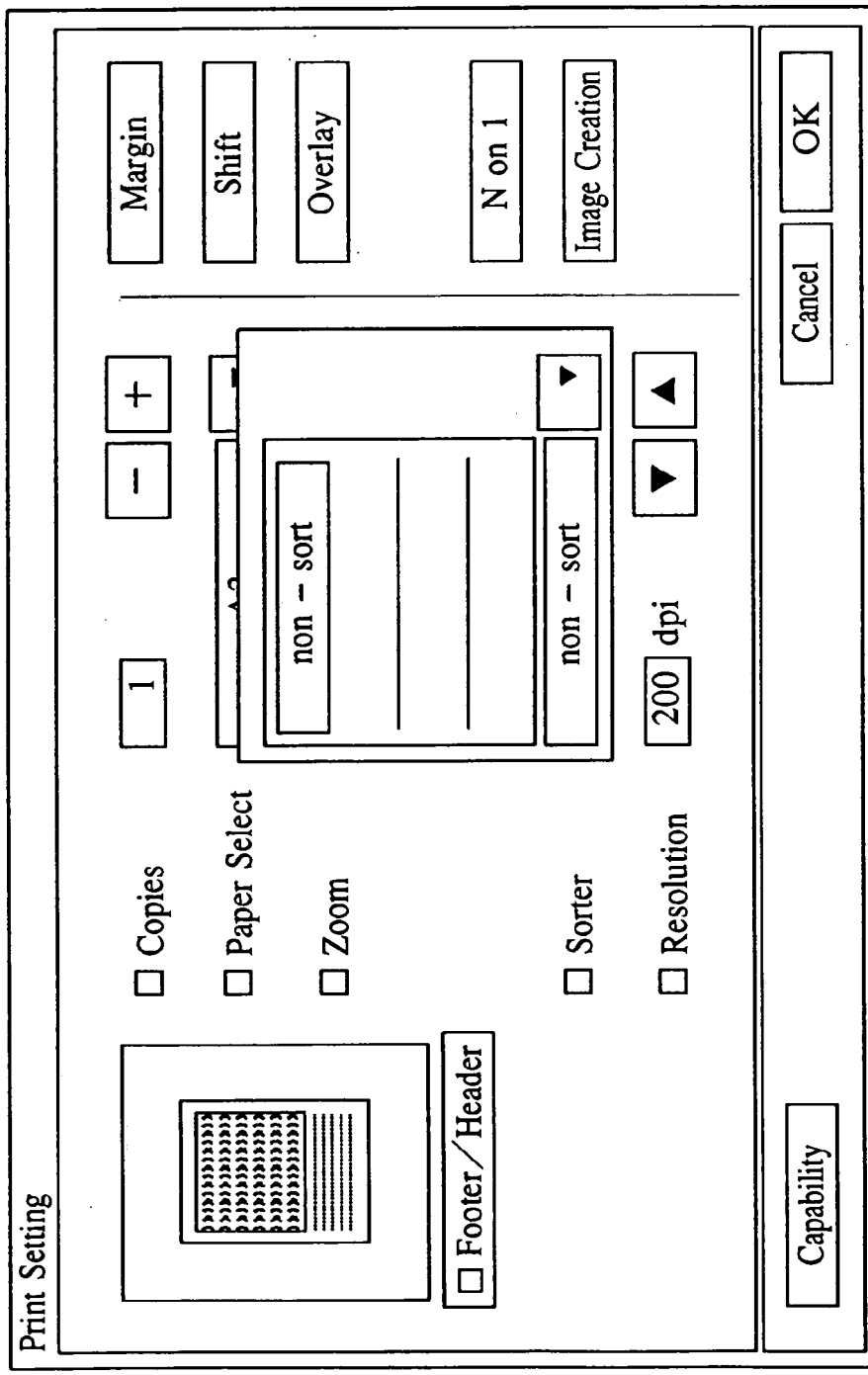
FIG. 43 is a schematic diagram illustrating a screen on which a list of sorters is displayed.

If a "Print-out" check button (3214) is pressed, then a print-out subscreen appears (refer to FIG. 41) so that the user can set the number of copies to be printed, the paper size, the scaling factor, the two-sided copying conditions, the sorting conditions, and the resolution. If a paper size selection button (3345) is pressed, a list of paper sizes is displayed (refer to FIG. 42) so that the user can select a desired paper size from the list. If a sorter selection button (3350) is pressed, a list of available sorters is displayed (refer to FIG. 43).

3.10 Scan Setting Subscreen

Figure 44:
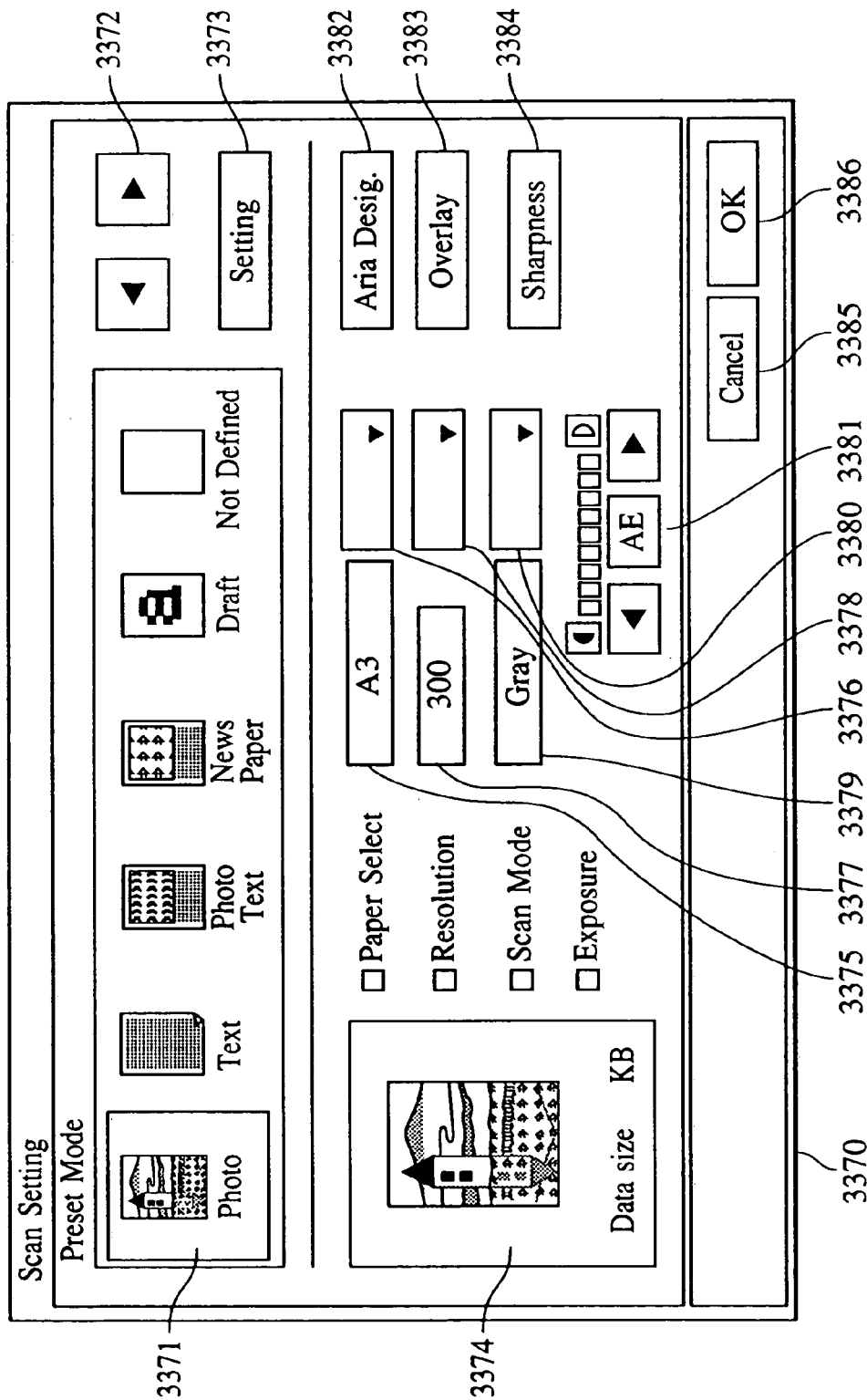
FIG. 44 is a schematic diagram illustrating a screen for setting scanning parameters.
Figure 45:
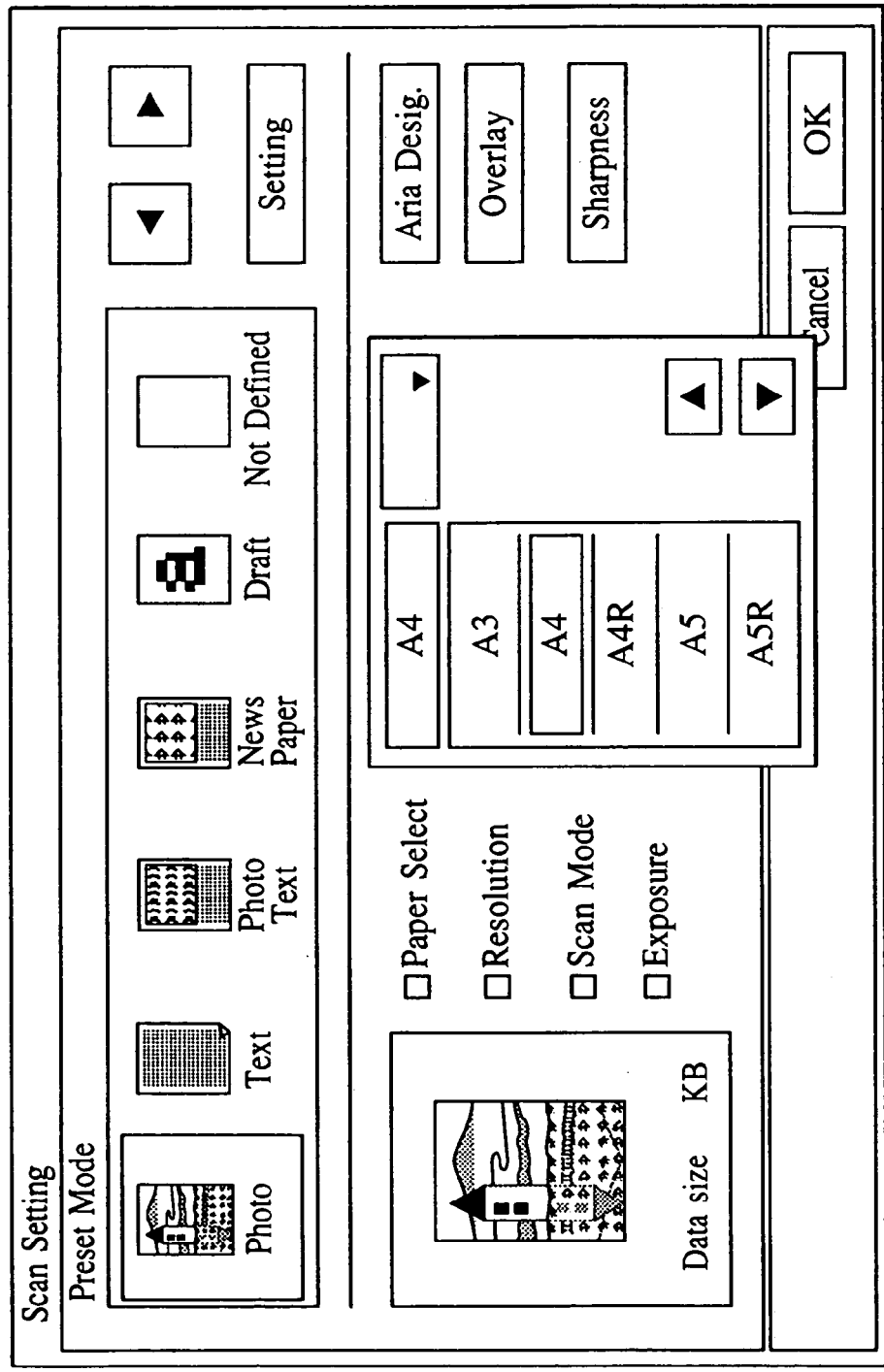
FIG. 45 is a schematic diagram illustrating a screen on which a list of paper sizes is displayed in the form of a pull-down menu on the scanning parameter setting screen.
Figure 46:
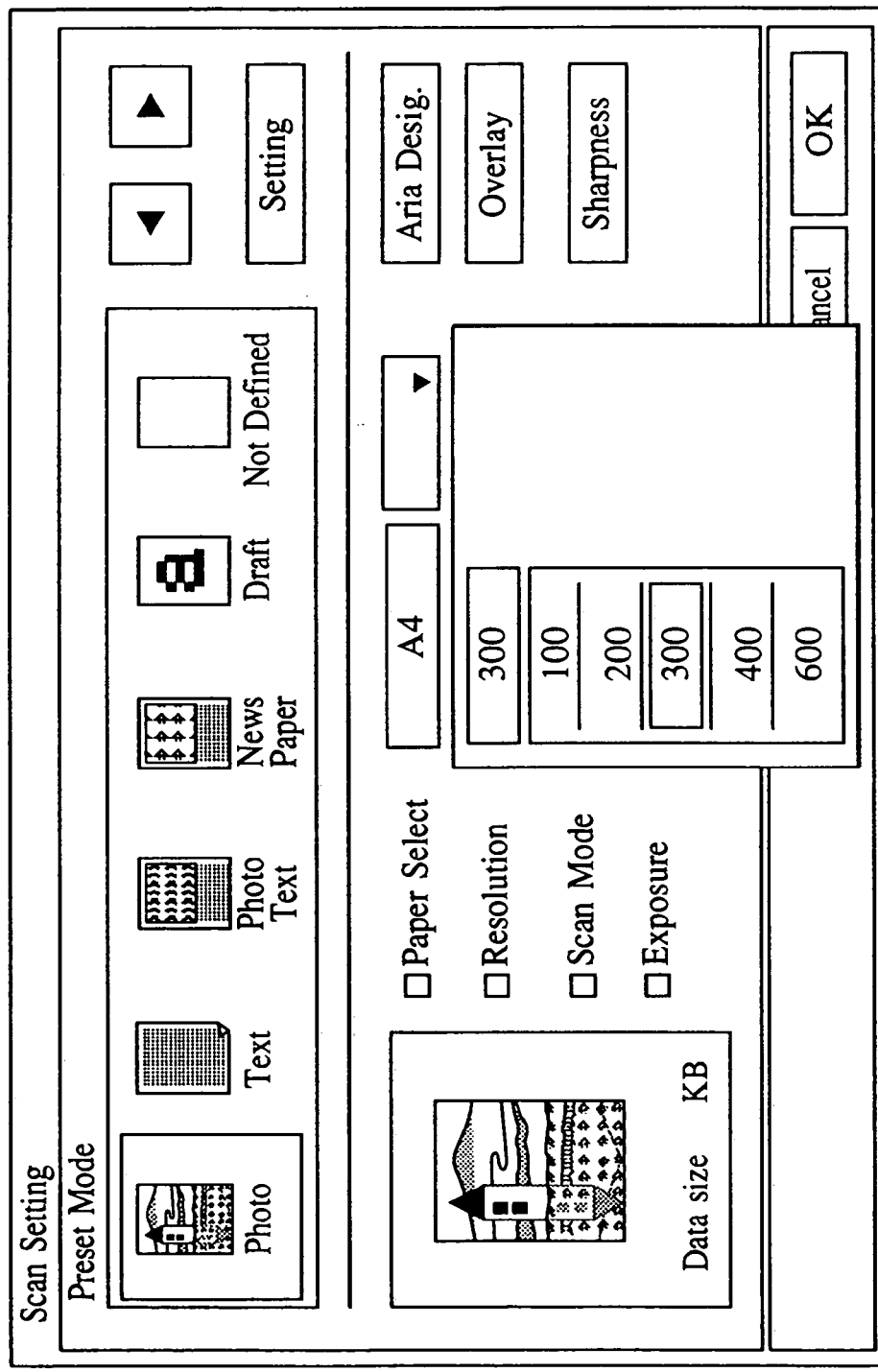
FIG. 46 is a schematic diagram illustrating a screen on which a list of resolutions is displayed in the form of a pull-down menu on the scanning parameter setting screen.
Figure 47:
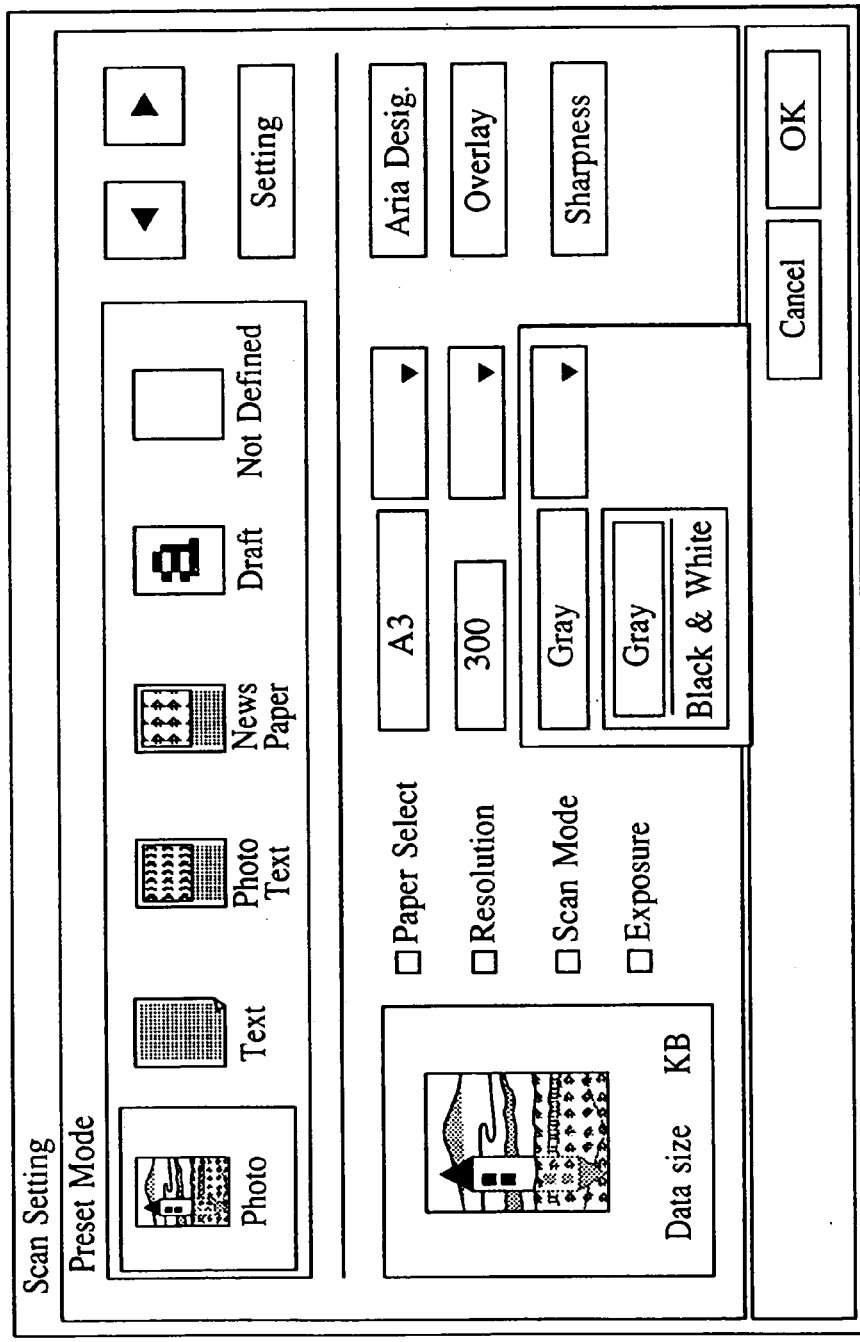
FIG. 47 is a schematic diagram illustrating a screen on which a list of scanning modes is displayed in the form of a pull-down menu on the scanning parameter setting screen.

If a "Scan Setting" button (3215) is pressed, a scan setting subscreen appears (refer to FIG. 44). If one of scan settings is selected from the preset mode selection area (3371), the preset resolution, scan mode, and intensity are displayed in the corresponding indication areas (3377, 3379, 3381). These values can be changed by the user. FIG. 45 illustrates a screen on which a list of paper sizes is displayed in the form of a pull-down menu so that the user can select a paper size and a paper feeding direction from the list. FIGS. 46 and 47 illustrate screens where a list of resolutions and a list of scan modes are displayed, respectively, in the form of a pull-down menu.

3.11 Retrieve Screen

Figure 48:
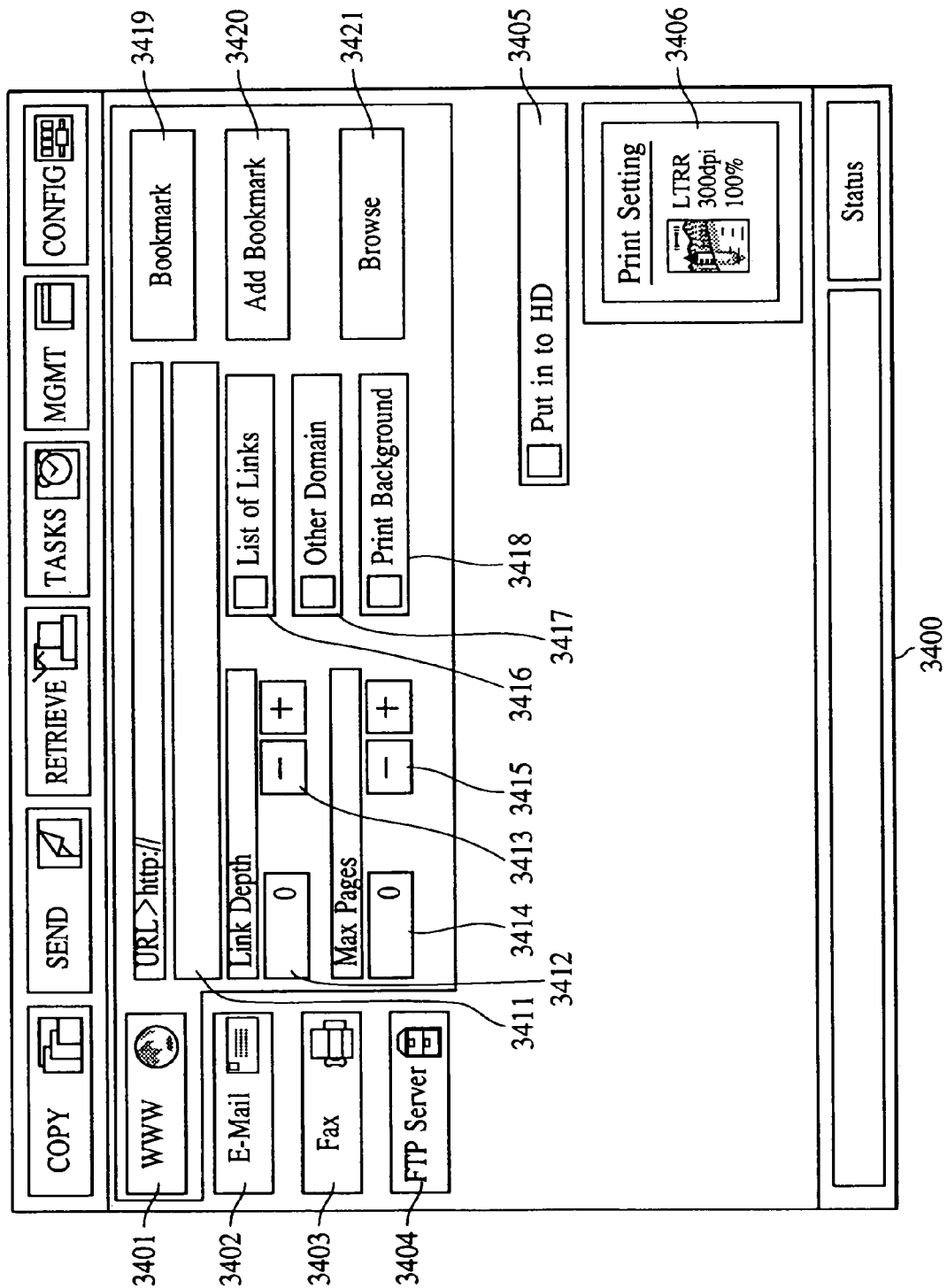
FIG. 48 is a schematic diagram illustrating a RETRIEVE main screen (WWW subscreen) which is displayed in a RETRIEVE mode.

The "RETRIEVE" main screen (FIG. 48) includes a "WWW" subtab (3401), an "E-Mail" subtab (3402), a "Fax" subtab (3403), an "FTP" subtab (3404), a "Put into HD" check button (3405) which is used in common in the respective subcategories, and a "PRINT SETTING" button (3406). If one of subtabs is pressed, a WWW, E-Mail, Fax, or FTP subscreen is displayed depending on the subtab pressed. When the image processing apparatus is initialized for example by pressing the reset key 2017, the WWW subscreen is displayed.

3.12 WWW Subscreen

When the WWW subscreen is displayed, if the start button is pressed, the contents of the designated home page is printed in accordance with the conditions displayed on the screen. However, if the start key 2014 is pressed when nothing is displayed in a URL input box.

If the URL input box (3411) displayed on the WWW subscreen (FIG. 48) is clicked, a full keyboard (FIG. 26) is displayed so that a URL address is directly input. If a "Link Depth" input box (3412) or a "Max Pages" input box (3414) is clicked, a ten keyboard (FIG. 36) is displayed so that numerals can be directly input.

3.13 Bookmark Subscreen

Figure 49:
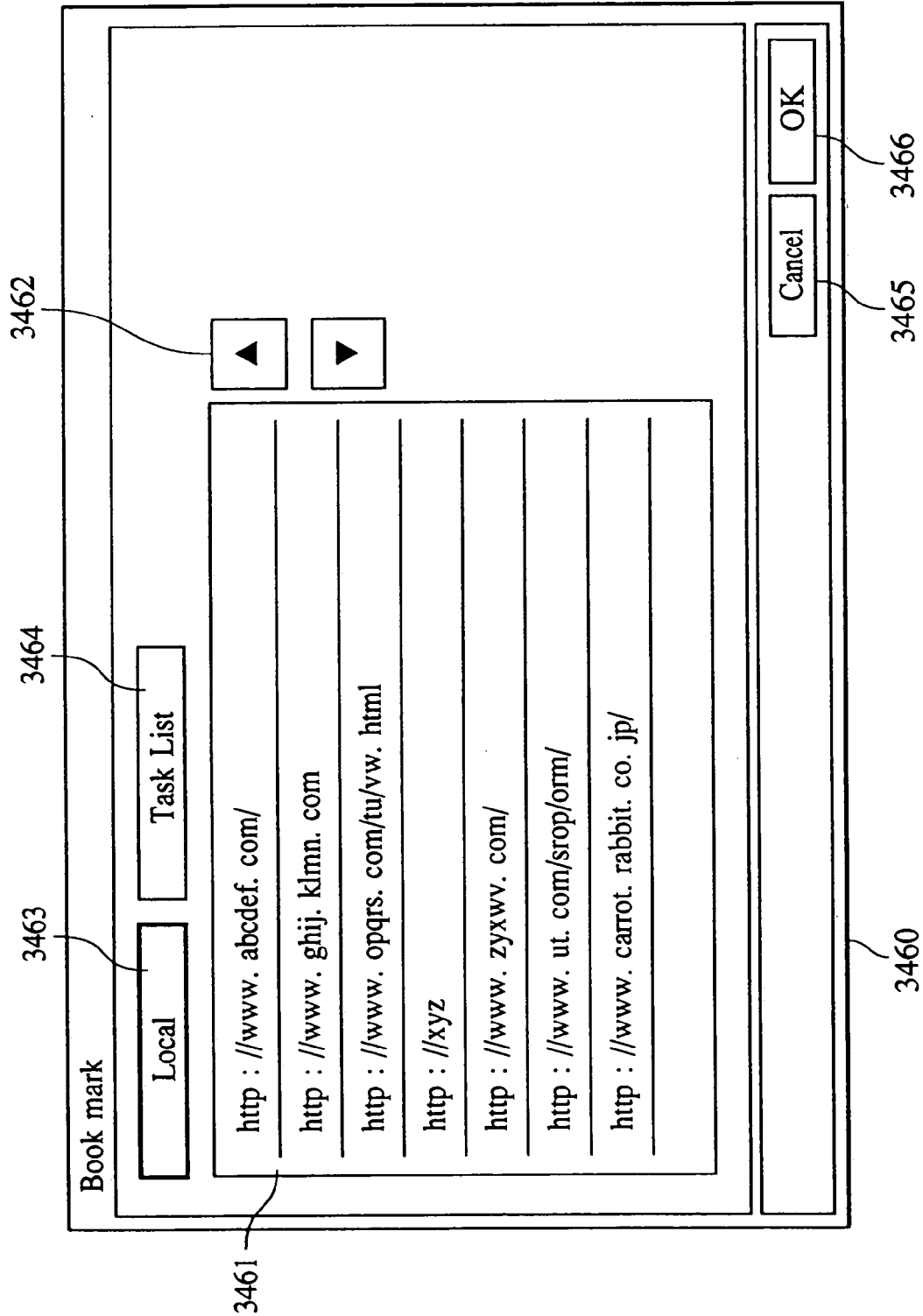
FIG. 49 is a schematic diagram illustrating a screen on which a list of bookmarks is displayed.

If a "Bookmark" button (3419) is pressed, a bookmark subscreen (FIG. 49) appears. The bookmark subscreen includes a bookmark display area (3461) in which a list of bookmarks is displayed. If any line is clicked, the corresponding bookmark is selected. If an "OK" button (3466) is clicked, then the bookmark subscreen is closed and the WWW subscreen again appears wherein a URL address corresponding to the selected bookmark is displayed in the URL input box. The bookmark subscreen includes some other buttons, but their functions are not described here.

3.14 E-Mail Subscreen

Figure 50:
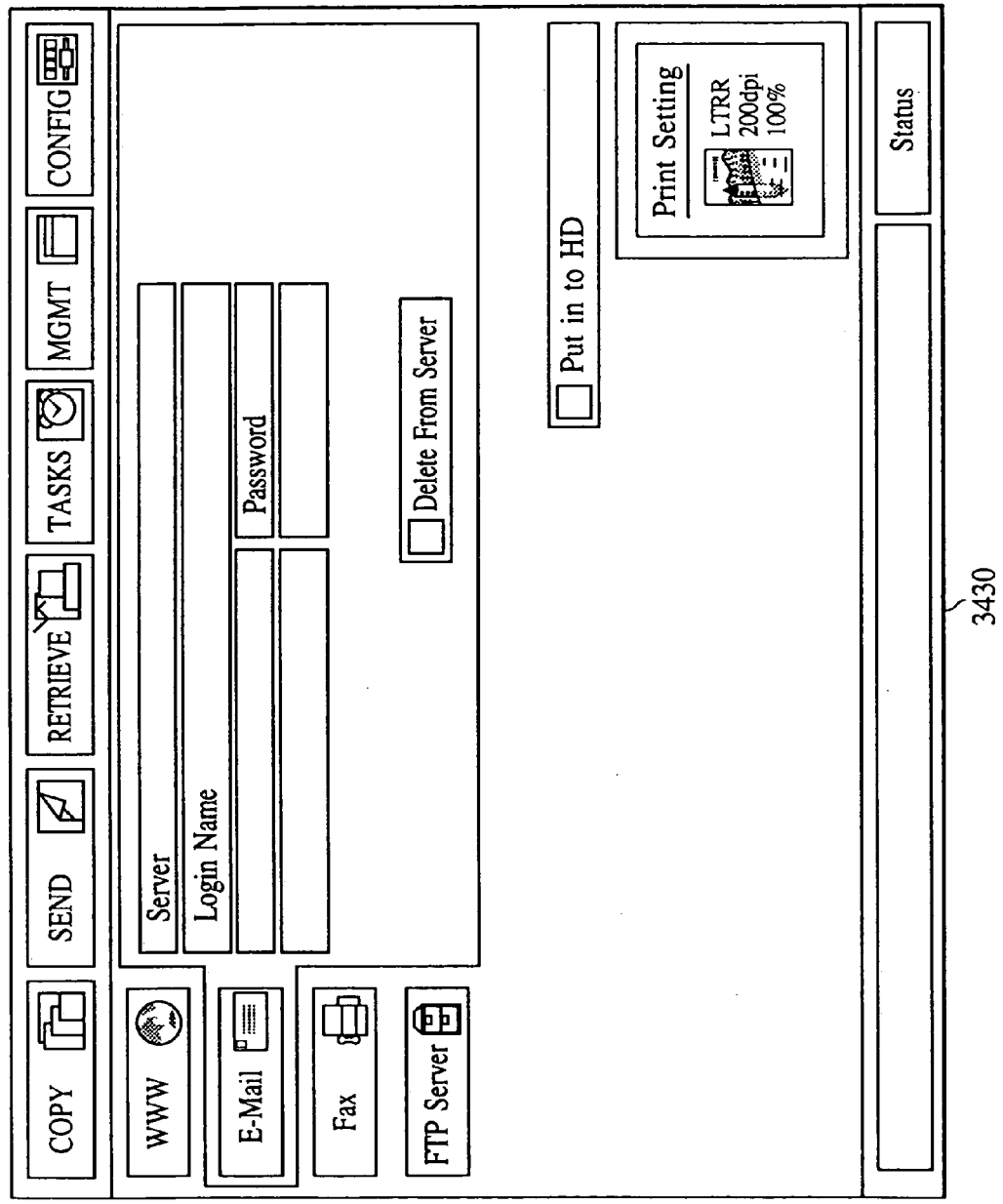
FIG. 50 is a schematic diagram illustrating an E-mail subscreen.
Figure 51:
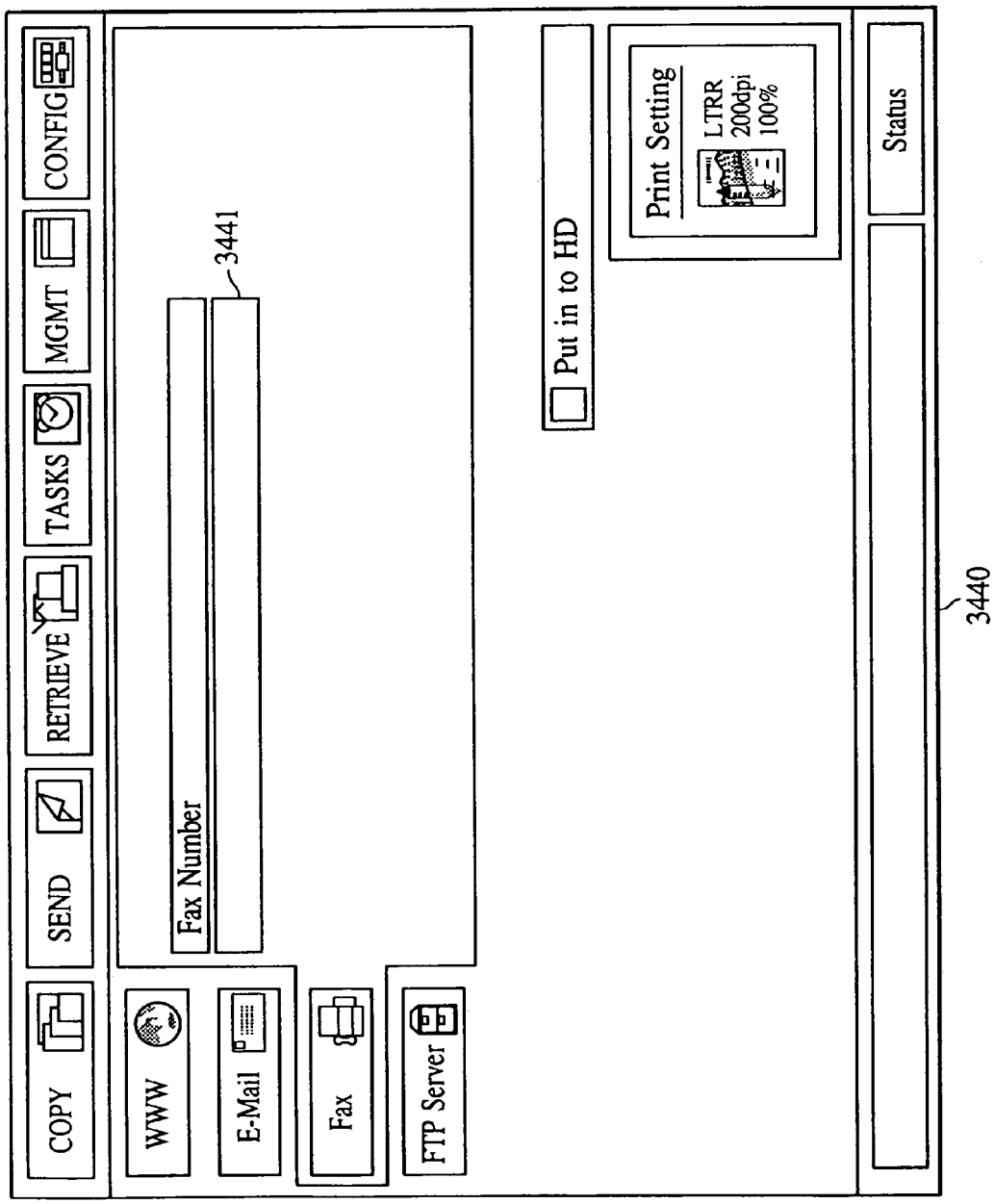
FIG. 51 is a schematic diagram illustrating a facsimile subscreen.

The E-mail subscreen (FIG. 50) is used to set conditions in which E-mail is received. If any input box (3431–3433) is clicked, a full keyboard (FIG. 26) is displayed thereby allowing the user to input data.

3.14 Facsimile Subscreen

The facsimile subscreen (FIG. 50) is used to input a facsimile number. If an input box (3441) is clicked, a ten keyboard (FIG. 36) is displayed thereby allowing the user to input a facsimile number.

3.15 FTP Server Subscreen

Figure 52:
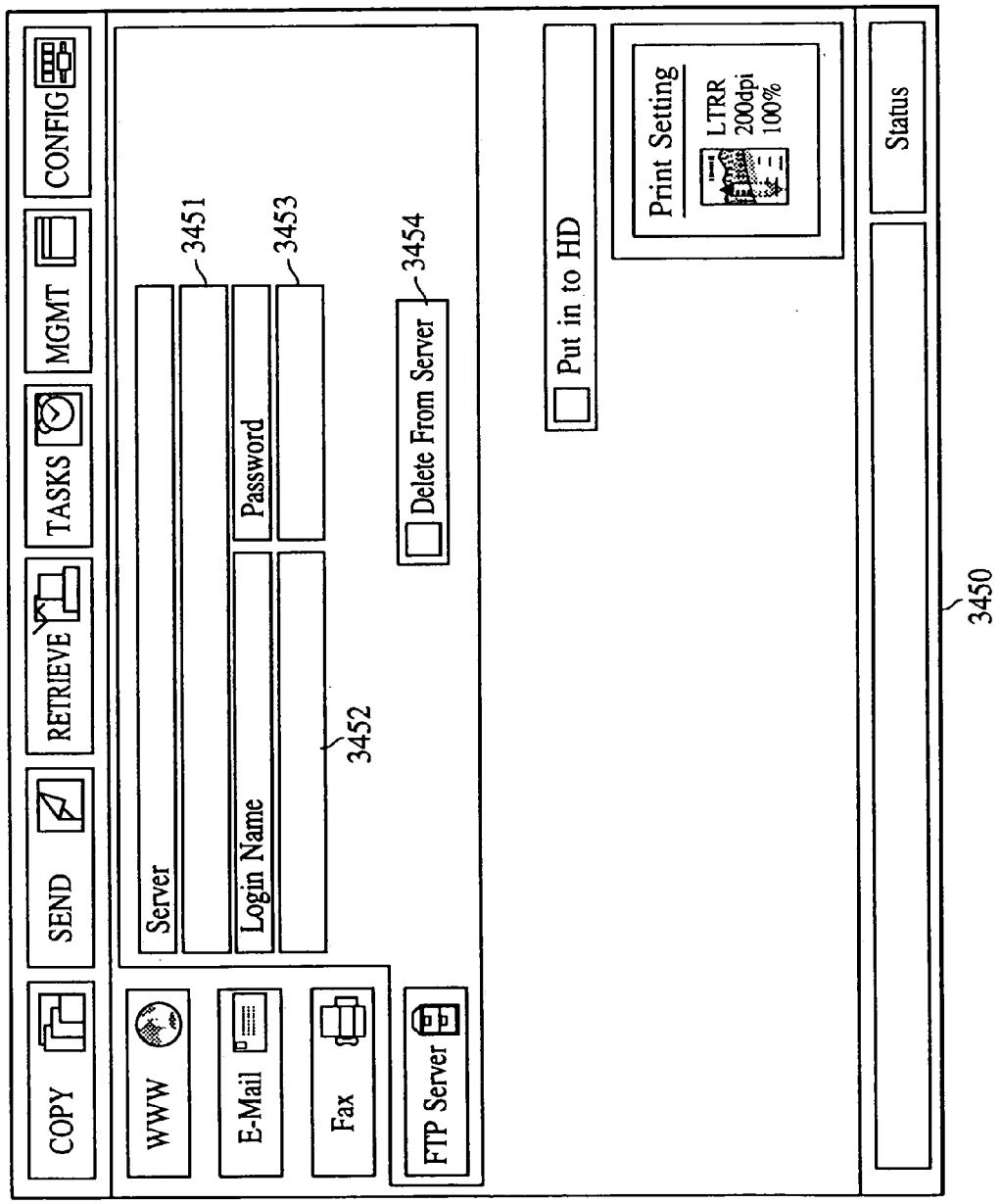
FIG. 52 is a schematic diagram illustrating a FTP server subscreen.

The FTP server subscreen (FIG. 52) is used to set conditions in which data is received from a server. If any input box (3451–3453) is clicked, a full keyboard (FIG. 26) is displayed thereby allowing the user to input data.

3.15 Print Setting Subscreen

If a "Print Setting" button (3406) provided for common use in all categories is clicked, a print setting subscreen (FIG. 53) appears. This has functions similar to those of the print-out subscreen in the "SEND" screen.

3.16 "TASKS" Screen

When the "TASKS" screen is displayed as a result of selecting the "TASKS" tab, if the "Start" key 2014 is clicked, then data is automatically retrieved according to the parameters set on the "TASKS" screen.

Figure 54:
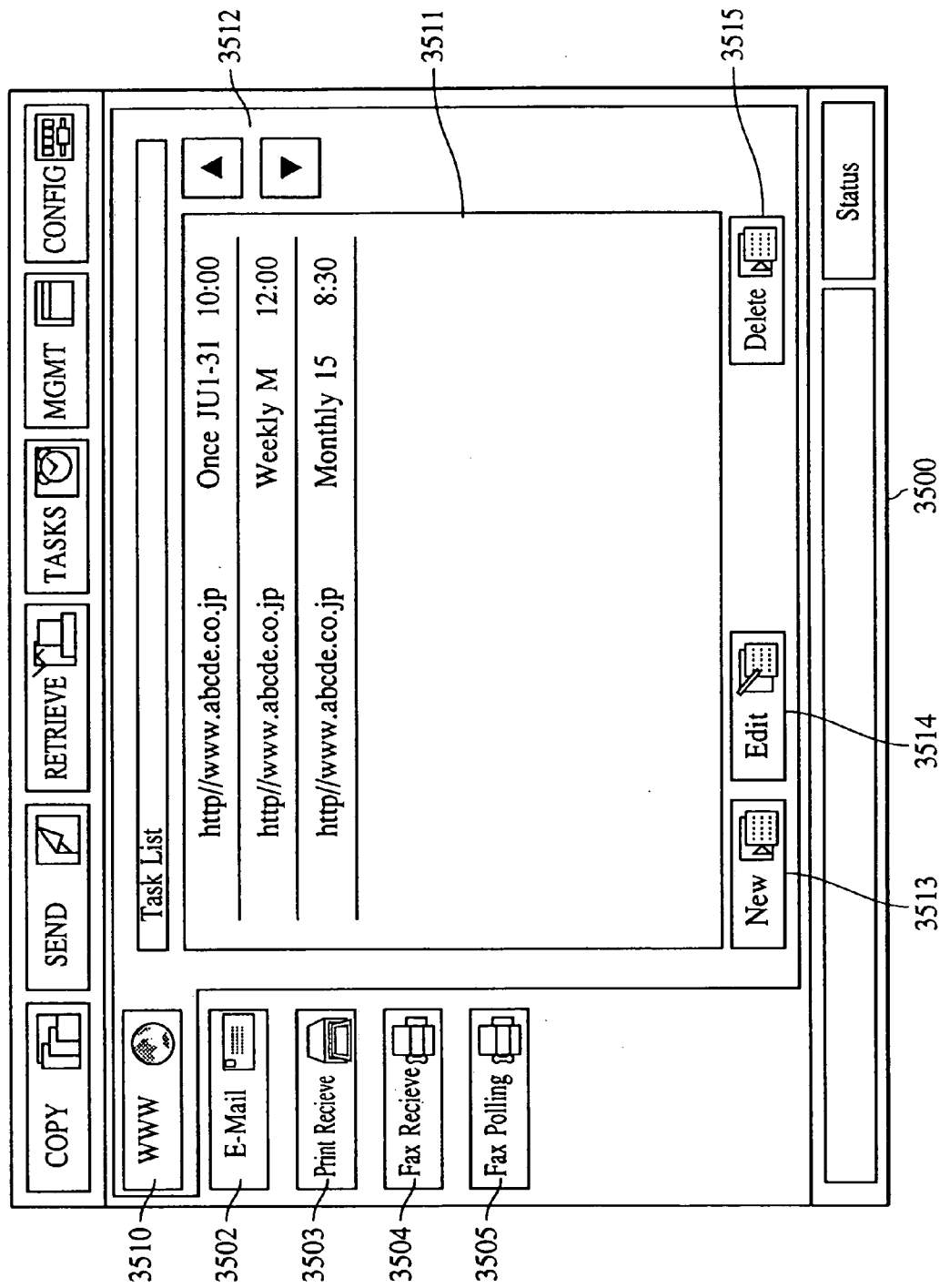
FIG. 54 is a schematic diagram illustrating a TASKS main screen which is displayed in a TASKS mode.
Figure 55:
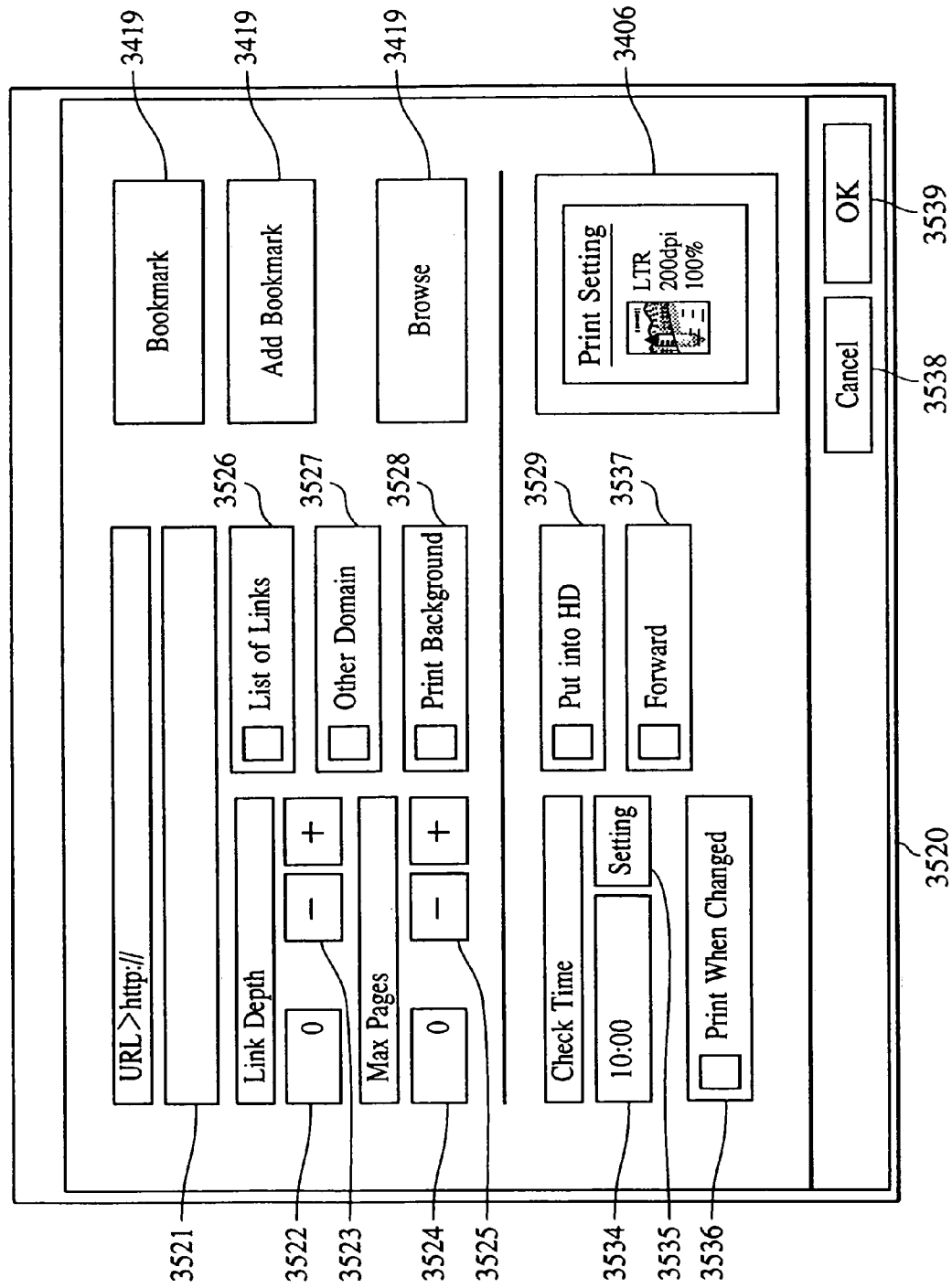
FIG. 55 is a schematic diagram illustrating a screen for setting detailed conditions of a WWW task.

The "TASKS" main screen (FIG. 54) includes a "WWW" subtab (3501), an "E-Mail" subtab (3502), a "Print Receive" subtab (3503), a "Fax Receive" subtab (3504), and a "Fax Polling" subtab (3505). In the initial state immediately after starting the image processing apparatus or after resetting it by pressing the reset key (2017), a WWW subscreen (FIG. 55) is displayed.

3.17 WWW Subscreen

The WWW subscreen includes a WWW task display area (3511) in which a list of tasks stored in the device is displayed in the same order in which they are input. Those tasks which should be actually executed are marked with a selection mark. Tasks which are not marked with a selection mark are not executed although they are stored in the device.

If a "New" button (3513) is clicked, a WWW task subscreen (FIG. 55) appears so that the user can input a new task. The WWW task subscreen is described in detail later.

If an "Edit" button (3514) is clicked after selecting one task from the WWW task list, the WWW task subscreen (FIG. 55) including information about the selected task is displayed so that the user can edit the setting.

After selecting a task from the WWW task list, if a "Delete" button (3515) is clicked, then the selected task is deleted.

3.18 WWW Task Subscreen

The WWW task subscreen (FIG. 55) includes components (3521–3533) which are common for both the RETRIEVE main screen and the WWW subscreen in the RETRIEVE mode, a check time indication area (3534), a check time setting button (3535), a "Print When Changed" check button (3536), a transfer check button (3537), an "OK" button (3539), and a "Cancel" button (3538). The components which are similar to those in the "RETRIEVE" screen are not described here.

The check time indication area (3534) includes no data when the WWW task subscreen is opened by clicking the "New" button, but it indicates the time at which the task is set to be executed in the case where the WWW task subscreen is opened by clicking the "Edit" button. In the case where setting is performed on the check time subscreen which will be described later, the time at which the task is set to be executed is indicated.

If the check time setting button (3535) is clicked, then the check time subscreen which will be described later is displayed so that the user can set the time at which the task should be executed.

3.19 Check Time Subscreen

Figure 56:
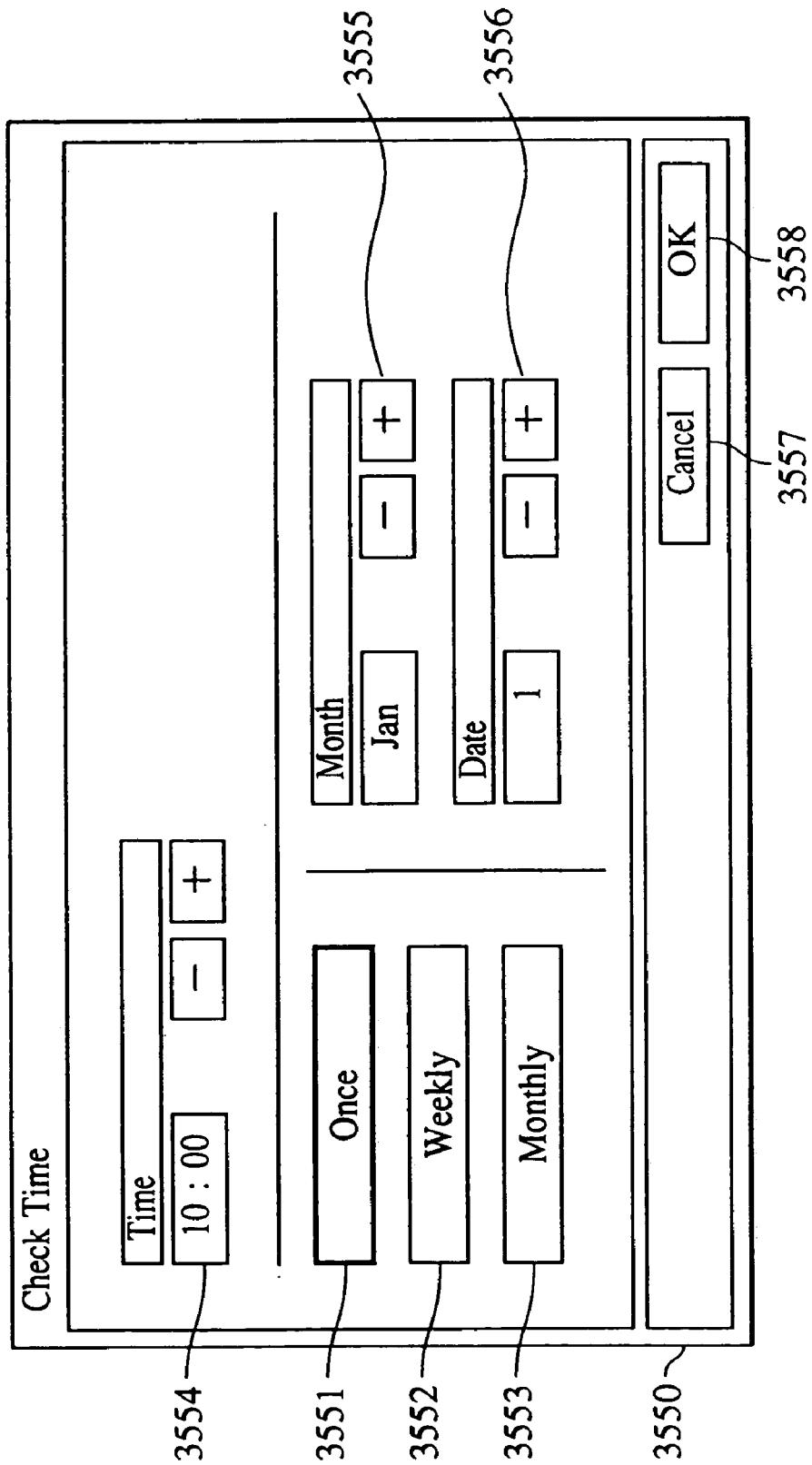
FIG. 56 is a schematic diagram illustrating a check time subscreen for setting the time at which a specified task is executed.
Figure 57:
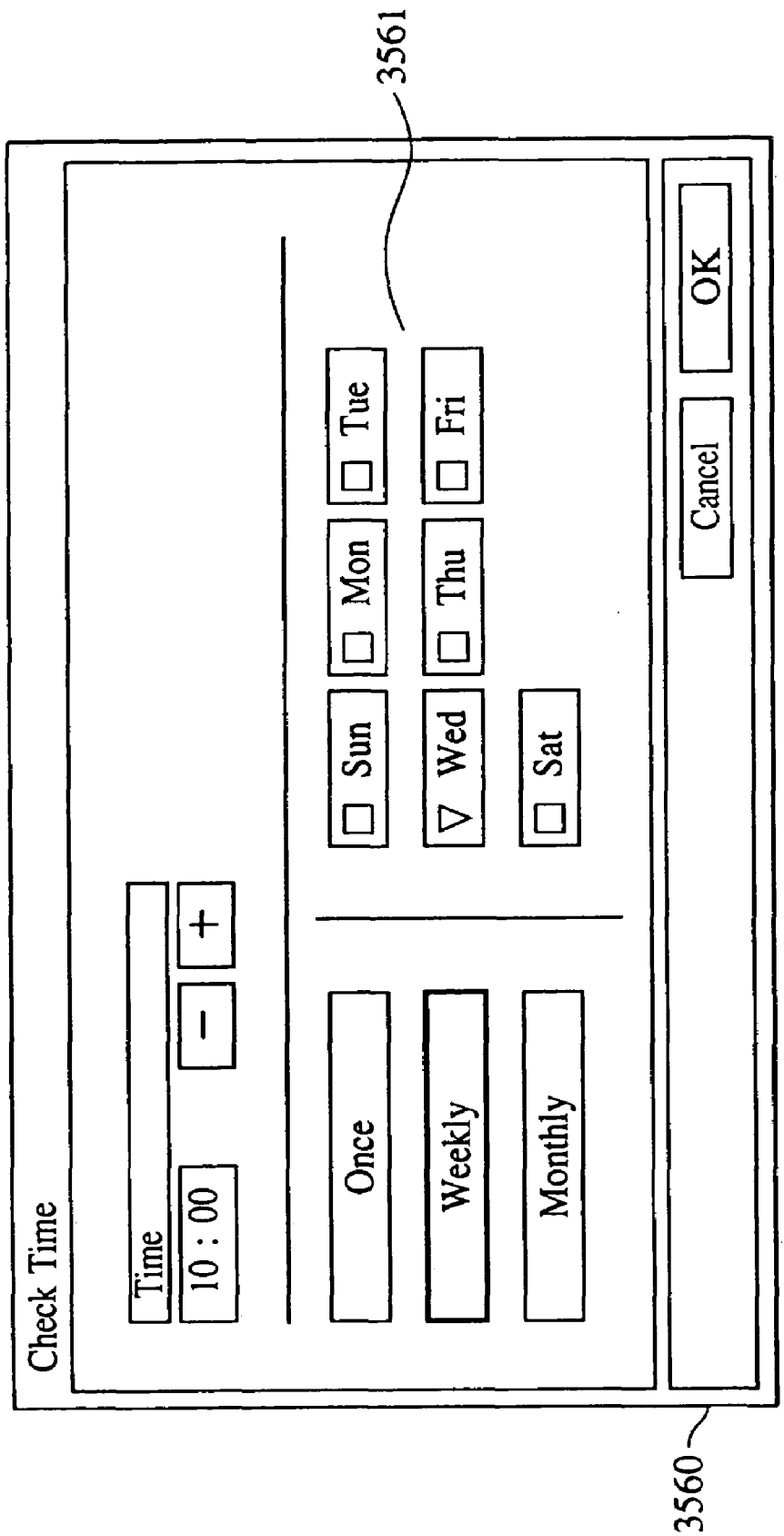
FIG. 57 is a schematic diagram illustrating a check time subscreen for setting the day of week and the time when a specified task is executed.
Figure 58:
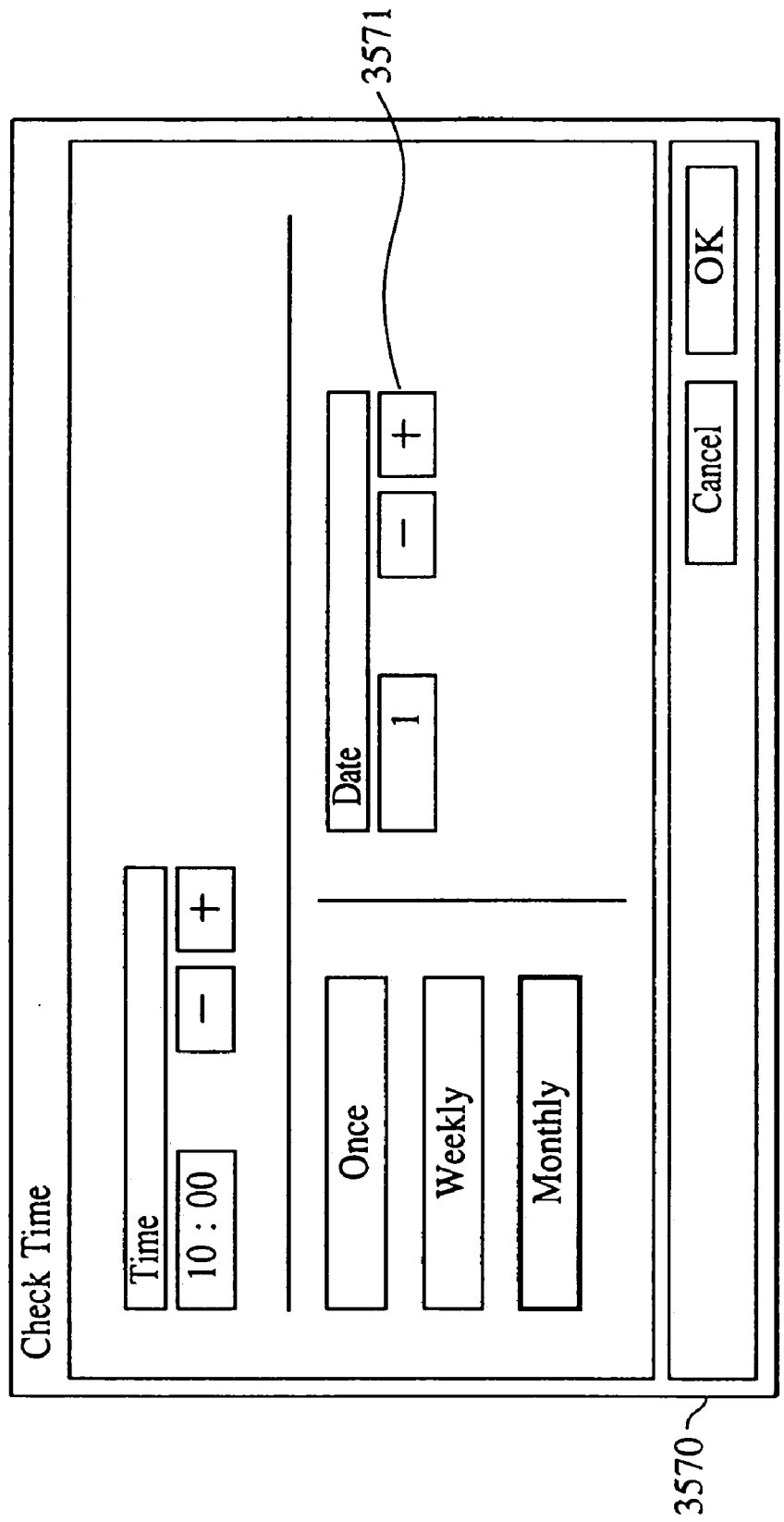
FIG. 58 is a schematic diagram illustrating a check time subscreen for setting the day of every month when a specified task is executed.

The check time subscreen (FIGS. 56–58) includes a schedule mode setting buttons (3551–3553), a time input box (3554), an "OK" button (3558), and a "Cancel" button (3557). When a "Once" button (3551) of the schedule mode setting buttons is selected (refer to FIG. 56), a month inputting box (3555) and a date inputting box (3556) are displayed. When a "Weekly" button (3552) is selected (refer to FIG. 57), day-of-week check buttons (3561) are displayed. When a "Monthly" button (3553) is selected (refer to FIG. 58), a data input box (3571) is displayed. If any input box is clicked, then a ten keyboard (FIG. 36) is displayed so that the user can input numerals. A plurality of days of week can be selected by clicking a plurality of day-of-week check buttons.

3.20 MGMT Screen

Figure 59:
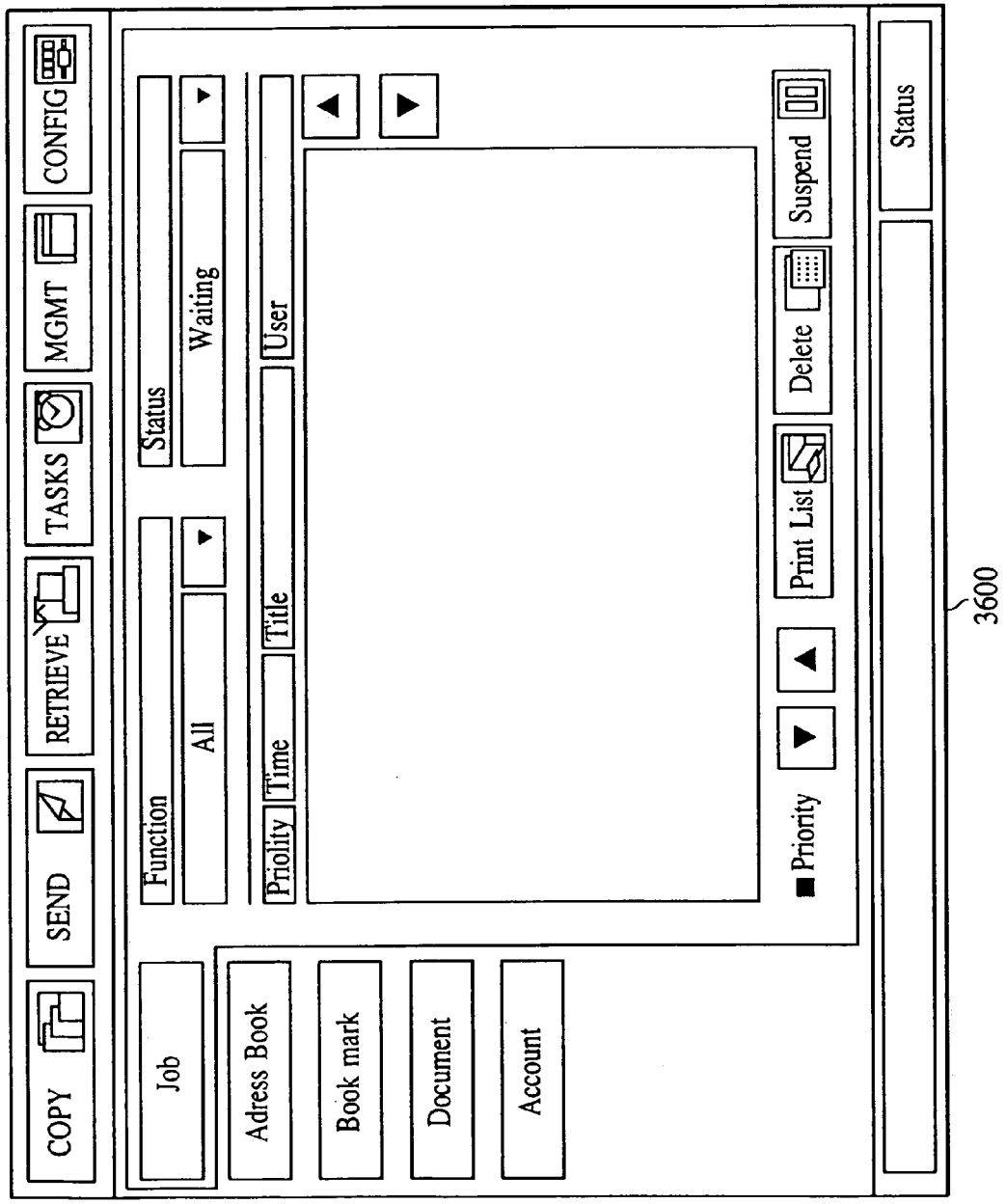
FIG. 59 is a schematic diagram illustrating a management subscreen which is displayed in a MGMT mode.

FIG. 59 illustrates a management screen which is displayed when the "MGMT" tab is selected. This screen indicates information of various items managed, although they are not further described herein.

3.21 CONFIG Screen

Figure 60:
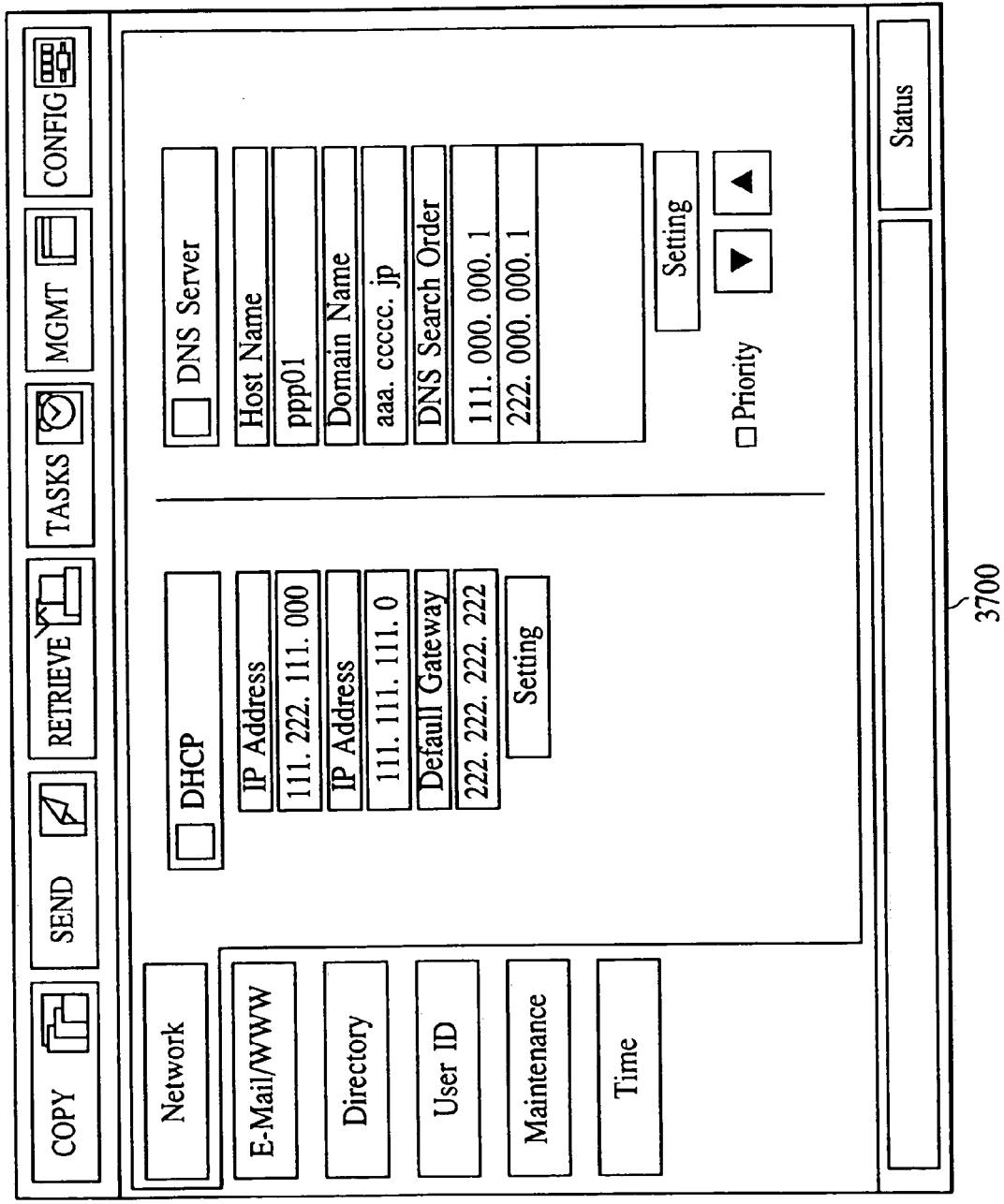
FIG. 60 is a schematic diagram illustrating a configuration subscreen which is displayed in a CONFIG mode.

FIG. 60 illustrates a configuration screen which indicates information about various settings of the image processing apparatus 1001 although they are not described in further herein.

3.22 Full Keyboard

When a character input box is clicked, a full keyboard (FIG. 26) is displayed on the current screen (so that the character input box is not hidden by the full keyboard). If a "www." button (3041) or a "com" button (3042) is clicked, a string of "www." or "com" is input. These buttons are convenient because "www." and "com" are frequently input. Other keys for providing well-known functions are not described here.

3.23 Ten Keyboard

When a numeral input box or a month input box is clicked, a ten keyboard (FIG. 36) is displayed on the current screen (so that the numeral input box or the month input box is not hidden by the ten keyboard). The functions of keys are not described here.

3.24 Error Screen

If some error occurs, an error screen appears as shown in FIG. 16.

The error screen includes a message indication area (3031) in which an error message in the form of a text is displayed and also includes an "OK" button (3032) used to close the error screen.

4. Device Information Service (DIS)

Herein, a device information service (DIS) refers to a database including information about the setting values for jobs performed by the controller of the image processing apparatus 1001, functions of devices (scanner, printer), status, and accounting information in the form according to the control API. The DIS also include an I/F with that database. A similar program (a required part of the program) may also be installed in other apparatus to realize similar functions.

Figure 61:
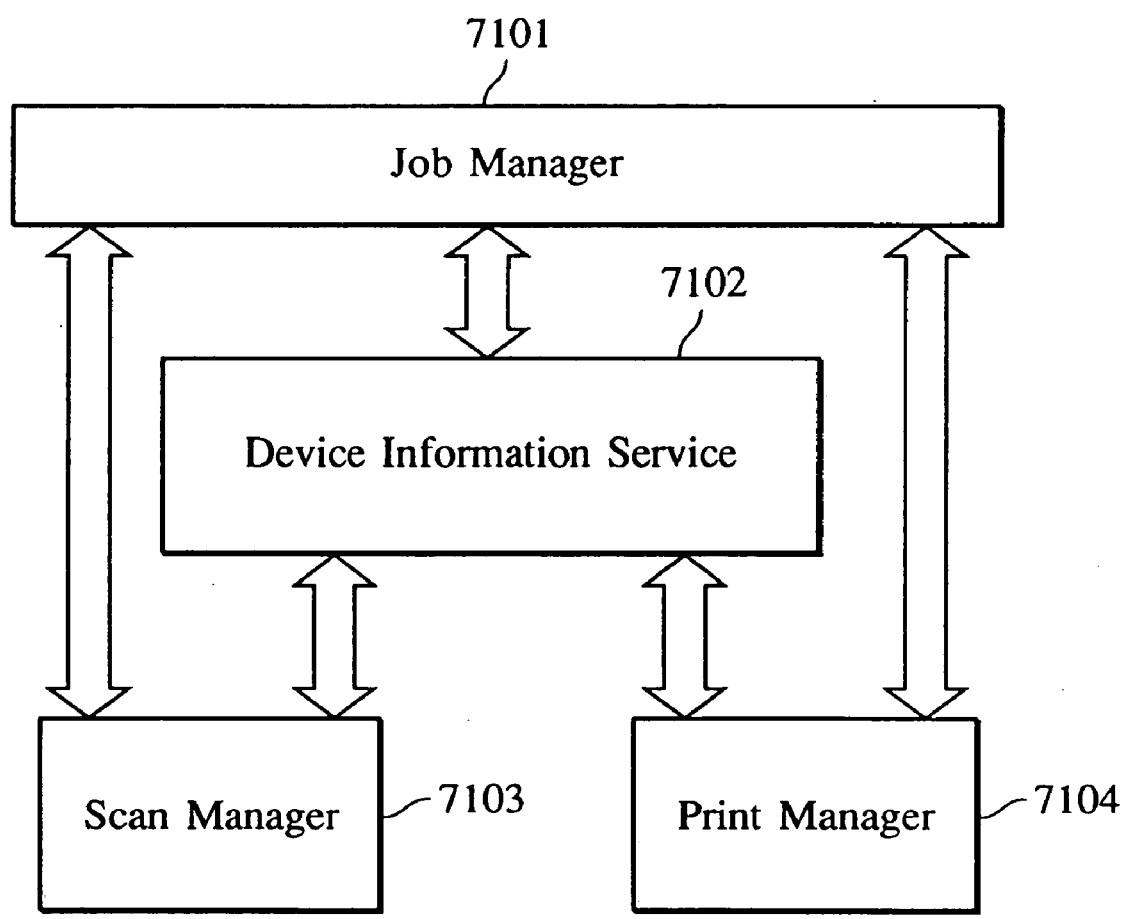
FIG. 61 is a schematic diagram illustrating a document information service (data processing among the job manager, print manger, and scan manager)

FIG. 61 illustrates data flow among the DIS 7102, the job manager 7101, and the document managers (the scan manager 7103, the print manager 7104).

Dynamic information such as a job start command is basically transmitted from the job manager 7101 directly to a document manager. On the other hand, static information such as device functions or contents of a job is obtained by referring to the DIS 7102. Static and dynamic information and events from the respective document managers are transmitted to the job manager 7101 via the DIS 7102.

When a document manager stores or reads data into/from the database of the DIS, it is required to convert the data format because the data format according to the control API is employed as the internal data format of the DIS. That is, it is required to convert the data format between the control API format and the format acceptable by the document managers. For example, when a document manager writes a status data in the DIS, the document manager interprets the data in a specific form employed in a specific device, and converts the data into the format defined in the control API. After that, the resultant data is written into the database of the DIS.

When the job manager writes or reads data into/from the database of the DIS, it is not required to convert the data format.

The DIS updates the event data in accordance with event information received from the document managers.

Figure 62:
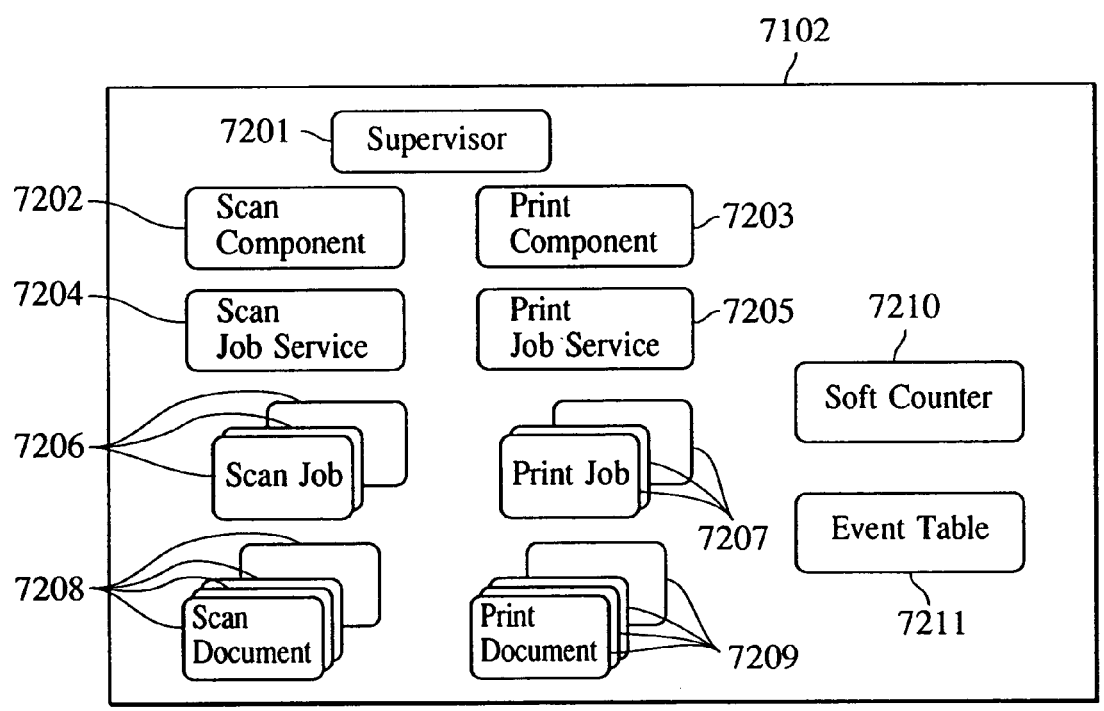
FIG. 62 is a schematic diagram illustrating the process associated with a database and a counter in the document information service.

FIG. 62 illustrates various databases included in the DIS. The respective databases are described below. In FIG. 62, boxes with rounded corners denote databases.

A supervisor database 7201 includes general information about the image processing apparatus 1001 and also includes user information. Information such as a user ID or a password which needs backup is stored on a hard disk or in a nonvolatile storage device such as a backup memory.

Reference numeral 7202 denotes a scan component database, and 7203 denotes a print component database. One component database is created for each component, and stored in the DIS. For example, in the case of a device including only a printer, there is only a print component database. On the other hand, in the case of a device having a facsimile function, there is a facsimile component database. That is, when an apparatus does not have as many functions as the image processing apparatus 1001, only required components may be provided in the apparatus so as to achieve desired functions according to the invention. The functions and status of the respective component databases are set by the corresponding document managers when they are initialized.

Reference numeral 7204 denotes a scan job service database, and 7205 denotes a print job service database. The functions and supporting conditions of these job service databases are also set by the corresponding document managers when they are initialized, as in the case of the component databases.

The job database and the document database are described below. Reference numeral 7206 denotes a scan job database 7207 denotes a print job database, 7208 denotes a scan document database, and 7209 denotes a print document database.

Whenever a job and associated document are generated, the job manager dynamically creates a job database and a document database and initializes these databases thereby performing required settings. Before starting to execute a job, the document manager reads required information from the job database and the document database. The document then begins the job in accordance with the obtained information. When the job is completed, the job database and the associated document database are released. Because each job has one or more documents, a plurality of document databases may be created depending on the job.

Reference numeral 7210 denotes a database for storing event information received from the respective document managers. Reference numeral 7211 denotes a counter table for storing the data representing the number of scanning operations and the number of printing operations performed by the image processing apparatus 1001.

Events generated by the document managers includes status transitions of components, completion of a scanning process, various errors, generated by the scan document managers, and status transitions of components, completion of a printing process, paper jamming, and paper cassette opening generated by the print document manager. Event ID's are assigned to the respective events to identify these events.

When an event is issued by the document manager, the DIS writes the event ID assigned to the issued event and also the detailed data associated with the event, if necessary, into the event database 7211. On the other hand, when an event release message is issued by the document manager, the data of the specified event is removed from the event database 7211.

If the job manager issues an event of polling, the DIS refers to the event database 7211 and returns the event ID's of currently occurring events and detailed data associated with the events, if necessary, to the job manager. If there is no event, the DIS notifies the job manager that there is no event.

In the case where a scan process end event or print process end event is received, the DIS updates the count values of the users who have performed the scan or print operation. The count values of these software counters are stored in a nonvolatile storage device such as a battery-backup memory or an HD device so that the values are not lost even if a power failure occurs. The values are rewritten in the nonvolatile storage device whenever the values are updated.

5. Scanning Operation

The scanning operation is described in detail below. Although in the following description it is assumed that a document is scanned by the scanner 2070 of the image processing apparatus 1001, a similar scanning operation may also be performed by another scanner.

Figure 63:
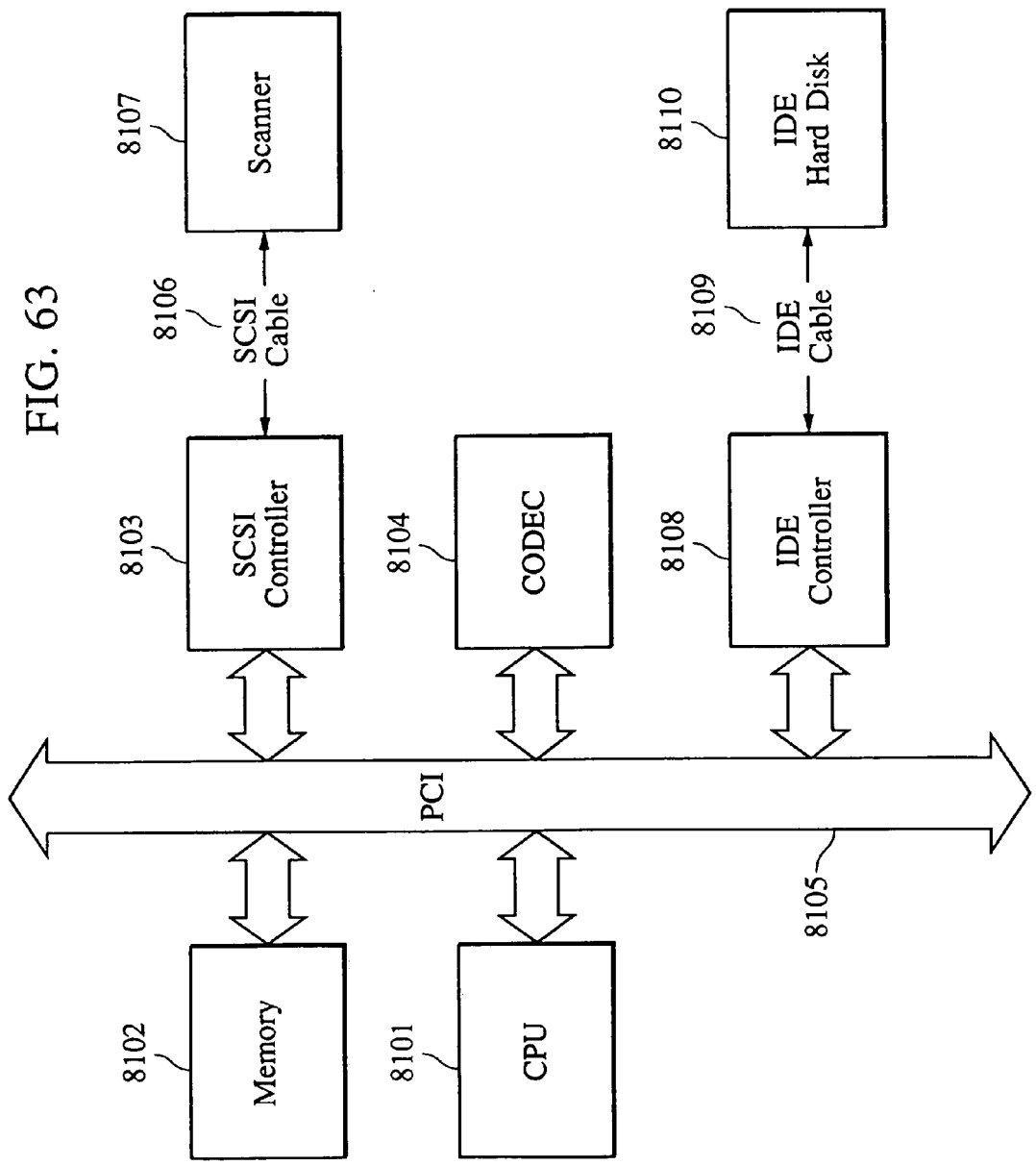
FIG. 63 is a block diagram illustrating hardware involved in the scanning operation of the scanner.

FIG. 63 is a conceptual block diagram illustrating the scanning operation. A CPU 8101, a memory (semiconductor memory) 8102, an image compression/decompression board 8104, and a SCSI I/F circuit 8103 are connected to a PCI bus 8105. A scanner 8107 is connected to PCI bus 8105 via the SCSI I/F circuit 8103 wherein the scanner 8107 (or a scanner unit of a multifunctional copying machine) and the SCSI I/F circuit 8103 are connected to each other via a SCSI interface cable 8106.

Figure 64:
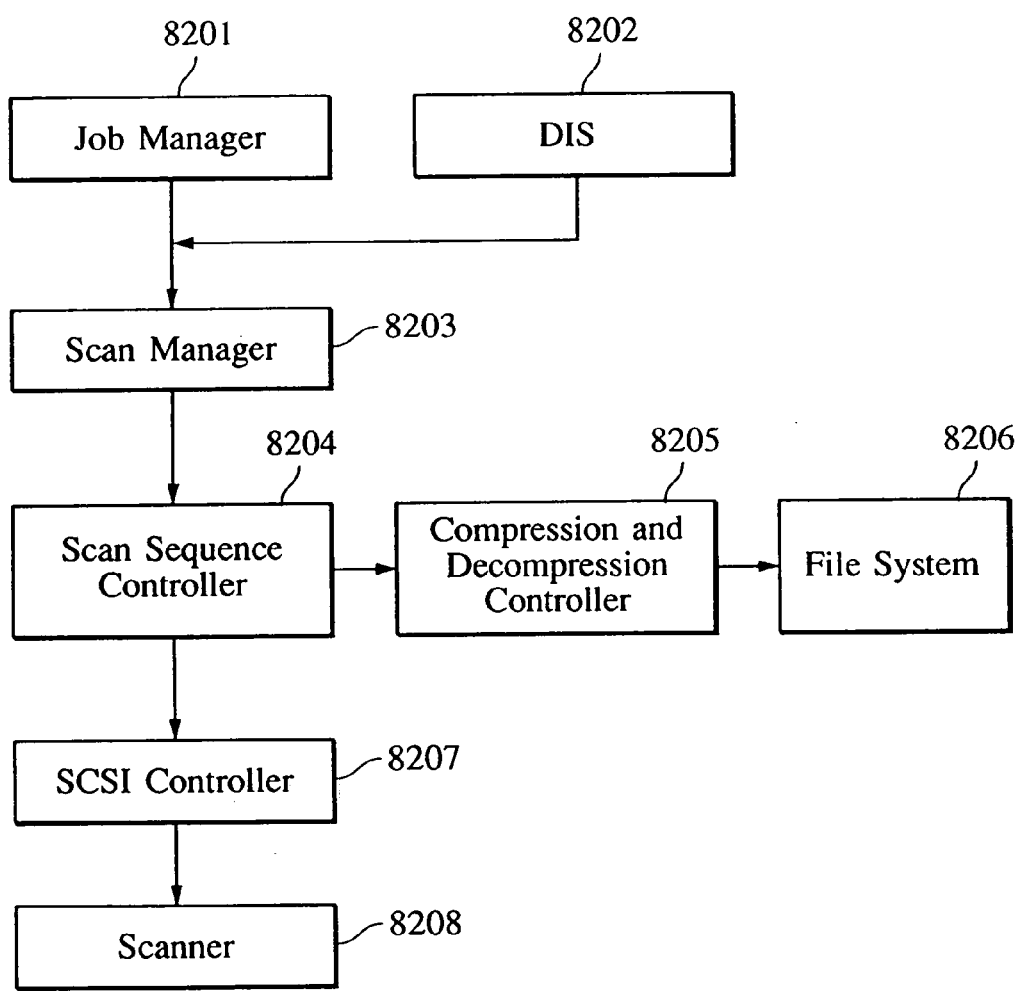
FIG. 64 is a block diagram illustrating software involved in the scanning operation of the scanner.
Figure 65:
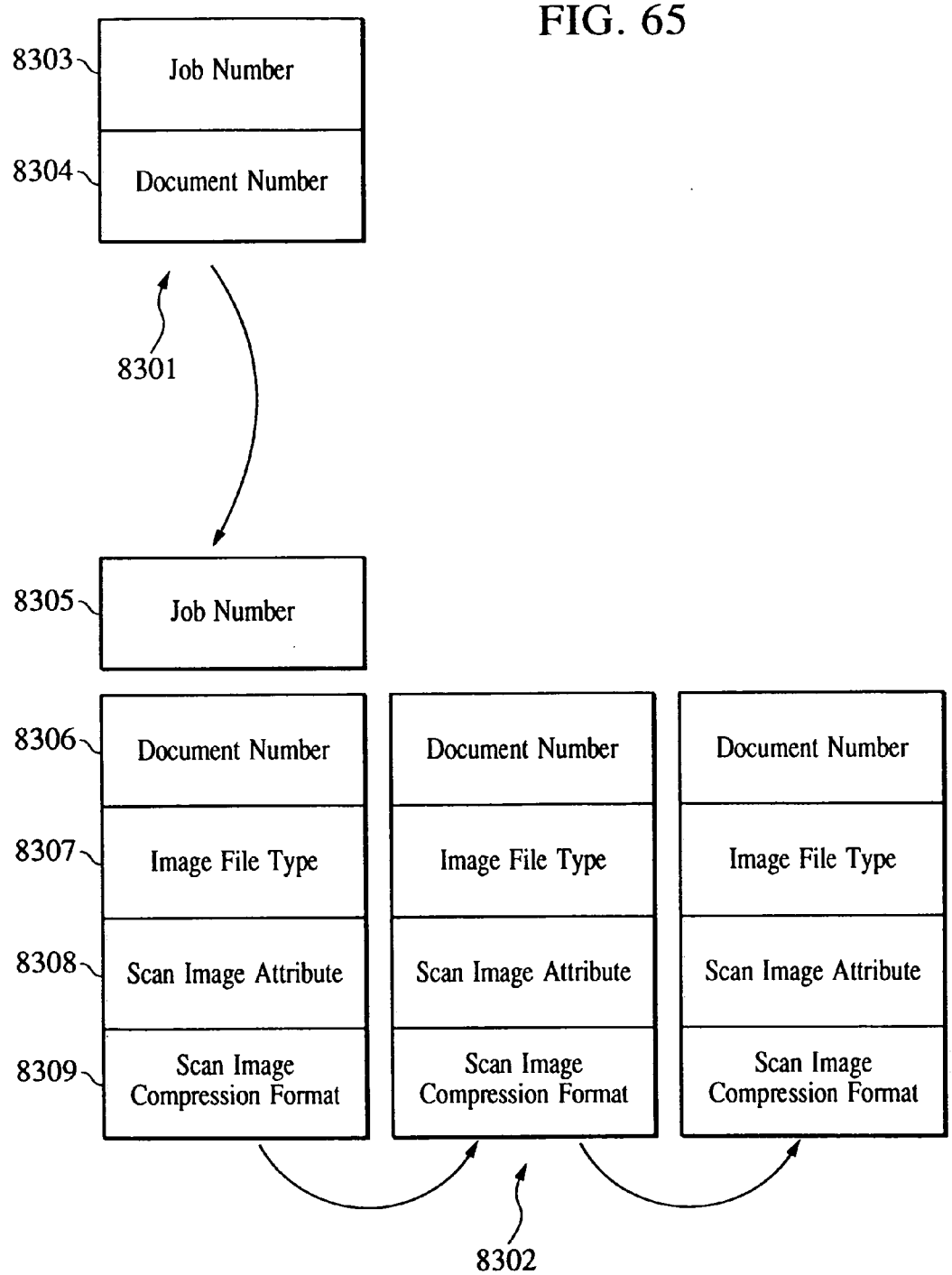
FIG. 65 is a schematic diagram illustrating a parameter table used in the scanning operation.

Furthermore, an IDE controller 8108 is connected to the PCI bus 8105 and an IDE hard disk 8101 is connected to the IDE controller 8108 via an IDE cable 8109. FIG. 64 illustrates the software structure involved in the scanning operation. In FIG. 64, a job manager 8201 classifies application levels and stores them. A DIS 8208 stores parameters required by the application levels in the scanning operation. A request from an application is stored in the memory 8102. A scan manager 8203 acquires information required in the scanning operation from the job manager 8201 and the DIS 8202. The scan manager 8203 receives from the job manager 8201 a table data 8301 including a job number and a document number, shown in FIG. 65. On the basis of the table data 8301 including the job number and the document number, the scan manager 8203 receives scan parameters 8302. Thus the scanning conditions requested by the application are determined, and a document is scanned under these conditions thereby reading an image of the document.

The scan manager 8203 sends the scan parameters 8302 obtained from the DIS 8202 to a scan sequence controller 8204 in the order of document numbers. If the scan sequence controller 8204 receives the scan parameter 8302, the scan sequence controller 8204 controls a SCSI controller 8207 according to the scan image attribute 8308. The SCSI controller 8103 connected to the PCI bus 8105, shown in FIG. 63, sends a SCSI control command to the scanner 8107 via the SCSI cable 8106. In response, the scanner 8107 starts a scanning operation. The image data obtained via the scanning operation is transferred to the SCSI controller 8103 via the SCSI cable 8106 and further to the memory 8102 via the PCI bus 8105 and stored in the memory 8102. When the image data has been stored in the memory 8102 after completion of the scanning operation, the scan sequence controller 8204 issues a request to a compression/decompression unit 8205 to compress the image data stored in the memory 8102 in accordance with the scan image compression format 8309 included in the scan parameters 8302. Upon receipt of the request, the compression/decompression controller 8205 compresses the image data using the CODEC 8104 connected to the PCI bus 8105 in accordance with the scan image compression format 8309 specified by the scan sequence controller 8204. The compression/decompression controller 8205 stores the resultant compressed image data into the memory 8102 via the PCI bus 8105.

If the image data has been stored in the memory 8102 after being compressed by the compression/decompression controller 8205 in accordance with the scan image compression format 8309, the scan sequence controller 8204 converts the compressed image data stored in the memory 8102 into file data according to the image file type 8307 included in the scan parameters 8302. To this end, the scan sequence controller 8204 issues a request to a file system 8206 to convert the image data to file data according to the file format indicated by the image file type 8307 included in the scan parameters 8302. In response to the request, the file system 8206 converts the compressed image data stored in the memory 8102 to file data according to the image file type 8307 specified by the scan sequence controller 8204. The resultant file data is transferred to the IDE controller 8108 via the PCI bus 8105 and further to the IDE hard disk 8110 via the IDE cable 8109. When the file data has been stored on the IDE hard disk 8110 by the file system 8206, the scan sequence controller 8204 determines that the process for one document on the scanner 8107 has been completed, and the scan sequence controller 8204 send a scan end message to the scan manager 8203.

If the scanner 8107 has another documents to be scanned, and if there is another scan request from the job manager 8201, then the scan manager 8203 again issues a request to the scan sequence controller 8204 to perform a scanning operation according to the scan parameters 8302 stored in the DIS 8202.

If the scanner 8107 has no more documents to be scanned, or if there is no scan request from the job manager 8201, the scan manager determines that the scanning operation has been completed and issues a scan end message to the job manager 8201.

6. Printing Operation

The printing operation is now described in detail below. Although in the following description it is assumed that an image is printed by the printer 2095 of the image processing apparatus 1001, a printing operation may also be performed in a similar manner by another printer.

Figure 66:
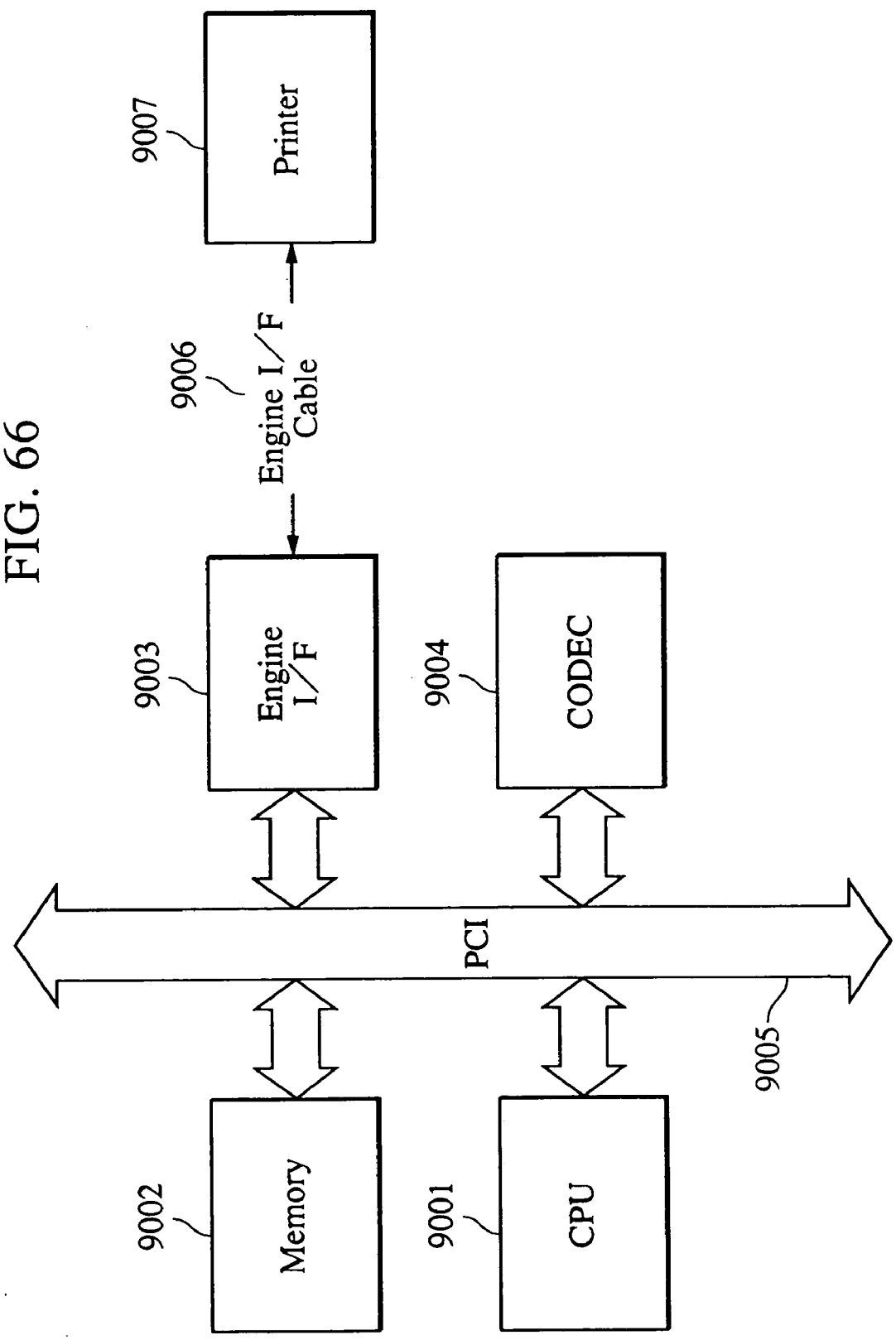
FIG. 66 is a block diagram illustrating hardware involved in the printing operation of the printer.

FIG. 66 is a conceptual block diagram illustrating the printing operation. A CPU 9001, a memory 9002, an image compression/decompression board 9004, and an engine I/F board 9003 are connected to a PCI bus 9005. A printer 9007 is connected to PCI bus 9005 via the engine I/F board 9003 wherein the printer 9007 (or a printer unit of a multifunctional copying machine) and the engine I/F board 9003 are connected to each other via an engine interface cable 9006.

Figure 67:
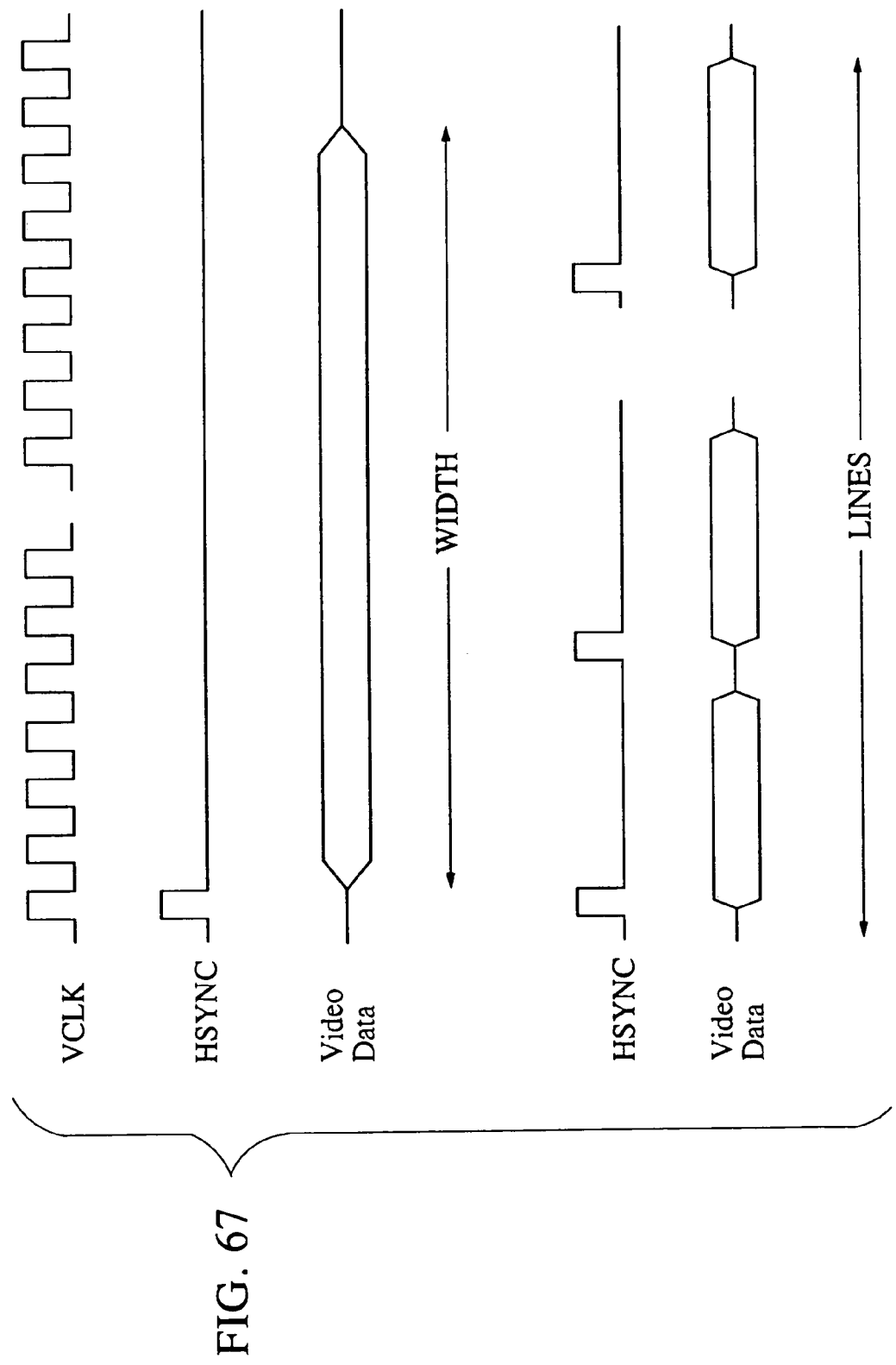
FIG. 67 is a timing chart illustrating the operation of transferring print image data.

The engine I/F board includes a DPRAM so that setting of parameters of the printer, reading of the status of the printer, and transmission/reception of control commands to/from the printer are performed via the DPRAM. The engine I/F board also includes a video controller for transmitting image data on the PCI to the printer via the engine interface cable in synchronization with VCLK (video clock) and HSYNC signals given by the printer via the engine interface cable, as illustrated in the transmission timing diagram shown of FIG. 67. The VCLK signal is always generated, but the HSYNC signal is generated when the printer starts each line. The video controller reads image data with a specified width (WIDTH) from a specified memory (SOURCE) on the PCI and outputs the obtained image data as a video signal over the engine interface cable. After performing the above process for a specified number of lines (LINES), the video controller generates an IMAGE_END interrupt.

As described above, when a print job request is sent from an application program on the CPU to the control API, the control API transfers the print job request to the job manager at the controller level. Furthermore, the job manager stores the data representing the setting of the job in the DIS, and sends a command to the print manager to start the job. Upon receipt of the job, the print manager reads the information required to execute the job from the DIS and sets the engine I/F board and the printer via the DPRAM.

Figure 68:
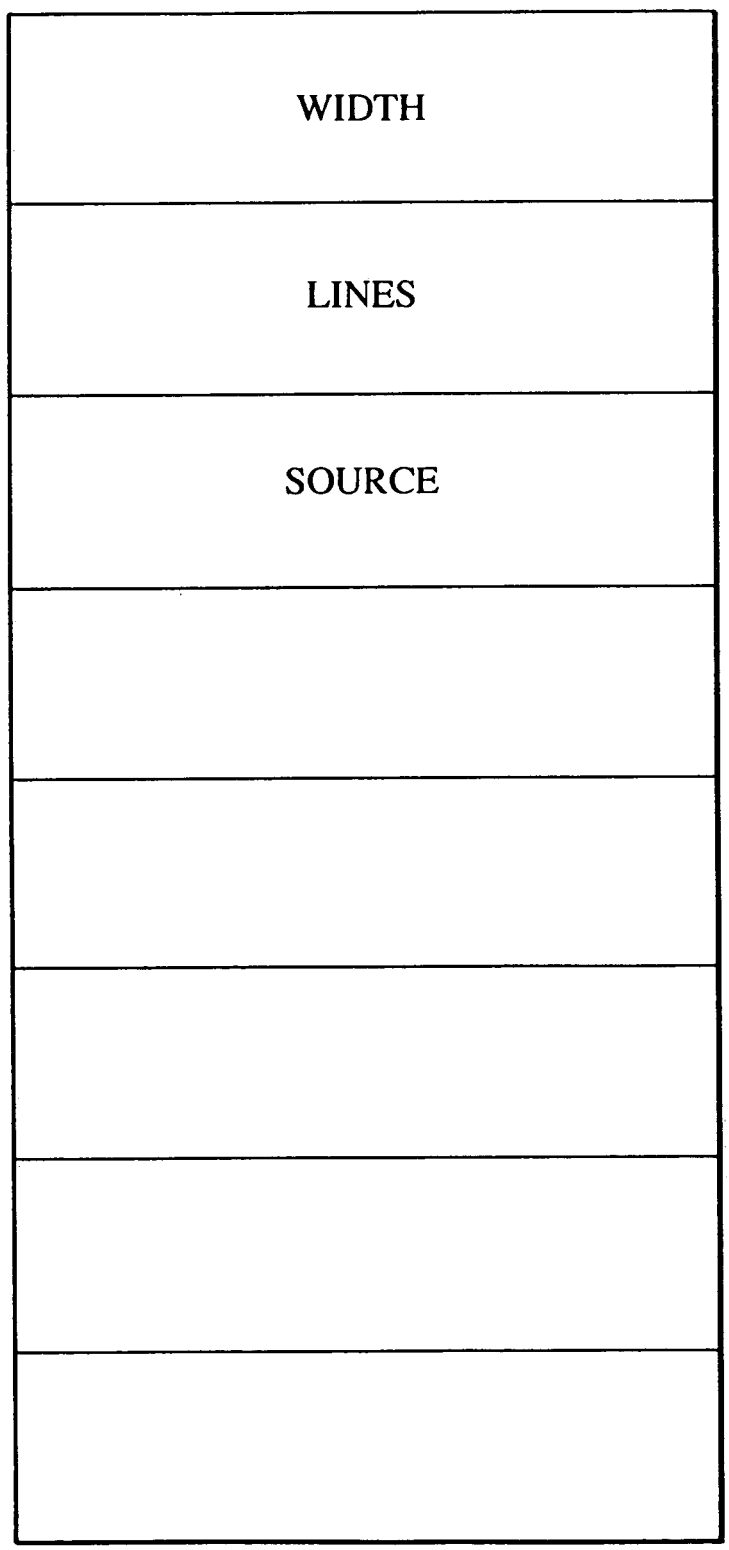
FIG. 68 is a schematic diagram illustrating a print parameter register of an engine I/F board.
Figure 69:
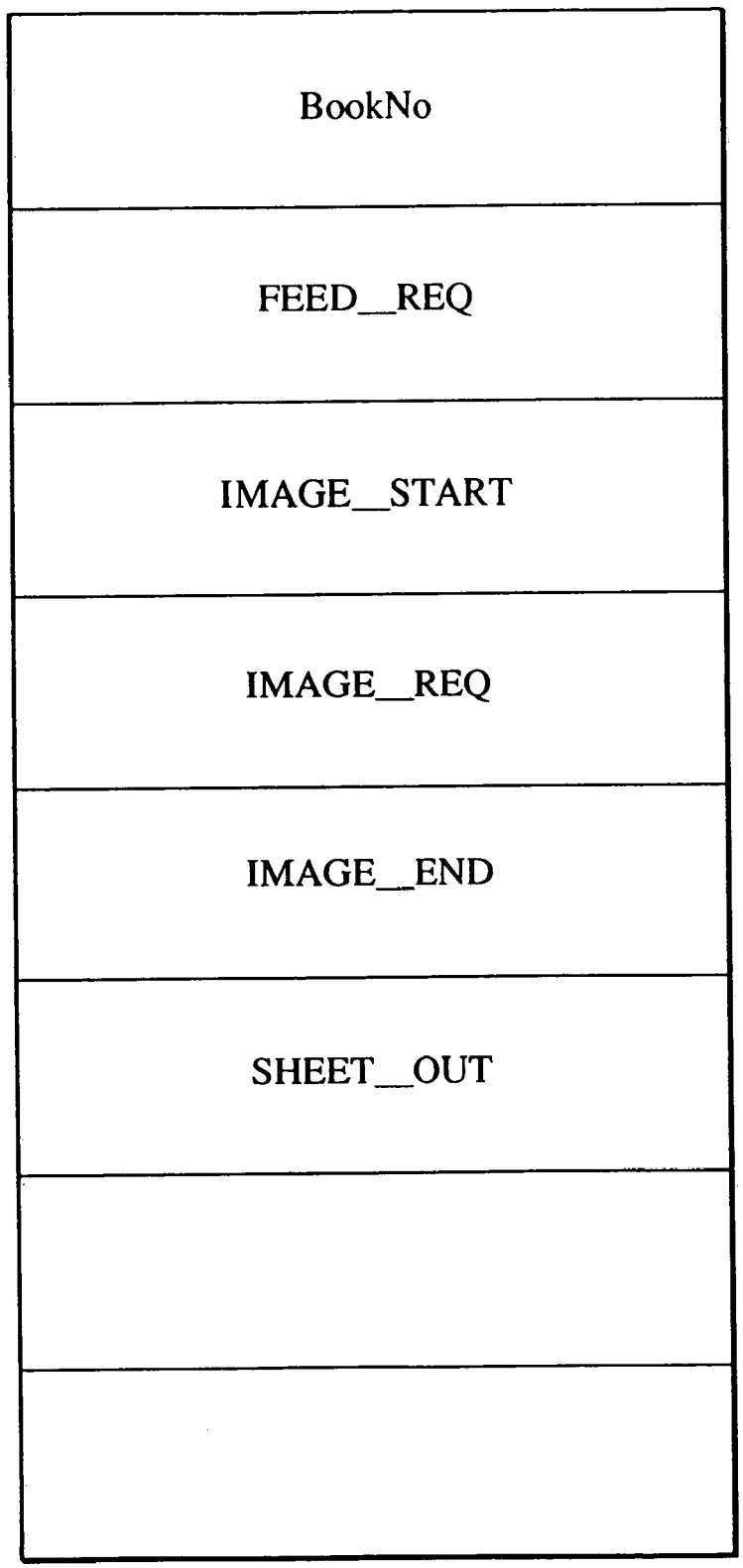
FIG. 69 is a schematic diagram illustrating communication commands (setting command, control command, status command) used in communication between the printer and the engine I/F board.

FIG. 68 illustrates the parameters associated with the engine I/F board, and FIG. 69 illustrates the parameters, control commands, and status commands transmitted via the DPRAM of the printer.

The operation is described in further detail below. For simplicity, it is assumed that the job is to print one set of two pages of two-level images which are not compressed and which have a letter size (11"×8.5") and it is also assumed that the printer is capable of printing an image with a resolution of 600 dpi.

Upon receipt of the job, the print manager calculates the number of bytes present along the width (8.5" in this specific example) of the image.

width=8.5×600÷8≈630 (bytes)

The print manager then calculates the number of lines as follows.

the number of lines=11×600=6600 (lines)

These values calculated here and the SOURCE address at which the first page of image data is stored are substituted into variables WIDTH, LINES, and SOURCE shown in FIG. 68. Now the engine I/F board is ready to output image data, but no HSYNC signal is transmitted from the printer (although the VCLK signal is transmitted) and thus the engine I/F board has not started to output image data yet.

The print manager writes "1" representing the number of copies to be printed into the DPRAM shown in FIG. 69 at a predetermined address (BookNo). After that, the print manager outputs a paper feeding request (FEED_REQ) for the first page, and waits for an IMAGE_REQ request from the printer. Upon receipt of IMAGE_REQ from the printer, the printer manger outputs an IMAGE_START command. In response, the printer starts to output the HSYNC signal, and the engine I/F board waiting for the HSYNC signal now starts to output image data. If the printer detects the trailing end of the paper, the printer outputs an IMAGE_END signal. Furthermore, when the paper is fed out, the printer outputs a SHEET_OUT signal. If the print manager receives the IMAGE_END signal associated with the first page, the print manger sets the engine I/F board in terms of WIDTH, LINES, and SOURCE for the second page. After that, the print manager outputs a FEED_REQ request and waits for an IMAGE_REQ request. After receiving the IMAGE_REQ request for the second page, the operation is performed in a similar manner to the first page.

Image data transmitting process of the image processing apparatus 1001 having the foregoing construction will be described hereinbelow.

A discrimination about transmitting conditions will be described in detail as an example with respect to the case of transmitting data to a personal computer (PC) on the third floor of a research building shown in FIG. 72.

Figure 70:
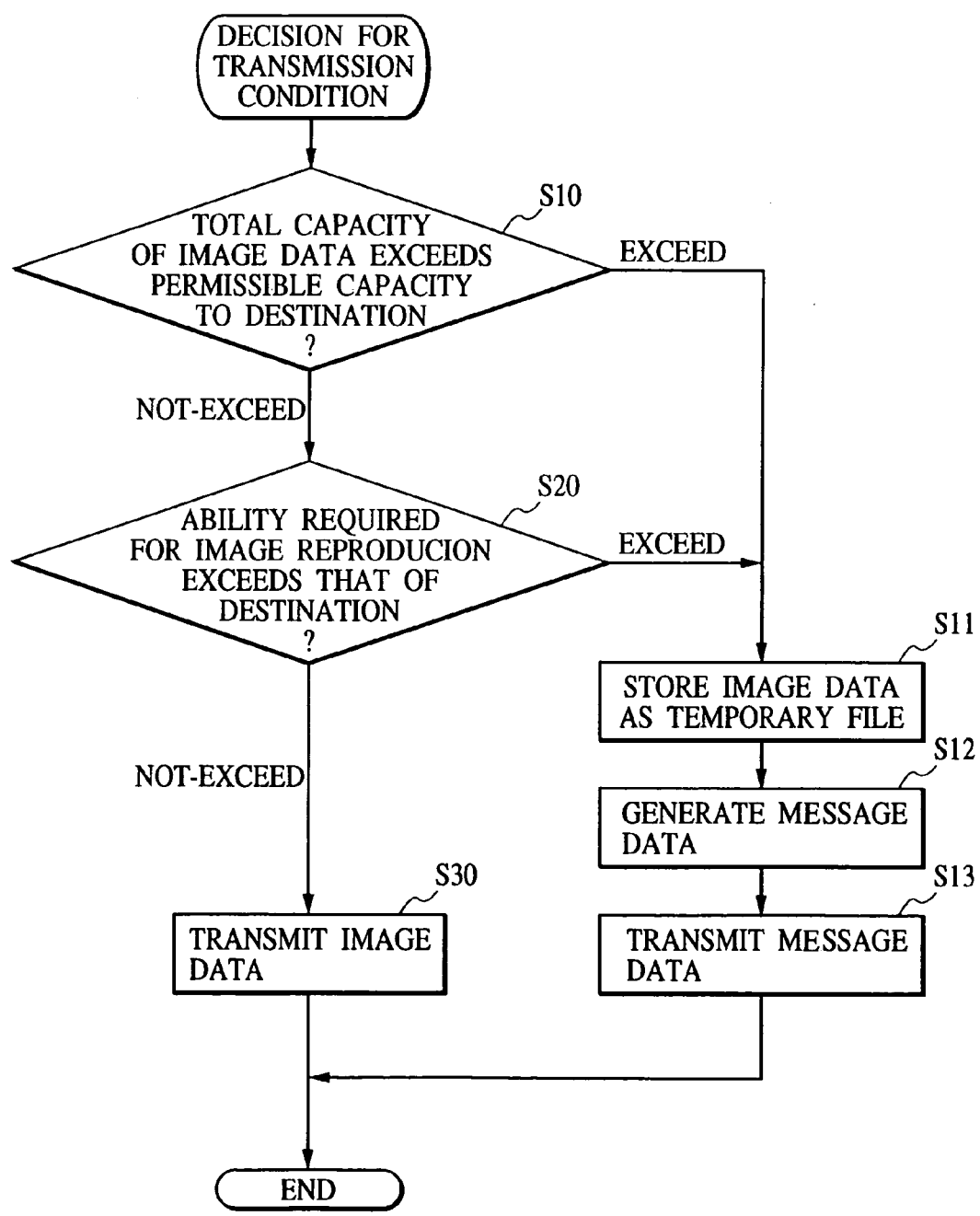
FIG. 70 is a flow chart for representing a substance of a procedure by a transmitting condition discriminating program.

A transmitting condition discriminating program shown in FIG. 70 is activated and loaded into the RAM 2002 by the CPU 2001 of the image processing apparatus 1001 at the time of transmission of the image data. In the transmitting condition discriminating program, when a transmission of the image data is instructed, a total capacity of the image data to be transmitted (image data inputted by the scanner 2070 or the like) is first read out. It is now assumed that it is equal to 2.6 Mbytes. Subsequently, an information route to PC "RESEARCH BLDG. 3RD FL. PC" on the third floor of the research building designated as a destination is read out from a destination information table 7200 shown in FIG. 72. In this case, it will be understood that the information route from the image processing apparatus 1001 (apparatus name is AMANDA) according to the embodiment to the PC on the 3F of the research building is the LAN and based on 10 Base.

It is expressed at the lowest speed in a range from the transmitting source of the image data to the PC on the 3F of the research building. This is because even if most of the information routes are based on 100 Base, when there is at least one location connected by 10 Base, this value of 10 Base becomes a bottle neck as a whole.

Subsequently, a permissible capacity (namely, permissible data amount) of the 10 Base LAN is read out from an information route permissible capacity table 7100 shown in FIG. 71. It is equal to 1 Mbytes. Therefore, on the basis of the transmitting condition discriminating program shown in FIG. 70, the CPU 2001 determines that the capacity (2.6 Mbytes) of the image data exceeds the permissible capacity (1 Mbytes) of the information route (S10). The target image data is not transferred here as a second mode (when there is a transmitting instruction, the image data is not transmitted but information showing the existing location of the image data and the access manner is transmitted, and the image data is transmitted by a method different from that of the information on the basis of an instruction from the destination side), and this image data is stored to a predetermined location on the hard disk as a temporary file "971214_005" (S11). The file name "971214_005" of the image data in this instance indicates the file at the date at the time of transmitting instruction, namely, the fifth file of Dec. 14, 1997, and this file name is automatically formed.

The various tables shown in FIGS. 71 and 72 are stored in the hard disk provided for the image processing apparatus 1001 and the permissible data amount corresponding to each information route included in the table shown in FIG. 71 is preset by the user (for example, administrator).

When the permissible data amount is set, the user sets the permissible amount of data (namely, permissible data amount) which is transmitted or received every information route so that no influence is exerted on the network environment of the partner destination and the time that is required to collect the data on the partner destination side is not longer than it is needed. The image processing apparatus 1001 itself can transmit or receive information to/from the other apparatus and can also automatically set it.

The temporary file is deleted after the elapse of a predetermined time from the completion of the read access to the image data. The temporary file is distinguished from the other files by the following method. That is, assuming that the stored directory is /temp_image, it is a temporary file, otherwise, it is not the temporary file.

Message data showing a method of accessing to the file stored in a predetermined memory area on the hard disk is subsequently formed (S12). This message data has a construction as shown in, for example, FIG. 73. A message indicating that the transfer of the image was stopped because an image size is too large and that the image has been stored is written in the title. The access manner to the storing location and, if necessary, a log-in name and a password are also written as a storing source access manner. The message data is developed in the RAM 2002 by the CPU 2001. Subsequently, the message data is transmitted to the designated destination as information regarding the image data to be transmitted (S13).

When the user of the destination reads the message data and accesses to AMANDA as a storing location by ftp by using, for example, an existing Web browser or the like, the CPU 2001 deletes /tem_image/971214_005 at the time point of completion of ftp.

When the total capacity of the image data does not exceed the permissible capacity up to the destination (S10), whether the ability that is required for image reconstruction of the image data to be transmitted next exceeds the ability of the destination or not is discriminated on the basis of a destination information table in FIG. 72 (S20).

When the image data does not exceed the ability of the destination, the image data is transmitted as it is as a first mode (S30).

When it exceeds the ability of the destination, message data is transmitted to the destination of the transmission by the processes in steps S11 to S13 as a second mode in a manner similar to that mentioned above.

As ability information to discriminate whether the apparatus of the destination can process the image data or not, besides the permissible data amount of the communication route mentioned above, a data capacity which can receive by an information processing apparatus of the destination (apparatus such as personal computer, workstation, or the like for processing the image data by word processor software, drawing software, or the like), for example, a capacity of the hard disk and a capacity of the memory can be also included. Further, color information (for example, the number of colors such as 16 colors, 256 colors, etc. which can be handled, resolution) which can be handled by the information processing apparatus of the destination can be included.

In the foregoing embodiment, although the data stored temporarily in the image processing apparatus is deleted (erased) on the basis of an action of the partner destination, it can be also erased by an instruction by the user from the control panel 2012 of the image processing apparatus. Moreover, the presence or absence of the access from the destination is monitored by the CPU 2001 and when there is no access even after the elapse of a predetermined period of time, the image data can be also automatically erased by the CPU 2001.

As for the image data which cannot be processed by the destination, when there is no access even after the elapse of a predetermined period of time, the image data can be also stored in a detachable recording medium from the own image processing apparatus. In this case, the user is promoted to set a floppy disk or a magnetooptic disk and the image data is written to those recording media by a floppy disk drive or a magnetooptic disk drive on the basis of the control of the CPU 2001 by an instruction from the control panel.

The message to be transmitted to the destination can have a format of data which can be processed by the destination. For example, if there are limitations in the number of colors and the resolution, message data according to the limitation is formed.

An image of a bit map or a character code like an ordinary E-mail can be used as a message. If the user wants to transmit a part of the image data by using the E-mail, it is sufficient to transmit a part of the image data by a format of an annexed file like MIME.

As will be obviously understood from the above description, in the embodiment, the attributes (total capacity, color information, and the like of the image data) of the inputted image data as a transmission target, the attributes of the destination and the attribute of the destination (permissible data amount of the information route, color information which can be handled) are compared, and the transmission of the image data is controlled on the basis of results of the comparison, so that a more comfortable environment can be provided for the user by a simple construction.

In a state where the transmission of the image data is not performed at the time of the instruction of the transmission but the desired image data is stored as a temporary file in the predetermined memory area by the processes in the second mode, if the read access to the file is performed from the user on the destination side, this file is deleted (namely, erasing process to the file) at the time point after the elapse of a predetermined time from the completion time point of the access from the user as mentioned above. However, the invention is not limited to it but the file can be also deleted synchronously with the timing of the first automatic clearing process performed after the completion of the access.

Figure 73:
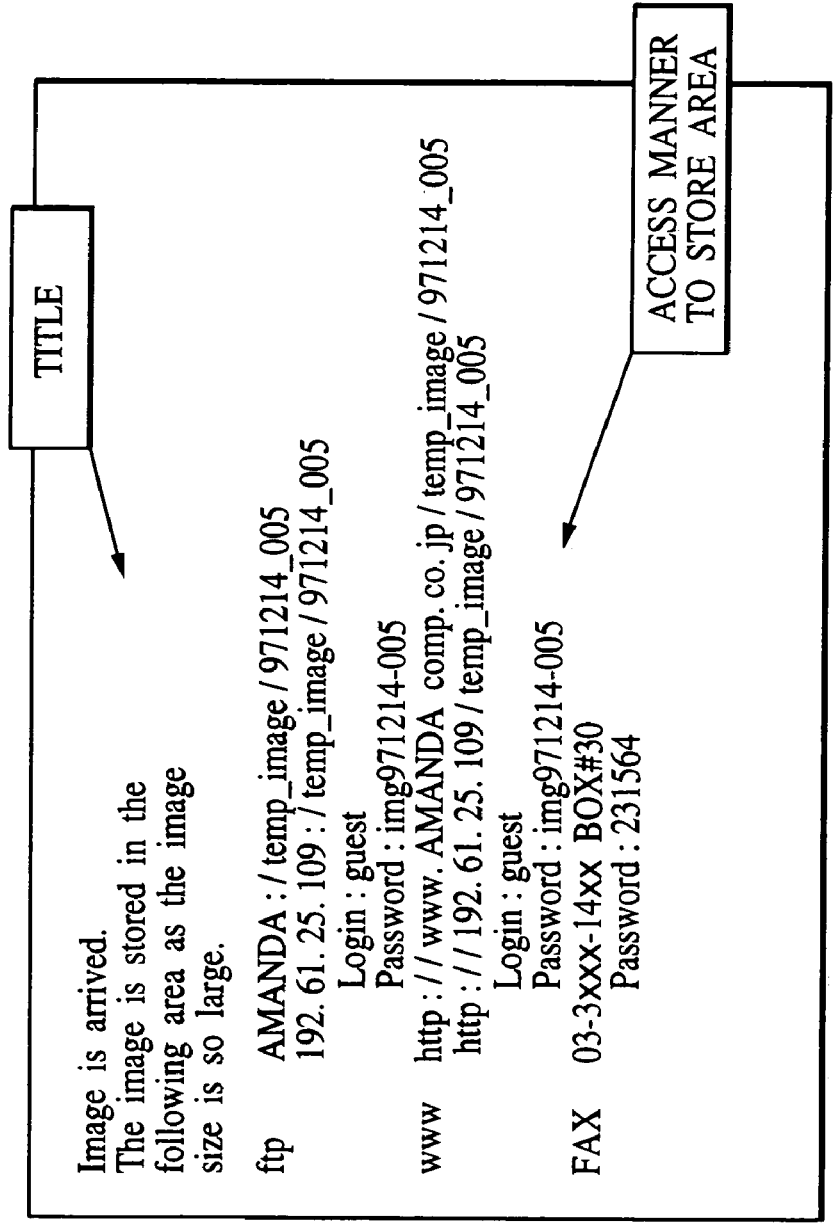
FIG. 73 is a schematic diagram illustrating one example of a transmitting message.
Figure 74:
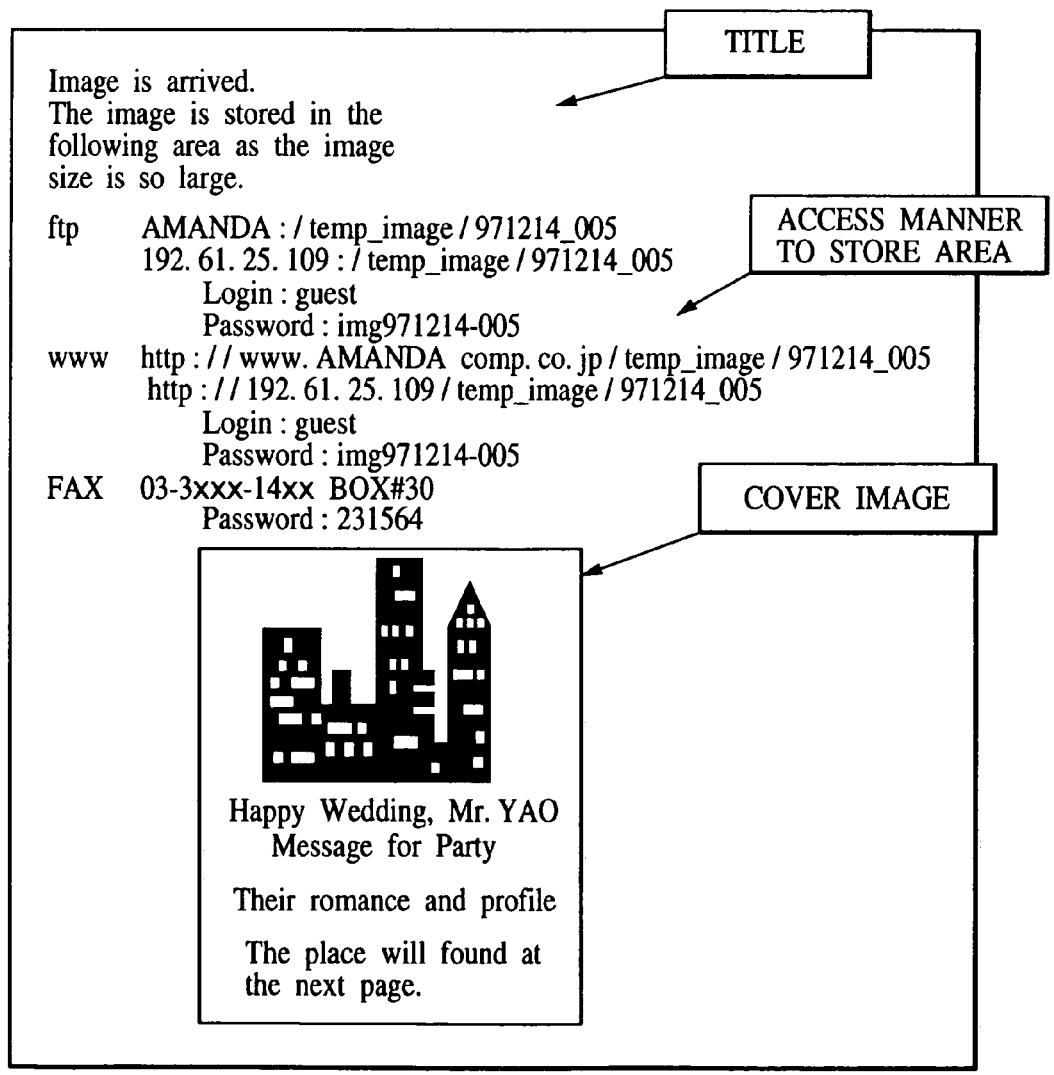
FIG. 74 is a schematic diagram illustrating another example of a transmitting message.

Besides character information (the storing location of the image data, the access manner to the storing location, the log-in name, the password, etc.) as shown in FIG. 73 as message data, image data (namely, image information) of the representative page, for example, the first page (head page) can be also added to the message data with reference to FIG. 74. In this case, the message data as described in the process in step S12 in FIG. 70 is formed by the CPU 2001. Further, an editing process (for example, a zooming process to the image data) is performed so that the image data of the first page is enclosed in the blank of the message data. The image data subjected to the editing process is added to the message data. As image data to be added, image information expressed in color which can be handled by the apparatus of the transmission destination can be used.

Figure 75:
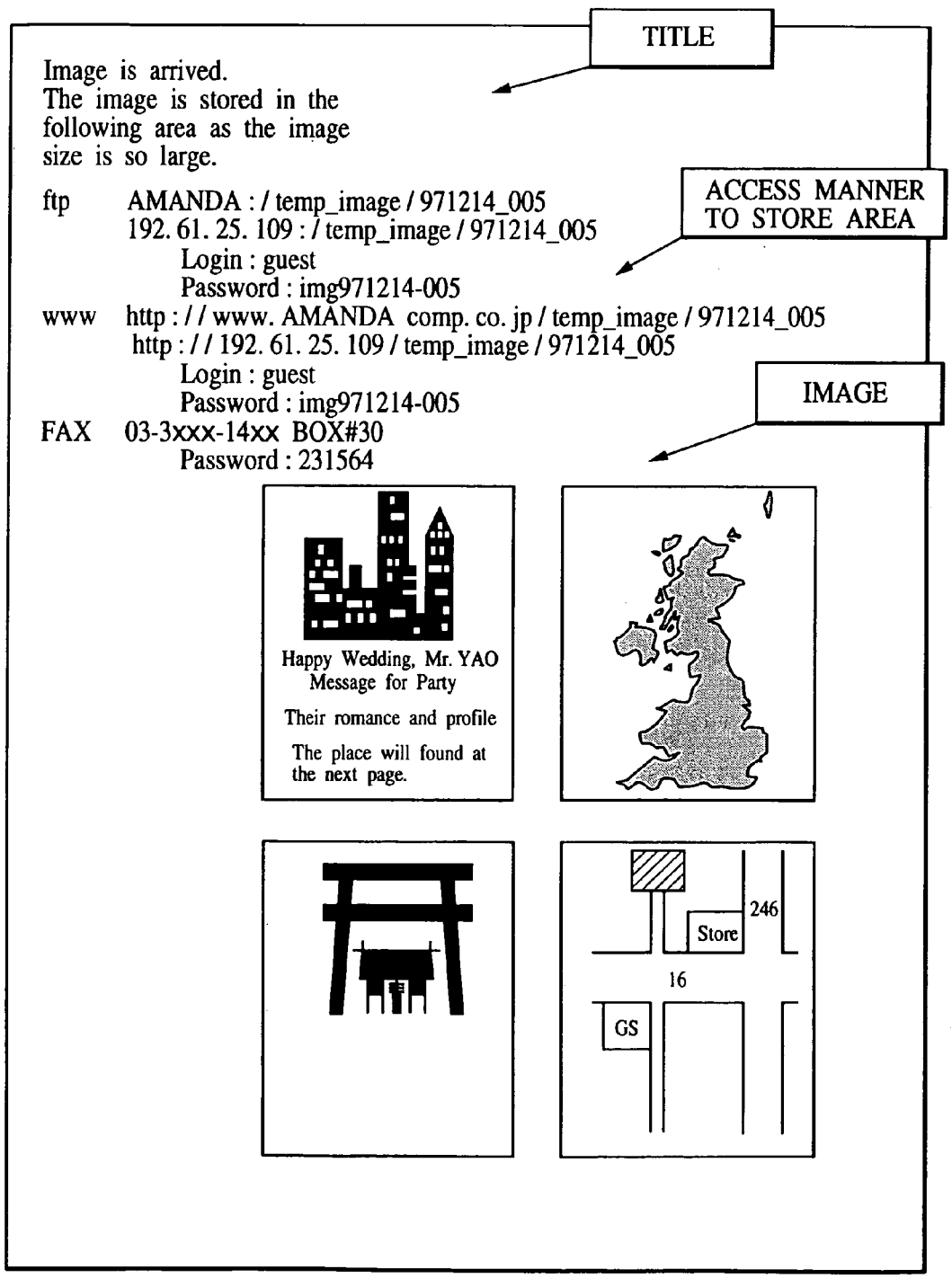
FIG. 75 is a schematic diagram illustrating still another example of a transmitting message.

Image data (image information) of a plurality of pages (in the diagram, four pages) can be also added to the message data with reference to FIG. 75. Also in this case, message data is formed in a manner as described in the process in step S12 in FIG. 70. Further, an editing process (zooming process, layout process, etc.) is performed so that image data of a plurality of pages is enclosed in the blank of the message data. The image data of a plurality of pages subjected to the editing process is added to the message data.

According to the image processing apparatus as described above, besides the ordinary copying function, in the case where the read image of the image processing apparatus is transferred to the other apparatus connected by the LAN or the like, before the image which cannot be processed by the other apparatus is transmitted from the image processing apparatus, a message indicative of the existence of the image is transmitted. Thus, a situation such that the image data which cannot be processed by the other apparatus side is unwillingly received and a trouble is caused does not occur. A fact that the read image cannot be processed can be also known by the message.

A processing ability of the other information processing apparatus is set to the data capacity, image data capacity, or color information which can be processed on the communication route, thereby enabling the present invention to cope with various information processing apparatuses.

The read image which cannot be processed by the other apparatus is stored in a detachable medium, so that the user can extract the stored image and process it by the apparatus which can process it.

By automatically erasing the stored image data, the erasure instructing operation by the user can be made unnecessary.

A message showing that the user wants to provide an image and a message showing the storing location, log-in, password, and the like of the image data are included in the transmission message, so that the user of the destination can know the existence of the image data and the information that is necessary to extract the image data.

Either the first mode or the second mode can be selectively executed on the basis of the attribute of the image data and the attribute information of the external apparatus, for example, the total data amount and the like of the image data to be transmitted.

Since a part of the image data of a plurality of pages is added to the message, the user of the external apparatus can specify an outline of the image.

The invention can be applied to a system comprising a plurality of apparatuses (for example, a host computer, an interface apparatus, a reader, a printer, etc.) or can be also applied to an apparatus comprising one apparatus (for example, a copying apparatus, a facsimile apparatus, a personal computer, or the like).

The invention also incorporates a case where program codes of software to realize the functions of the embodiments mentioned above are supplied to a computer in an apparatus or a system connected to the various devices so as to make the various devices operative in order to realize the functions of the embodiments mentioned above, and the various devices are made operative by the computer (a CPU or an MPU) of the system or apparatus in accordance with a stored program, thereby embodying the invention.

In this case, the program codes themselves of the software realize the functions of the embodiments mentioned above, and the program codes themselves and means for supplying the program codes to the computer, for example, a memory medium in which the program codes have been stored construct the invention.

As a memory medium for storing the program codes, for example, it is possible to use a floppy disk, a hard disk, an optical disk, a magnetooptic disk, a CD-ROM, a magnetic tape, a non-volatile memory card, an ROM, or the like.

The program codes are also incorporated in the embodiments of the invention in not only a case where the functions of the embodiments mentioned above are realized by executing the program codes supplied by the computer but also a case where the program codes realize the functions of the embodiments mentioned above in cooperation with the OS (Operating System) which operates in the computer or another application software or the like.

Further, the invention also incorporates a case where the supplied program codes are stored in a memory equipped for a function expanding board of a computer or a function expanding unit connected to the computer and, thereafter, a CPU or the like equipped for the function expanding board or function expanding unit on the basis of instructions of the program codes executes a part or all of the actual processes, and the functions of the embodiments mentioned above are realized by those processes.

Although the present invention has been described with respect to the preferred embodiments, the invention is not limited to the foregoing embodiments but many modifications and variations are possible within the spirit and scope of the appended claims of the invention.

What is claimed is:

1. A data transmission apparatus comprising:
   an input unit, arranged to input data;
   a transmission unit, arranged to transmit the data inputted by said input unit to a destination;
   a discrimination unit, arranged to discriminate an attribute of the data inputted by said input unit;
   a storage unit, arranged to store the data inputted by said input unit as a file; and
   a control unit, arranged to control a transmission operation of said transmission unit in accordance with a discrimination result obtained by said discrimination unit,
   wherein said control unit selectively controls a transmission operation such that said transmission unit transmits the data inputted by said input unit to the destination, or such that said transmission unit transmits storage location information and a message indicative of an access manner for accessing the file, which is stored in said storage unit, to the destination, in accordance with the discrimination result obtained by said discrimination unit.

2. An apparatus according to claim 1, wherein said discrimination unit discriminates a data amount of the data inputted by said input unit.

3. A data transmission method comprising:
   an input step, of inputting data;
   a transmission step, of transmitting the data inputted in said input step to a destination;
   a discrimination step, of discriminating an attribute of the data inputted in said input step;
   a storage step, of storing the data inputted in said input step as a file in a storage unit; and
   a control step, of controlling a transmission operation in said transmission step in accordance with a discrimination result obtained in said discrimination step,
   wherein said control step includes selectively controlling a transmission operation such that, in said transmission step, the data inputted in said input step is transmitted to the destination, or such that, in said transmission step, storage location information and a message indicative of an access manner for accessing the file, which is stored in the storage unit, is transmitted to the destination, in accordance with the discrimination result obtained in said discrimination step.

4. A storage medium storing a computer-readable program for implementing a data transmission method, wherein the method comprises:
   an input step, of inputting data;
   a transmission step, of transmitting the data inputted in said input step to a destination;
   a discrimination step, of discriminating an attribute of the data inputted in said input step;
   a storage step, of storing the data inputted in said input step as a file in a storage unit; and
   a control step, of controlling a transmission operation in said transmission step in accordance with a discrimination result obtained in said discrimination step,
   wherein said control step includes selectively controlling a transmission operation such that, in said transmission step, the data inputted in said input step is transmitted to the destination, or such that, in said transmission step, storage location information and a message indicative of an access manner for accessing the file, which is stored in the storage unit, is transmitted to the destination, in accordance with the discrimination result obtained in said discrimination step.

* * * * *